Inventor:

June 4, 1957 T. A. BANNING, JR 2,794,507
SYNCHRONIZING SYSTEM FOR PLURAL PROPELLERS
WITH PITCH AND FUEL CONTROL
Original Filed Jan. 18, 1945 14 Sheets-Sheet 3
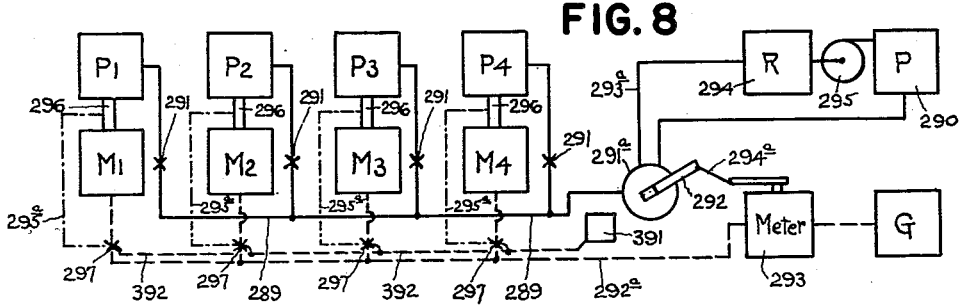
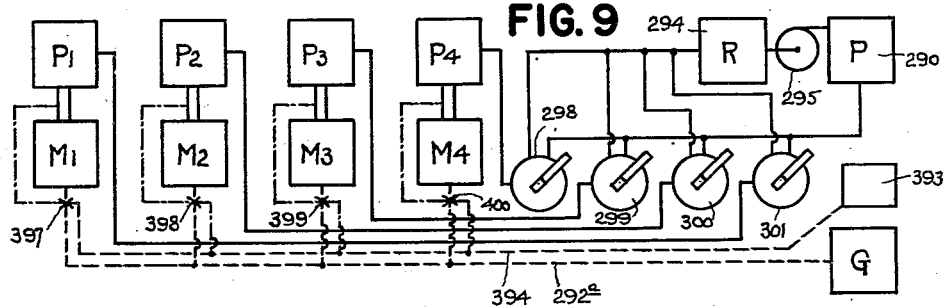
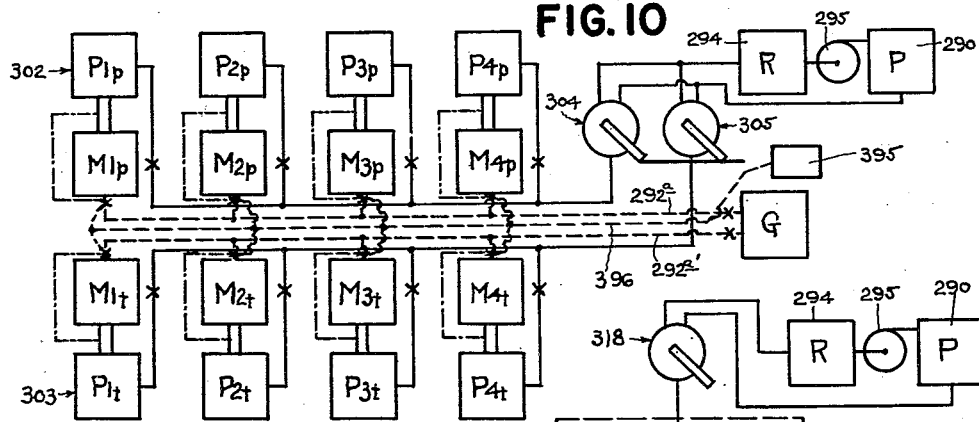
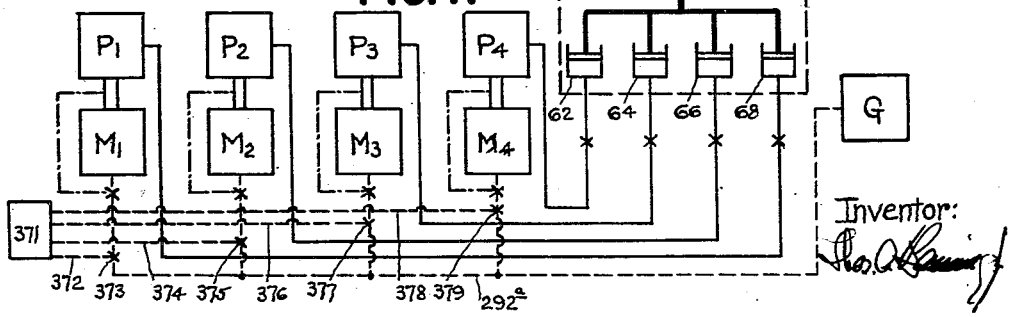

June 4, 1957     T. A. BANNING, JR     2,794,507
SYNCHRONIZING SYSTEM FOR PLURAL PROPELLERS
WITH PITCH AND FUEL CONTROL
Original Filed Jan. 18, 1945     14 Sheets—Sheet 5
FIG. 14
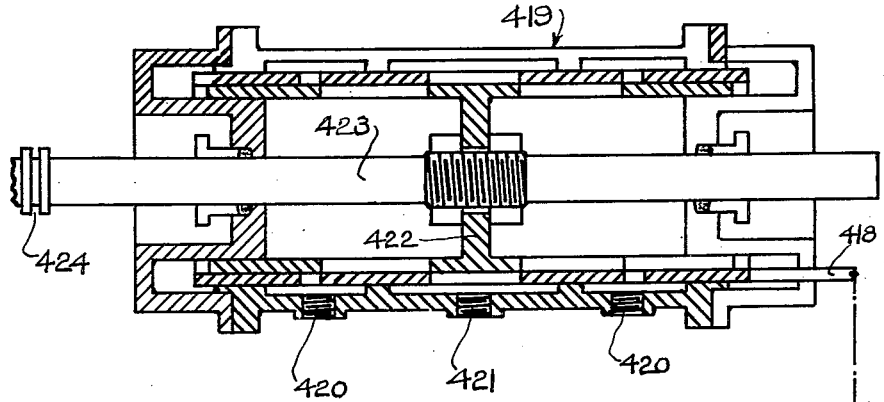
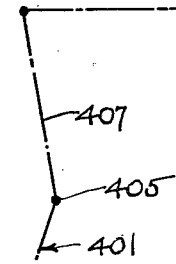
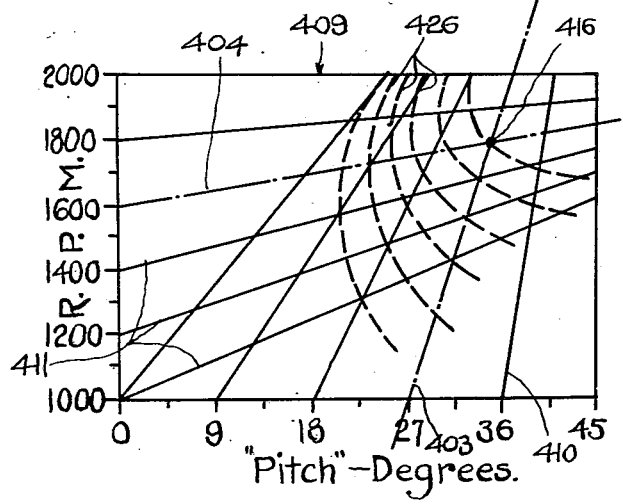
To rheostat 133 of Fig.1 (Serial No.459336) or to speed control of control unit 244 of Fig.19 (Serial No.459336): or to other speed synchronizing control.
Inventor:

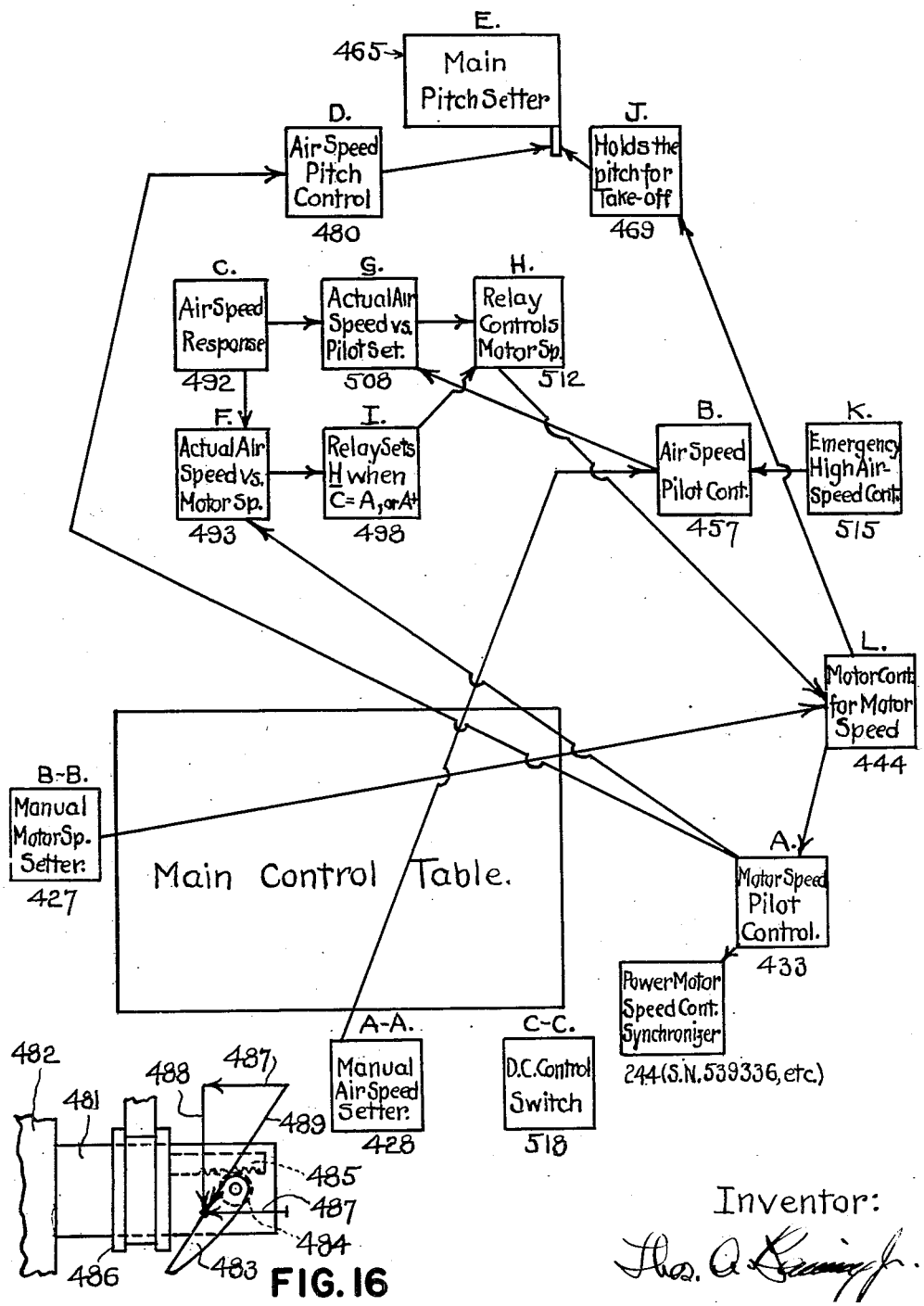

June 4, 1957

T. A. BANNING, JR 2,794,507

SYNCHRONIZING SYSTEM FOR PLURAL PROPELLERS
WITH PITCH AND FUEL CONTROL

Original Filed Jan. 18, 1945

Inventor:

June 4, 1957 T. A. BANNING, JR 2,794,507
SYNCHRONIZING SYSTEM FOR PLURAL PROPELLERS
WITH PITCH AND FUEL CONTROL
Original Filed Jan. 18, 1945 14 Sheets-Sheet 10

Inventor:

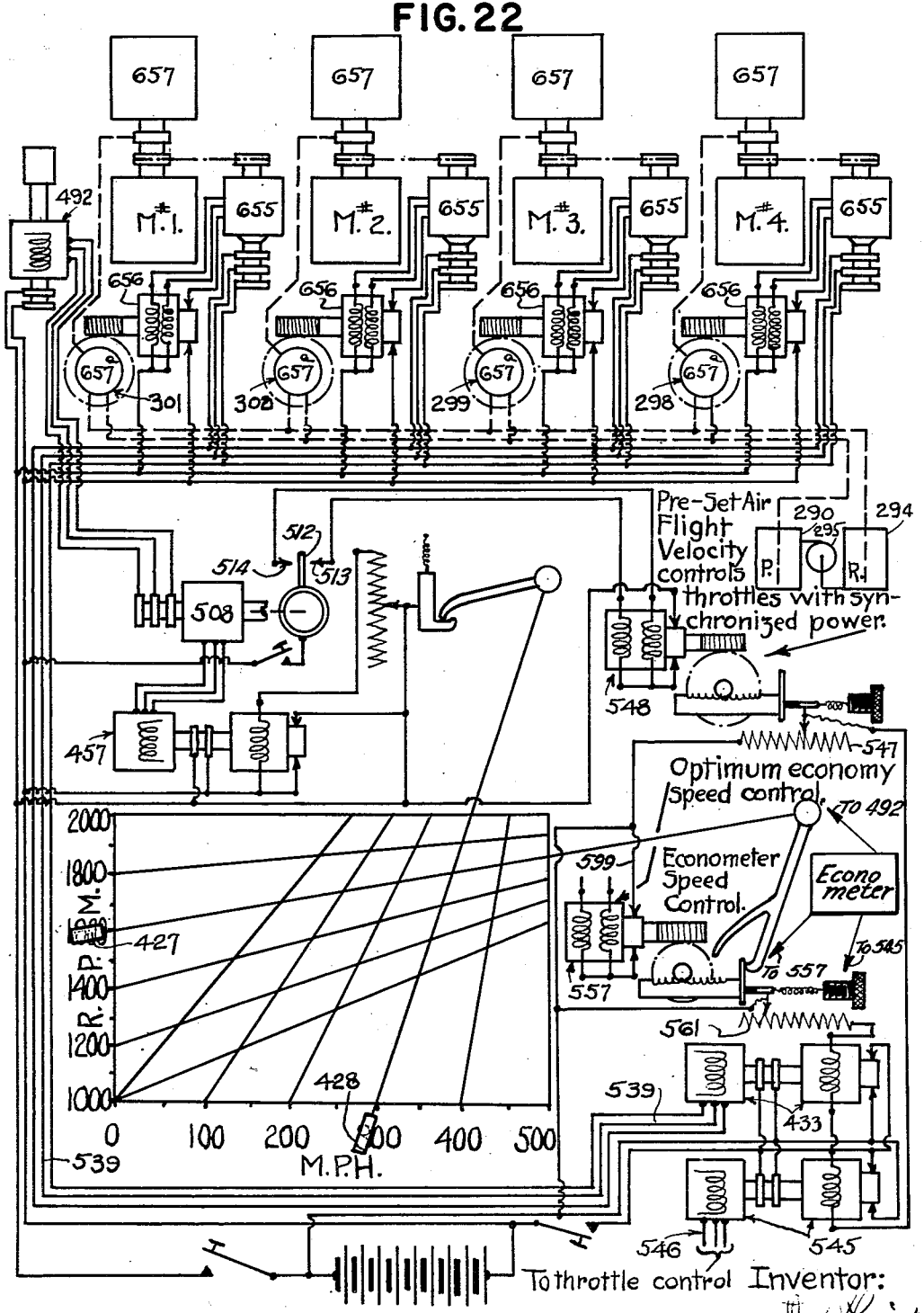

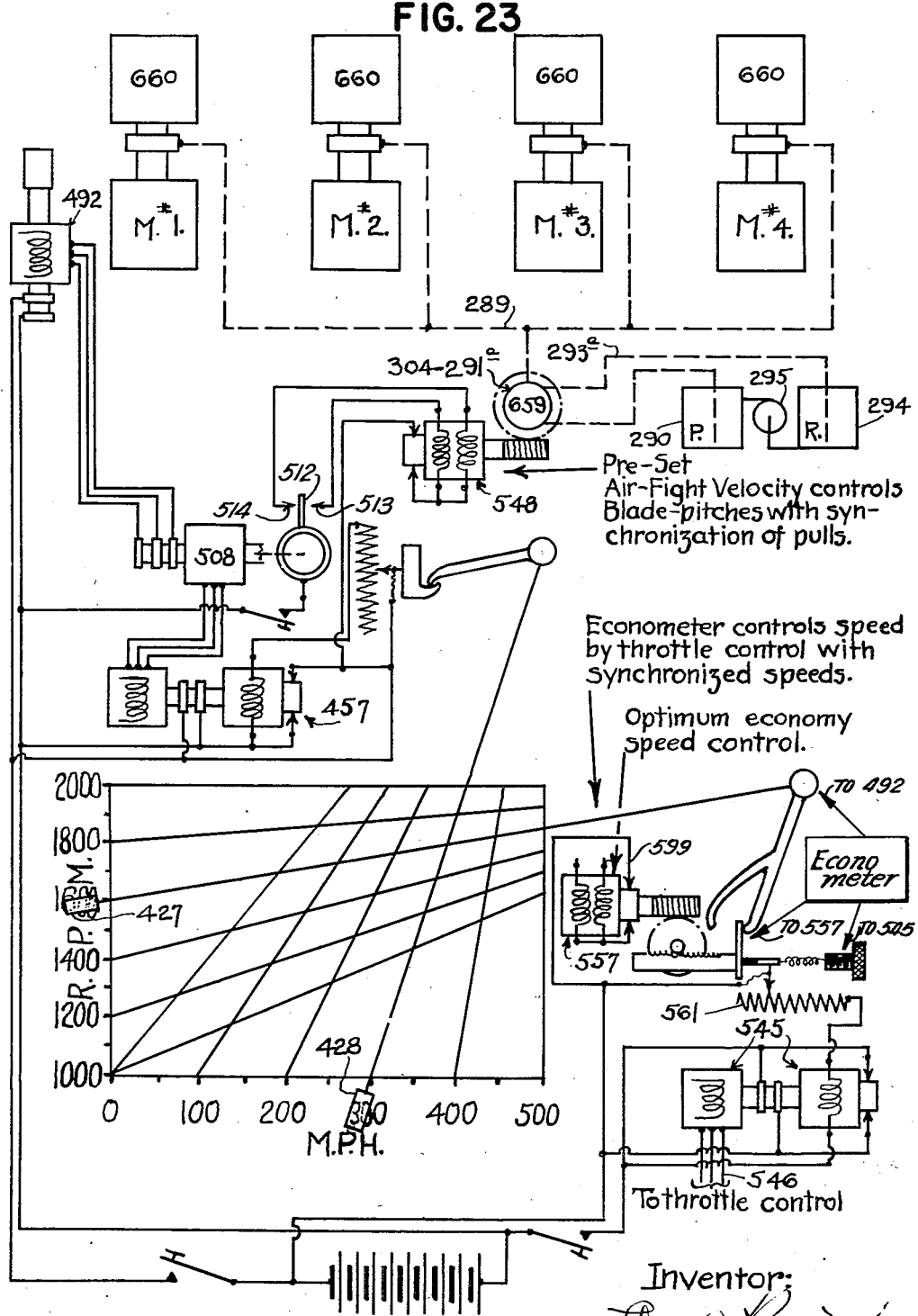

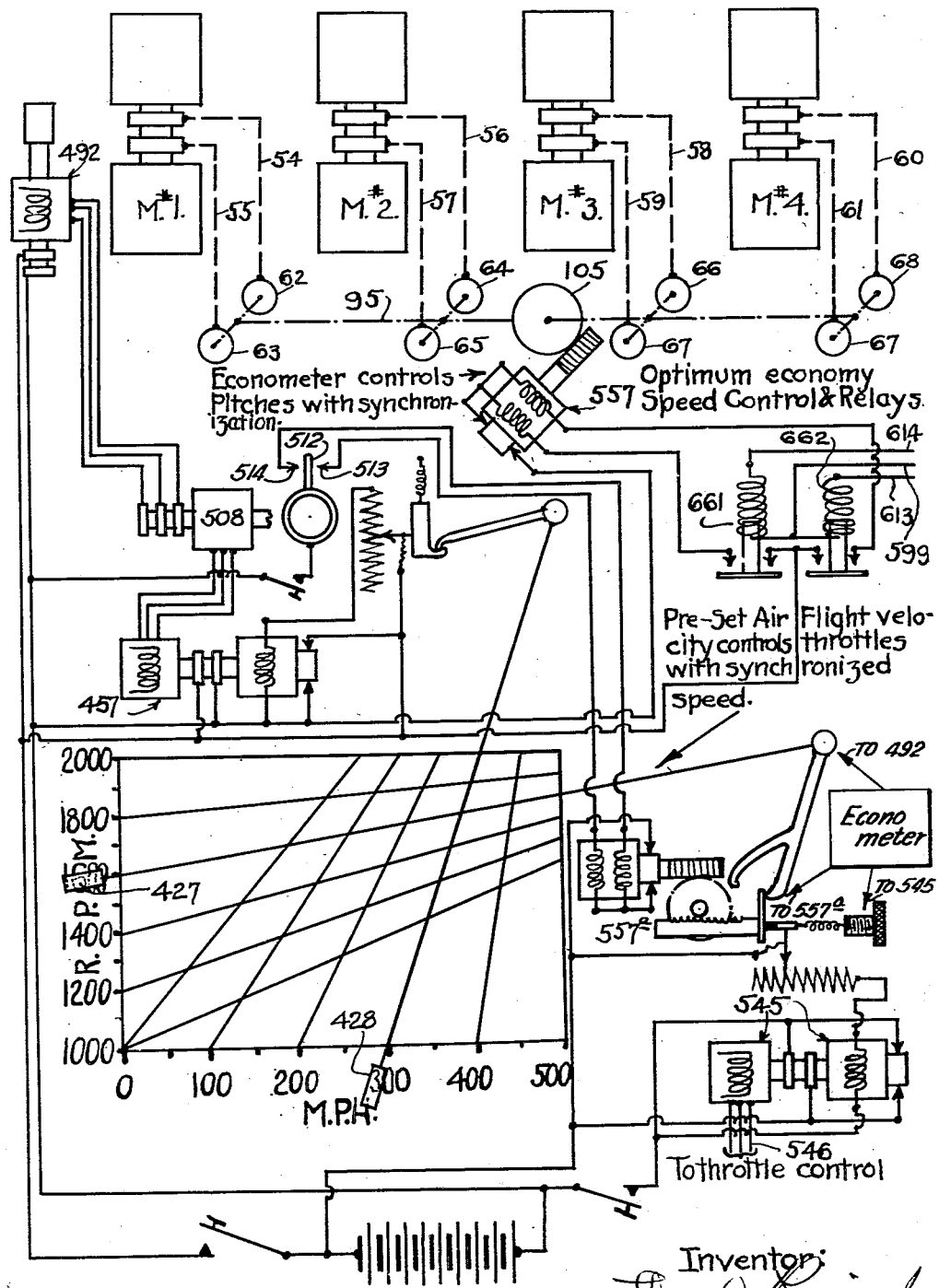

June 4, 1957 T. A. BANNING, JR 2,794,507
SYNCHRONIZING SYSTEM FOR PLURAL PROPELLERS
WITH PITCH AND FUEL CONTROL
Original Filed Jan. 18, 1945 14 Sheets-Sheet 14

Inventor:

United States Patent Office 2,794,507
Patented June 4, 1957

2,794,507

SYNCHRONIZING SYSTEM FOR PLURAL PROPELLERS WITH PITCH AND FUEL CONTROL

Thomas A. Banning, Jr., Chicago, Ill.

Original application January 18, 1945, Serial No. 573,382. Divided and this application September 26, 1951, Serial No. 248,340

36 Claims. (Cl. 170—135.29)

This invention relates to improvements in controls for airplanes, and the like. The controls hereinafter disclosed relate to controls of power motor speed, blade pitch, throttle setting, and other functions of the power drive mechanism. These controls are for various purposes, including simplification of the pilot's duties, and improvement generally in the power generation and delivery functions. As will appear hereinafter, a very important feature and object of the invention relates to the provision of means to automatically cause the pitch and/or rotative sped of the propeller-motor units to automatically be adjusted continuously or from time to time to the pitch and rotative speed values which will maintain the speed of the ship at a predetermined value and under the conditions of maximum or optimum economy of ship movement. That is, the rotative speed and blade pitches are automatically adjusted continuously or from time to time to those values which will produce the maximum miles per gallon (or minimum gallons per mile) of ship flight at any pre-selected ship speed. This application is a division of my co-pending application for patent on Improvements in Controlling the Pitch of Blades and Other Functions of Propellers of Multi-Motored Airplanes, and the Like, Serial No. 573,382, filed January 18, 1945 now Patent No. 2,569,444, issued October 2, 1951. That application also makes reference to my co-pending application for patent on Improvements in Synchronizing and Controlling Speed, Power, and other Functions of Multi-Motored Airplanes, and the Like, Serial No. 459,336, filed September 22, 1942 now Patent No. 2,612,956, issued October 7, 1952. The present application, which is a division of Serial No. 573,382, will also make reference to Serial No. 459,336, especially as concerns certain disclosures of Serial No. 459,336 which are referred to in Serial No. 573,382, and as respects certain features of synchronization of speeds and powers.

The traction or driving force which will be exerted by a given propeller depends on various functions, including the rotative speed of such propeller, the bite or pitch which the blades occupy with respect to the fluid medium through which such propeller is travelling and against which such blades must exert their reaction, the density of the medium, air in the case of an airplane; and this density in turn depends principally on the elevation at which the plane is travelling above sea-level, and other factors. The power being transformed by the propeller into the useful work of driving the ship through the medium depends on the traction required for such drive (at the speed and under the various conditions then subsisting), multiplied by such speed, and the power developed by the power motors is of course a function of this useful power, that is, it is the useful power divided by the efficiency of transformation between the power motor (or motors) and the medium through which the ship is travelling.

It is well known that the transformation efficiency of a propeller is a direct function of the pitch at which such propeller's blades are set (taking account of the free flight velocity of the ship in the air), and is also a function of the rotational velocity of such propeller, for given conditions of the medium, such as density, contained moisture, etc. The characteristic curve of efficiency of such a propeller, for a given set of conditions of rotational speed, density of the medium, etc., rises as pitch is increased, to a relatively flat top portion of the curve, and thereafter descends to zero when the pitch has been raised to a characteristic maximum. The free flight velocity of the ship through such medium also affects the form of this curve. For each set of specified conditions of operation (rotational speed, density of medium, etc.) there is a characteristic curve, and a family of these curves can be plotted for such specified set of conditions.

It is also well know that the characteristic curve of traction vs. pitch for such propeller, under a given set of conditions of rotational speed, density of medium, etc., rises from zero for a certain pitch setting of the blades (taking account of the free flight velocity through the medium), to a maximum, which is rather sharply defined in the cases of most propellers of conventional design, and thereafter descends, generally on a curve which is concave upwards, to zero again for a characteristic high pitch angle. Therefore for such specified set of operating conditions and other conditions affecting the flight of the body through the medium the maximum traction or driving force is developed at a specified pitch angle of the propeller's blades, and relatively small departures from such pitch angle setting will result in very substantial reductions of traction and changes of overall efficiency. It is therefore much to be desired that the operations be performed as near this optimum condition of pitch angle as possible in order to secure from the equipment a maximum of effective power transformation, and therefore a maximum of work economy. It must be here observed also that changes of rotational speed will affect the form of the characteristic curve, the pitch at which maximum traction is developed, and the maximum overall efficiency and economy which may be attained for any pre-selected ship speed. Accordingly, both blade pitch and rotational speed must be considered in determining those operational conditions which will result in moving the ship through the medium at the pre-selected speed and with least rate of fuel consumption and corresponding least fuel consumption per mile traversed.

Change of the specified operating conditions, including rotational speed, density of medium, etc., results in change of the characteristic curve of traction vs. pitch, and produces change in maximum traction which will be developed, as well as change in the angle at which such maximum will occur. It is thus possible to plot a family of such characteristic curves of traction vs. pitch, such family being for changes of rotational speed, and other families of like nature may be plotted for other changes of specified conditions, such as density of the supporting medium, etc.

In the case of a multi-motored ship (airplane, for example) the various power units should be synchronized so that they will all operate under the same specified conditions of operation. These operating conditions include rotational speed, developed power, pitch angles, traction developed, and other functions. The prior art discloses various means for securing synchronization of speed, and certain speed synchronizing means are also disclosed in my aforesaid co-pending applicaiton, Serial No. 459,336, now Patent No. 2,612,956. That co-pending application also discloses means for securing synchronization of developed powers of the various power motors. Such synchronizations may be effected by variations of blade pitches, throttle settings, etc. Various means for effecting such synchronizations have been disclosed in the prior art, and further means for effecting such synchronizations are also disclosed in said co-pending application, Serial No. 459,336, Patent No. 2,612,956.

It is evident that various groupings of controls may be effected. Thus, control of rotational speed vs. tractive effort or driving force may be secured; or control of rotational speed vs. blade pitch may be secured; or control of rotational speed vs. free flight velocity may be secured; or various other combinations of controls may be secured according to the desired ultimate or end control which is sought. In each of these combinations of controls, or in all of them, it may also be desired to make provision for securing a specified end result, in this, that a specified developed (or transformed) power may be desired, or a specified traction or driving force may be desired; and since production of either such specified power or traction entails controls of two or more functions it is evident that joint controls of such several factors must be made in proper relationship, that is, as one factor is changed, the other factor or factors must be simultaneously changed, and such simultaneous changes must be of proper amounts and in proper directions to still produce the desired end result. The production of such multiple changes may be effected manually, either by individual controls for the several power units, or in gang; but such manual controls become more and more complex and difficult to interrelate, with increasing complexity due to increasing numbers of propellers and power units for larger and larger ships.

It is an object of the present invention to make provision for joint controls of two or more of the essential functions of the power units, such as joint control of rotational speed vs. traction or driving force, for specified "power" developed, or joint control of rotational speed vs. blade pitch of the propellers, for specified traction or driving force developed, or other forms of joint controls. It is a further object of the invention to effect such several joint controls with simultaneous synchronization of the proper functions of the several power units to ensure properly synchronized operations, and under the joint controls selected.

More specifically, and as an important feature of the present invention, it is an object to secure joint controls of the selected functions for specified or adjusted conditions of rotational speed vs. free flight velocity of the ship within the supporting medium. While maintaining specified rotational speed of the propeller or propellers, maintainance of specified free flight velocity requires adjustment of blade pitch from time to time to maintain the traction requisite for such free flight velocity, and it is an object of the invention to make provision for securing such result. In case of change of various flight conditions the attainment of the optimum condition of least fuel consumption per mile traversed may and probably will require change of rotational speed as well as pitch. The following disclosures include the means to effect such changes automatically. In case of change of the specified free flight velocity by a control unit which determines such free flight velocity the rotational speed or the blade pitch or both, may and probably will require change in order to maintain the ship at such changed free flight velocity under the optimum condition of at least fuel consumption per mile traversed. The disclosures herein contained embody the means to attain those results. It is a further object in this connection to secure the foregoing results while at the same time ensuring synchronization of propeller rotational speeds; and a further object in this connection is to secure this result while maintaining synchronization of powers developed by the several power motors. In this case the driving force exerted on the ship as a whole is always the summation of the driving forces exerted by all the power motor units in service, and that total driving force is to be maintained at value correct to maintain the desired and pre-selected free flight velocity of the ship.

It is a further object to produce the results just above enumerated with synchronization of powers of the several power units, such power synchronization of powers being produced either by throttle controls or by blade pitch controls of the several power units.

A further and important feature of the present invention relates to the provision of a joint control arrangement such that the free flight velocity of the ship may be maintained automatically at a specified or pre-selected value, with a minimum consumption of fuel by the power motors. For example, if it be desired to maintain a free filight velocity of selected value, such as 400 miles per hour, it is an object of the invention to provide means whereby such pre-selected and pre-set velocity of the ship will be maintained with the power motors and propellers operating under those conditions which will require a minimum consumption of fuel at all times, thereby making it possible to drive the ship between selected terminals with a minimum consumption of fuel, while maintaining such pre-selected free flight velocity, to thus ensure maintainence of a selected schedule.

In connection with the foregoing it will be recalled that pitch variation results in change of efficiency of the motor-propeller unit considered as a power converting unit, and therefore change of pitch under specified operating conditions results in change of such conversion efficiency; or, viewing the matter from another angle, in order to maintain maximum conversion efficiency it is desirable to be able to operate the propellers at all times under such conditions as to operate at the peak of the efficiency characteristic curve of the motor-propeller units. Since for any given motor propeller unit there exists a family of such characteristic curves of efficiency vs. pitch angle, it follows that whenever the several operating conditions, such as rotational speed, density of medium, etc. change it becomes necessary to change the propeller pitch and for rotational speed in order to maintain the maximum or optimum efficiency condtion of power conversion, while still maintaining the pre-selected free flight velocity of the ship. It is an object of the present invention to make provision for securing this result at all times, fully automatically, after the pilot has brought his ship into free flight condition, and with the sole requirement that the pilot pre-set the ship speed control to the desired free flight velocity. Thereby it will be possible to drive the ship between two selected terminii at a pre-selected average speed, and with a minimum of fuel conconsumption. It is a further object in this connection to provide means whereby this result may be secured while maintaining synchronism of the several power units for rotational speed, developed powers, and blade pitches of their respective elements.

It is a further object in connection with the foregoing feature to make provision for such synchronization by use of previously devised and well known forms of synchronizing means, thus adapting the features of the present invention to previously known and used forms of such synchronizing elements, while still securing the desired objects of the present invention.

It is a further object in connection with the foregoing object of providing means to secure free flight velocity at optimum economy conditions, to make provision for synchronizing the several propellers for blade pitch, that is, to secure said result with further provision for ensuring that the pitches of the blades of the several propellers are synchronized at all times, so that they are all operating under the same conditions of pitch adjustment.

A further feature of the present invention is to provide a special unit which is capable of detecting departure of the operating conditions of the power units from those conditions which give optimum economy of operation, and which unit is provided with means to make such corrections as are needed to restore the operating conditions of the power units to the maximum or optimum economy conditions, namely, those conditions under which the minimum fuel consumption is demanded consistent with maintainence of the pre-selected free flight velocity condition.

Specifically this economy detection unit is so arranged as to continuously determine the ratio of free flight velocity to fuel consumption, and to continuously set its movable control to a position or changing position corresponding to such changing ratio, and is further provided with means to then effect the required corrections of operating conditions to restore the ratio so determined to the maximum or optimum condition attainable for the selected and pre-set free flight velocity, and taking into account the fact that the characteristic curve of economy vs. pitch angle depends on the factors of free flight velocity selected, density of medium, and other factors, and also taking into account the fact that each such curve of a family of such curves carries its own peak value and pitch position. This means also takes account of the fact that characteristic curves of economy vs. propeller rotational speeds carry peaks, and that there is a family of such curves for each selected set of operating conditions, and said means makes provision for continuously selecting the values of the variables (propeller rotational speed and propeller pitch) which will ensure maximum economy of operation for the then existing operating conditions of the propeller or propellers.

Other objects and uses of the invention will appear from a detailed description of the same, which consists in the features of construction and combinations of parts hereinafter described and claimed.

In the drawings:

Figure 1 shows a typical characteristic curve of traction vs. blade pitch, showing how the traction rises with increase of pitch up to a peak value and then descends as the pitch is increased further;

Figure 2 shows a typical characteristic curve of traction vs. blade pitch, showing a modified curve which is typical of a form of blade pitch control device in which there is provided a spring element working on the blade stub carrier in the direction of traction produced by the rotation of the propeller itself as shown for example in my co-pending application Serial No. 573,382, now Patent No. 2,569,444, of which case the present application is a division;

Figure 3 shows a fragmentary longitudinal section through a blade pitch control device in which the blade stubs are carried by an element which may be shifted back and forth on the propeller shaft, against or with the direction of traction produced by the propeller, and in which such movements serve to vary the blade pitch with reduction of pitch with movement in the direction of traction, and in which device the traction produced by the rotation of the propeller is balanced by a controllable but uniform resistance in the form of a movable abutment the value of whose resistance to movement is controllable, and remains constant as said abutment moves back and forth at such adjusted value or amount;

Figure 6:
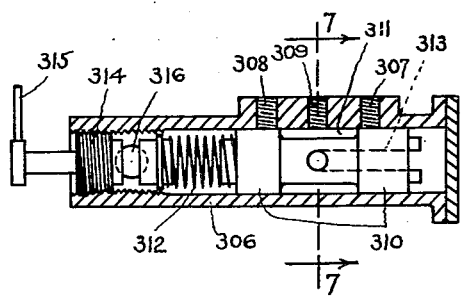
Figure 7:
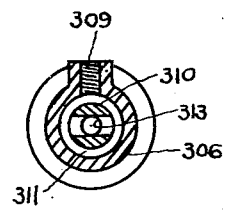
Figure 12:
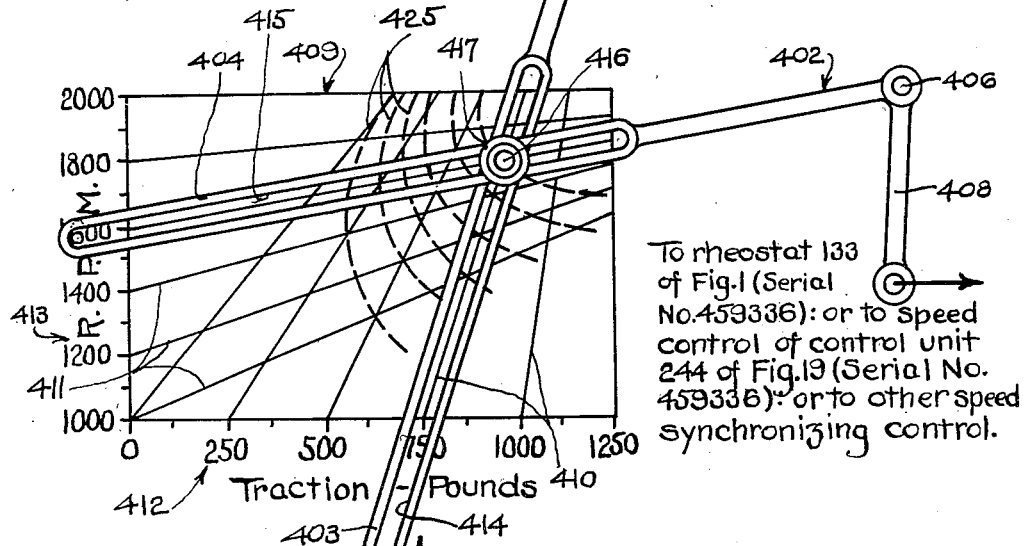
Figure 13:
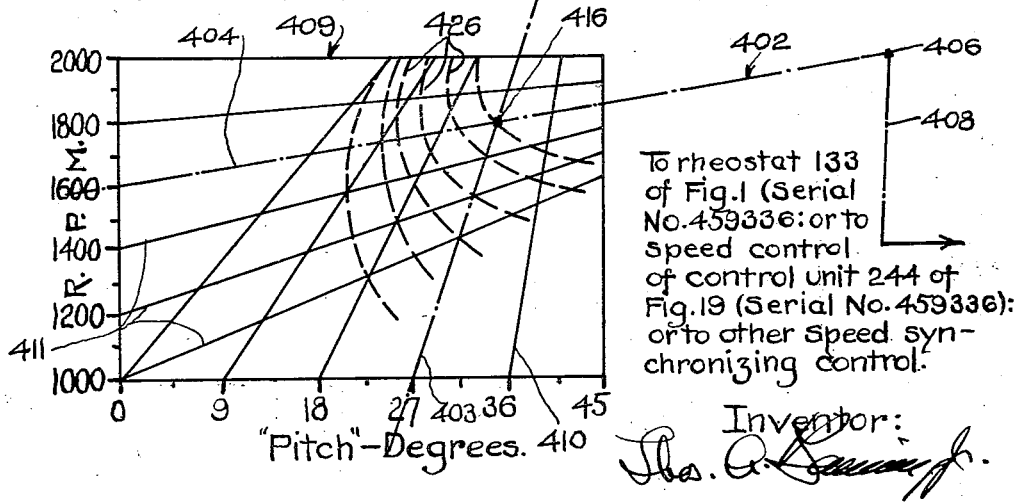
Figure 15:
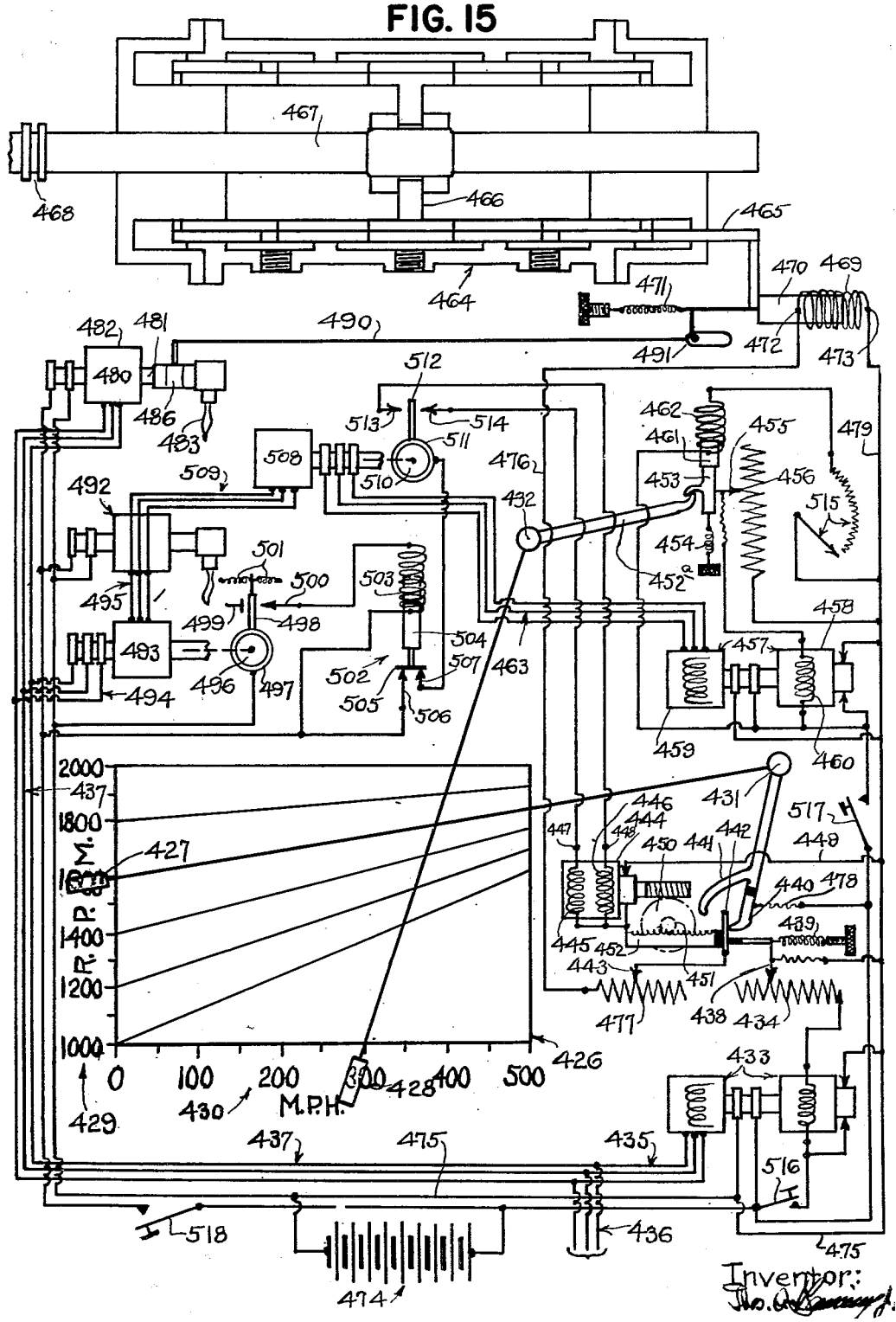

Figure 6 shows a longitudinal section through a form of pressure reducing valve which is capable of maintaining the fluid pressure on the delivery end of such valve at a constant but adjustable value, even for flows of fluid away from or back to such valve from a receiving element or device ,and when there is connected to said valve a source of fluid pressure at least as great as the desired delivery pressure;

Figure 7 shows a cross-section taken on the line 7—7 of Figure 6, looking in the direction of the arrows;

Figure 8 shows schematically one set of oil or fluid connections for control of the blades of a set of propellers having variable pitch blades, which blades are shiftable in direction parallel to the direction of traction produced by such propeller, and which propellers are provided with movable abutments which establish constant but controllable resistances to movement under such traction force, which resistances may be controlled or re-set in value from time to time; and this figure shows a gang control arrangement such that the tractions of all the propellers of such gang may be simultaneously controlled for a selected traction value by use of a single valve;

Figure 9 shows another schematic arrangement, wherein each of the propellers may be individually controlled from its individual control valve;

Figure 10 shows still another schematic arrangement, wherein both pusher and puller propellers are provided in two gangs, each gaing being individually controlled by its own control valve;

Figure 11 shows still another schematic arrangement, wherein the propellers embodying features of the present disclosures may be used in connection with a form of servo-motor device which is capable of ensuring true synchronism of pitch of the blades of a number of variable pitch blade propellers;

Figure 12 shows more or less schematically a joint control for two of the functions, namely speed and traction or driving force enabling control and synchronization of these two functions by use of a single control handle or button convenient to the pilot or operator; said joint control being suitably marked to show these functions, and also being provided with supplemental markings or iso-lines to indicate lines of equal power developed by the power-motor-propelled ship;

Figure 13 shows more or less schematically another joint control similar to that of Figure 12, but for controlling and synchronizing speed and pitch of propeller blades by use of a single control handle or button; and being suitably marked corresponding to these functions, and also being provided with lines or iso-lines to indicate lines of equal traction or driving force;

Figure 14 shows another schematic arrangment as a modification of that of Figure 13, and for controlling speed and pitch by another form of pitch control and synchronizing than that of Figure 13;

Figure 15 shows schematically a control arrangement whereby by use of a single control handle the rotative speed of the power-motor-propeller units during take-off may be preset, and whereby the air speed of free-flight may also be preset, the arrangement being such that synchronism of all the units will be automatically maintained, and whereby the pitches of the propeller blades will at all times be automatically maintained and controlled at those values proper for the pre-set conditions of operation, and the arrangement also making provision for certain other desirable results and features of operation; and this figure also indicates the connections from the units shown in this figure to the meters which meter the rate of fuel supply to the several power motors and comprise a portion of the synchronizing and controlling means, said meters and associated elements being fully illustrated and disclosed in the aforesaid application Serial No. 459,336, now Patent No. 2,612,956.

Figure 18:
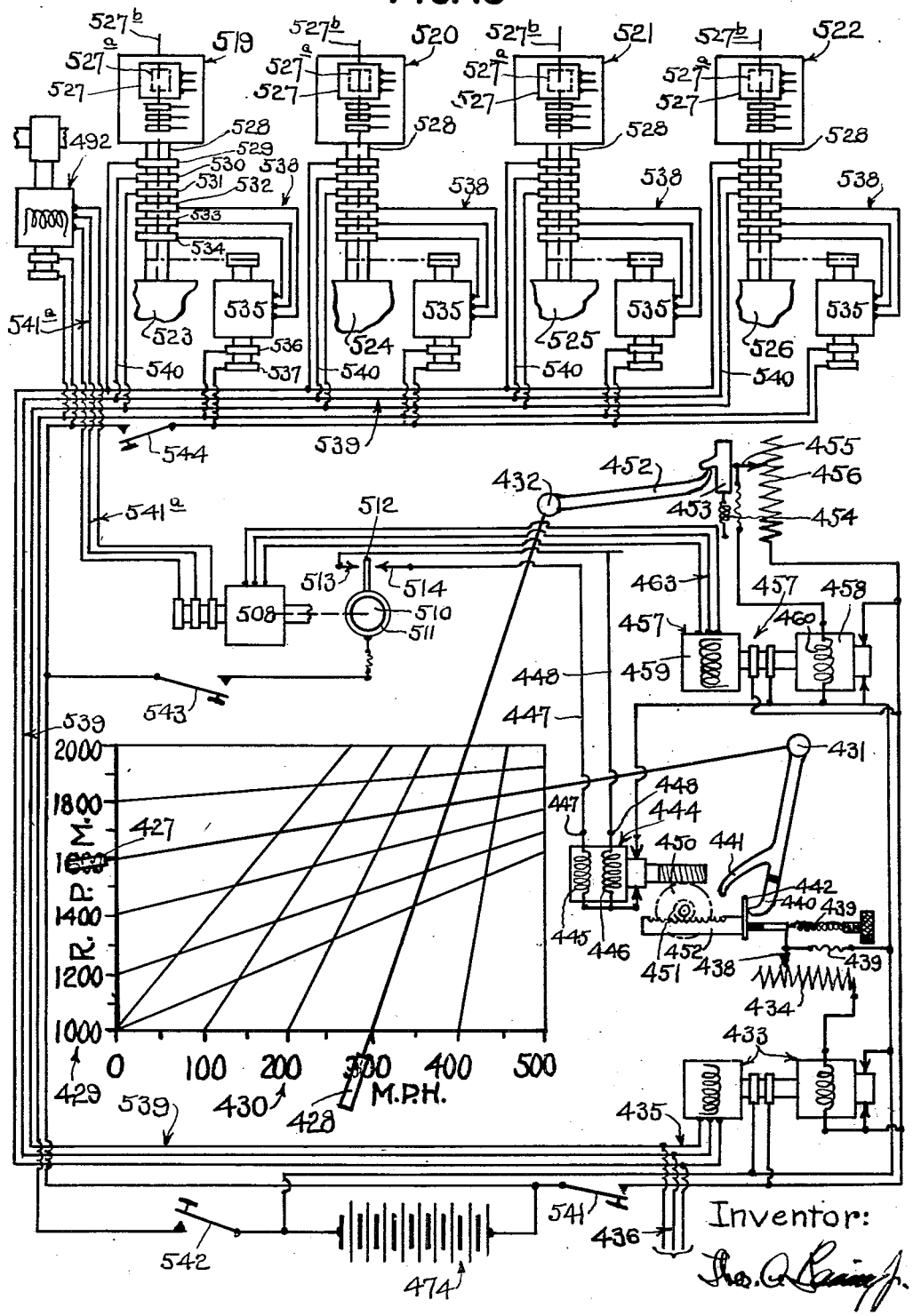

Figure 16 shows schematically a simple form of air-speed pitch control unit for use in connection with the scheme of Figure 15;

Figure 17 shows in simple form a "flow-sheet" or diagram illustrating the sequences of transfers of effects from various units of the arrangement of figure 15 to other units of that scheme;

Figure 18 shows schematically another control arrangement incorporating certain of the features of the scheme of Figures 15, 16 and 17, but making use of electrical units for effecting the actual blade pitch changes, said units being of well known type, and being combined with other elements and units of the present invention in a novel manner to produce new and unexpected results; and this figure also indicates the connections from the units shown in this figure to the meters which meter the rate of fuel supply to the several power motors and comprise a portion of the synchronizing and controlling means, said meters and associated elements being fully illustrated and disclosed in the aforesaid application Serial No. 459,336, now Patent No. 2,612,956.

Figure 4:
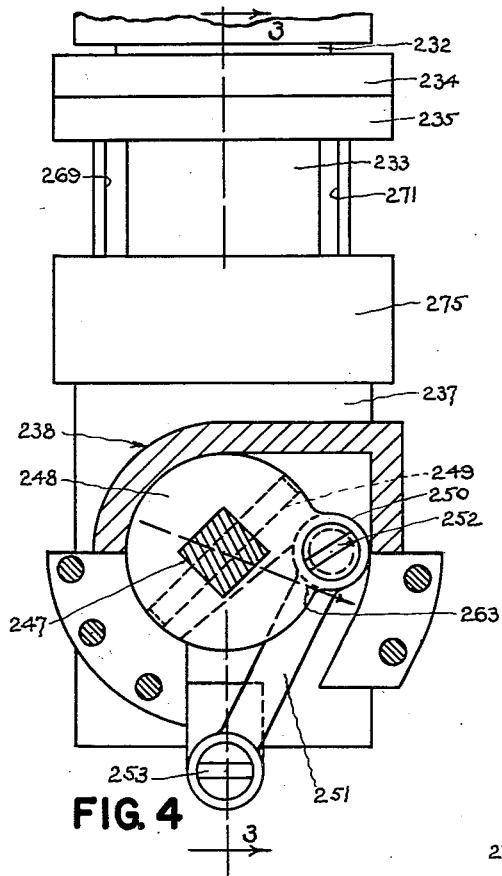
Figure 4 shows a cross-section taken on the line 4—4 of Figure 3, looking in the direction of the arrows, the blade stub carrier being in its rearmost position, and with the blade pitch at maximum value.
Figure 5:
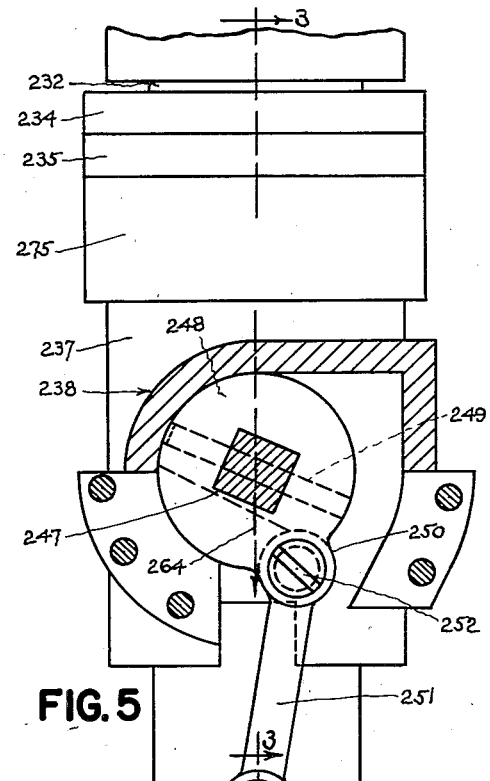
Figure 5 shows a cross-section similar to that of Figure 4, and also taken on the line 5—5 of Figure 4 looking in the direction of the arrows, but with the blade stub carrier shifted forwardly to its full forward position and with the blade pitch correspondingly reduced to a low or zero value.
Figure 3:
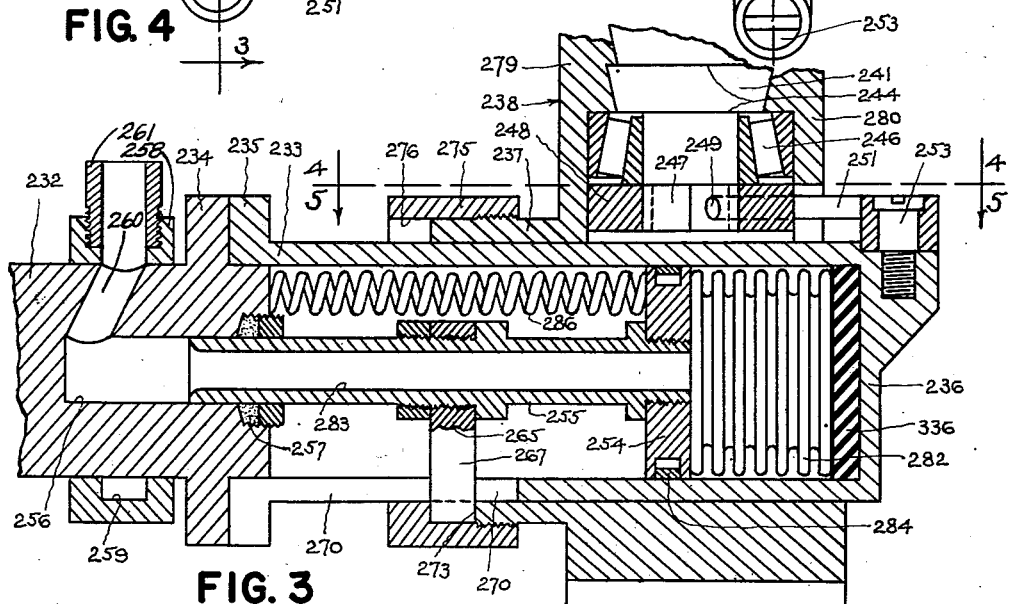
Figure 19:
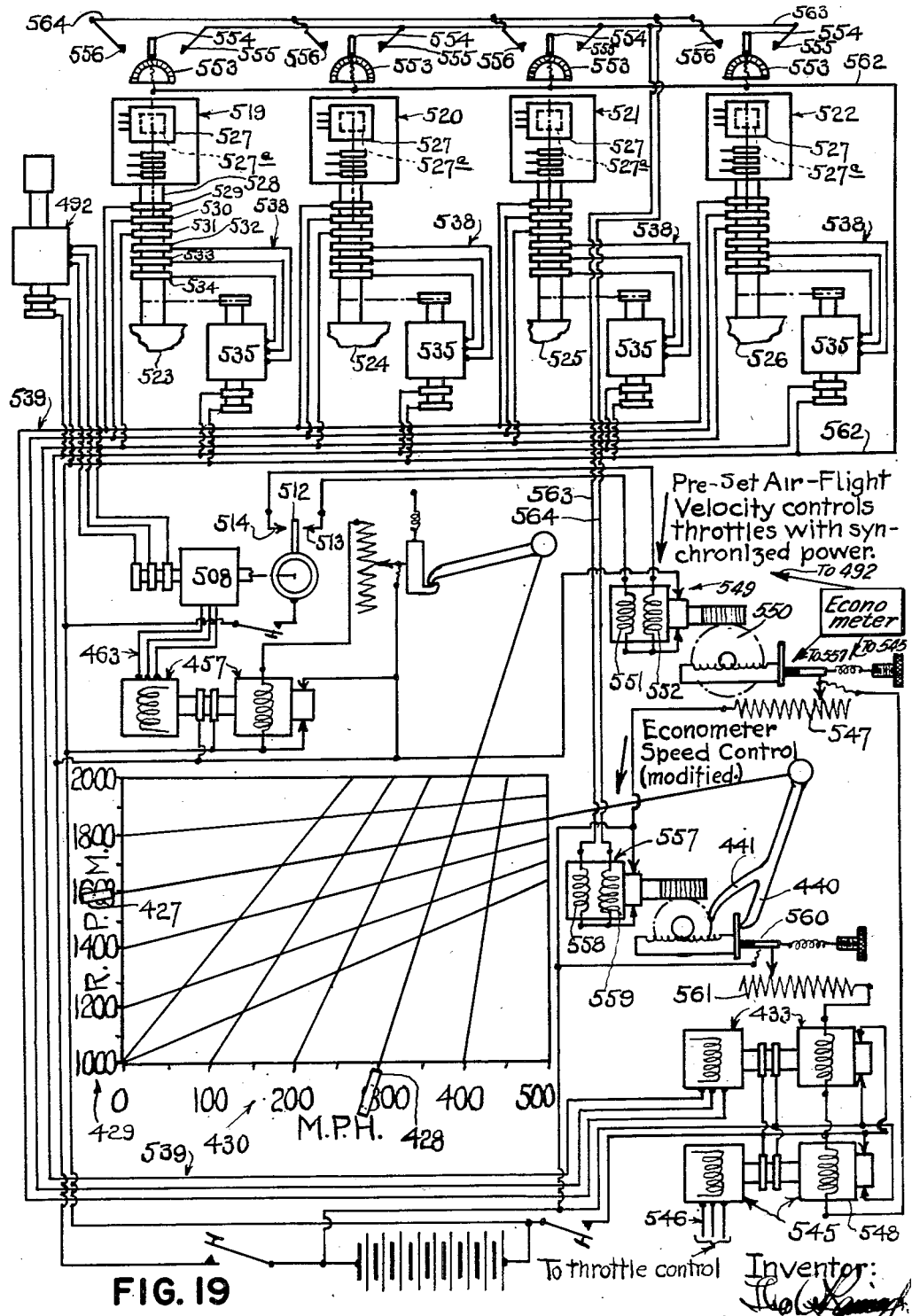
Figure 21:
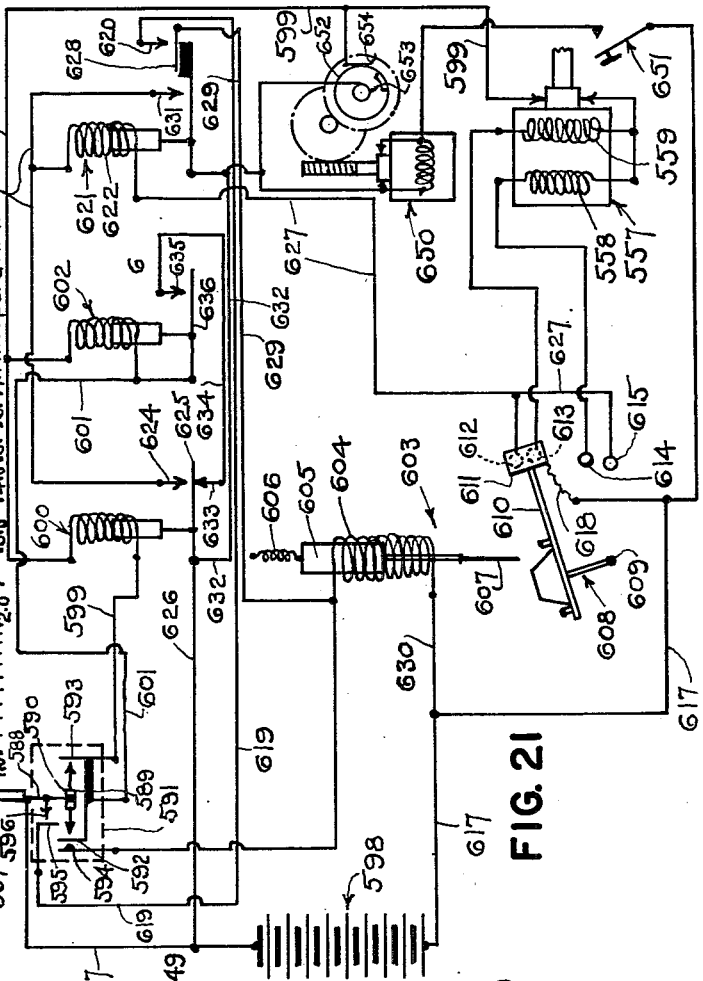
Figure 20:
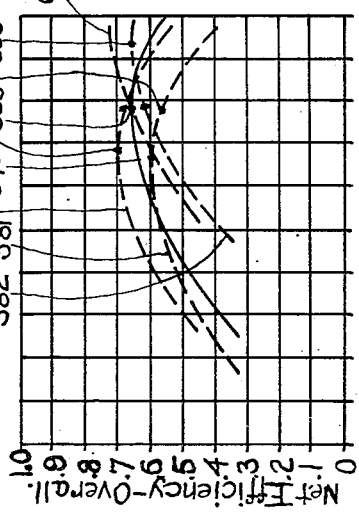

Figure 19 shows schematically another control scheme in which the setting of the free-flight velocity handle serves to ensure delivery at all times of that amount of power, within the power range of the several power motors, necessary to maintain such pre-determined free-flight velocity of the airplane, provision being made for synchronizing the power-motor speeds, and also for spnchronizing the powers delivered by the several power-motors while maintaining such pre-determined free-flight velocity this figure showing the connections from the units shown in this figure to the meters which meter the rate of fuel supply to the several power motors and comprise a portion of the synchronizing and controlling means, said meters and associated elements being fully illustrated and disclosed in the aforesaid application Serial No. 459,336, now Patent No. 2,162,956;

Figure 20 shows several typical performance curves of an airplane equipped with propellers, and shows how the economy of operation, over-all, may vary under different operating conditions (such as variation of blade pitch, variation of height above set-level etc.), with variation of rotational speed of the propellers, these curves constituting a family of such performance or characteristic curves;

Figure 21 shows a schematic layout of what I here term an "Econometer unit" by which provision has been made for automatically comparing free-flight velocity with rate of fuel consumption, to determine the economy of operation (as an example in gallons per mile or in miles per gallon or per hundred gallons), and for automatically readjusting the power-motor speeds or blade pitches from time to time to maintain these speeds or pitches at the values which will give maximum economy of operation, so that the pre-selected velocity of free-flight may be maintained under the conditions of least fuel consumption consistent with the then existing operating conditions; the scheme of Figure 21 being usable in connection with that of Figure 10, for example, as well as Figures 22, 23 and 24, to establish a complete layout for also automatically controlling and synchronizing propeller blade pitches, power-motor generated powers, and other functions of the problem;

Figure 22 shows schematically an arrangement wherein the setting of the control handle for free-flight velocity serves to effect control and synchronization of power-motor powers to maintain that desired free-flight velocity, and wherein the rotative speeds of the several power-motors are controlled and also synchronized by the functioning of the "econometer," such as that shown in Figure 21, use being made of hydraulic blade-pitch controls incorporating relays such as the type shown in Letters Patent, No. 2,217,856, to Brady, by way of example only, the blade-pitches of the several propellers in Figure 22 being individually controlled; and this figure also indicates the connections from the units shown in this figure to the meters which meter the rate of fuel supply to the several power motors and comprise a portion of the synchronizing and controlling means, said meters and associated elements being fully illustrated and disclosed in the aforesaid application Serial No. 459,336, now Patent No. 2,612,956;

Figure 23 shows schematically an arrangement wherein the setting of the control handle for free-flight velocity serves to effect control and synchronization of the pitches of the blades of the several propellers to maintain that desired free-flight velocity, and wherein the rotative speeds of the several power-motors are controlled and also synchronized by operation of the econometer, such as that shown in Figure 21, use being made of gang hydraulic blade-pitch control, for example, such as shown in Figures 3, 4 and 5 of this case; the blade-pitches being automatically balanced against traction of driving force needed to maintain the desired free-flight velocity; and this figure also indicates the connections from the units shown in this figure to the meters which meter the rate of fuel supply to the several power motors and comprise a portion of the synchronizing and controlling means, said meters and associated elements being fully illustrated and disclosed in the aforesaid application Serial No. 459,336, now Patent No. 2,612,956.

Figure 25:
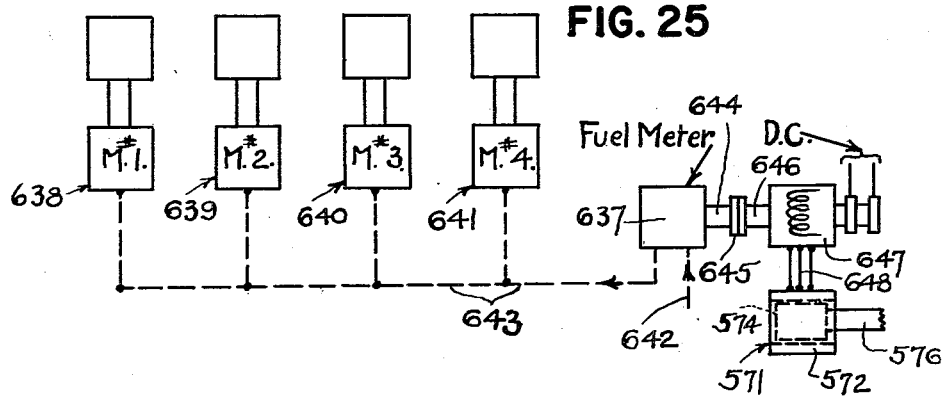
Figure 26:
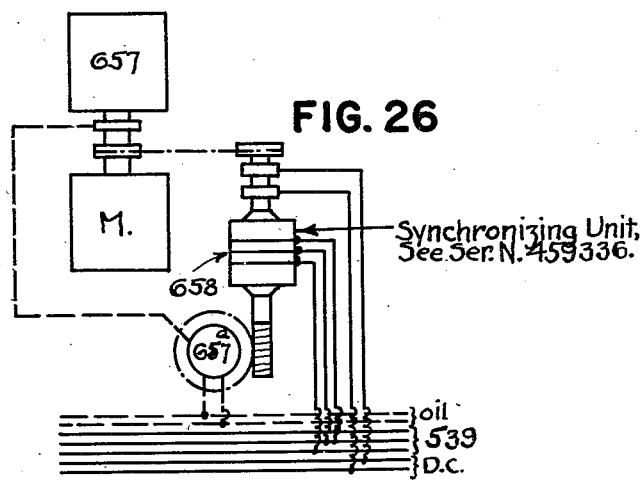
Figure 27:
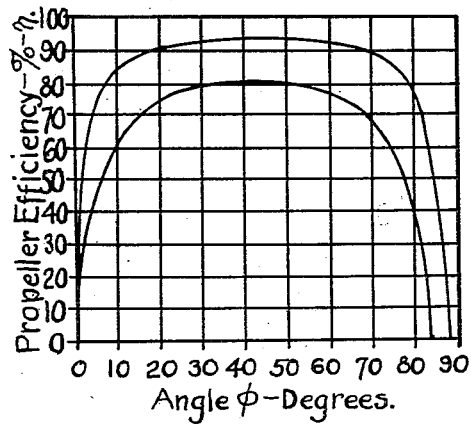

Figure 24 shows schematically an arrangement wherein the setting of the control handle for free-flight velocity serves to effect control and synchronization of power-motor speeds to maintain that free-flight velocity, and wherein the pitches of the blades of the several propellers are controlled by the econometer, such as that of Figure 21, use being made of blade-pitch synchronization such as that of Figure 11 of the present case; and this figure also indicates the connections from the units shown in this figure to the meters which meter the rate of fuel supply to the several power motors and comprise a portion of the synchronizing and controlling means, said meters and associated elements being fully illustrated and disclosed in the aforesaid application Serial No. 459,336, now Patent No. 2,612,956;

Figure 25 shows a modification or detail wherein there is provided a fuel meter in the main fuel supply line to determine rate of fuel consumption for operation of the econometer of Figure 21;

Figure 26 shows a modification of Figure 22 wherein use is made of synchronizing control units of the type shown in my co-pending application, Serial No. 459,336, now Patent No. 2,612,956; and Figure 27 shows a set of typical characteristic curves of relation of propeller efficiency to blade-pitch thereof, being a family of such curves.

In a convention application of the features of the present invention which are concerned with the provision of automatic controls to produce the maximum economy in miles per gallon or minimum gallons per mile, when the propulsion means includes variable pitch propellers, I contemplate the application of said features of invention to such variable pitch drives without limitation to any specific arrangement of pitch control, per se, except as I may limit myself in the claims to follow. I have, however, in the present application, by way of example of one form of variable pitch arrangement, shown a variable pitch propeller of the general type also shown in said application Serial No. 573,382, now Patent No. 2,569,444. For convenience I shall first describe such variable pitch construction as follows:

The blade pitch control device shown in Figures 3, 4 and 5 hereof, by way of illustration, only, is of such construction that the traction or driving force developed by the propeller rotation tends to shift the blade stub carrier in the direction of such traction with a force proportionate to such traction, and this control device is also provided with means to resist such movement of the blade stub carrier by imposition of a controlled amount of force to resist such movement. Such controlled force is so exerted that the blade stub carrier is nevertheless able to actually effect such movement in the direction of the developed traction, but the arrangement is such that said controlled resisting force is maintained constant during such movement. The movement of the blade stub carrier also serves to change pitch angle, such change being a reduction of pitch angle when the movement is in the direction of the tractive force, and being an increase of pitch angle when the movement is against the direction of the tractive force. All such effective movements are produced only within that range of pitch angles of the characteristic curve in which increase of pitch angle causes increase of tractive force, that is, on the rising portion of the characteristic curve. This control device of Figures 3, 4 and 5 is also provided with means to take care of blade stub carrier movements beyond such rising portion of the characteristic curve, so that the device can never move to a position where "control" is lost. The device shown in Figures 3, 4 and 5 is also shown in my co-pending application, Serial No. 573,382, now Patent No. 2,569,444, of which the present case is a division.

Figure 1:
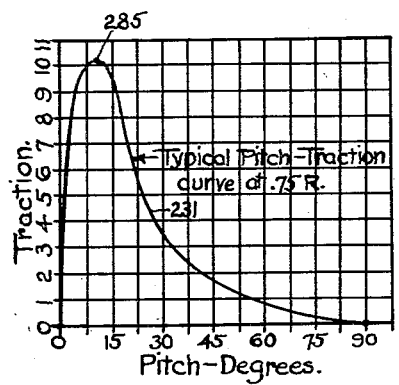

Reference may now be had to Figure 1 which is a typical characteristic curve of variation of traction or driving force developed by a given propeller, with change of pitch angle of its blades. Since the blade form is generally one of varying pitch measured from hub to tip, such curve is conventionally plotted to show the variation of the basis of pitch at .75 radius; and the curve 231 of Figure 1 is a typical curve plotted on that premise. Furthermore, the traction or pull developed by a given propeller will of course depend on the rate of rotation thereof, and the curve of Figure 1 is based on the normal operating speed of the propeller in question.

It will be noted that the traction or pull rises with increase of pitch up to a maximum amount at 12 to 15 degrees, and then falls to zero at substantially 90 degrees pitch. We may assume then that the full feathering position is at 90 degrees, and the drifting position is likewise at that angle. It is also noted that traction rapidly rises from zero degrees to about 12 to 15 degrees, and then falls rapidly for about 15 degrees with a reducing rate of such fall. Reference may now be had to Figures 3, 4 and 5.

In these figures the end portion of the engine shaft is shown at 232. This may be either the engine shaft proper or may be gear driven from the engine shaft as desired. Secured to this shaft end is the hub member 233, for which purpose the adjoining ends are flanged as shown at 234 and 235 so that they may be secured together in suitable manner. The hub member 233 is hollow to its closed outer end 236; and a collar 237 is slidably mounted on such hollow hub. This collar carries the radially extending blade stub receivers 238, 239 and 240 (239 and 240 not appearing in Figures 3, 4 and 5), three such blade stub receivers being mentioned by way of illustration, only. The blade stubs are received in these receivers, and blade stub 241, only, is shown. This blade stub is provided with the annularly outwardly facing shoulders 244 which engage with corresponding reversely facing shoulders of the blade stub receiver to prevent possible out-throw of the blade during running. In the porm shown I also provide a ball bearing 245 (not shown in the figures) around the stub adjacent to the outer end of each retainer; and a thrust roller bearing 246 is placed around the inner end of each stub to normally take the centrifugal force created by the rapid rotation of the propeller. In case of emergency the shoulders 244 will prevent out-throw of the blades, but normally the roller bearing takes the force of the centrifugal operation, and the ball bearing retains the blade stub in alignment. Thus the blade stub may be easily rotated for pitch control.

The inner end of each blade stub is squared as shown at 247, and a circular plate 248 is pinned thereon by an ample cross-section pin 249, so that during running this circular plate bears against the inner race-way of the roller bearing to transmit thrust thereto. This circular plate has at one side an extension 250 which constitutes a crank arm, as will presently appear. A link 251 has its inner end pinned to such crank arm by the pin 252, and said link extends out from the stub retainer to a position adjacent to the end of the hub member 233 where said link is pivoted as shown at 253. It will now be seen that since the collar 237 is slidingly mounted on the hub member 233 so that it can shift back and forth, such shiftings will cause the blade stub to rock with a movement dependent on the extent of sliding movement, the proportions of the crank arm and link lengths and other factors as will be readily apparent.

Within the hollow hub there is slidingly mounted the plunger 254 having the rod 255 which reaches back towards the engine, and said rod 255 is hollow so that oil or other fluid may be placed under pressure against the outer face of the plunger by communication through said hollow rod 255. Said rod 255 works into the passage 256 of the engine shaft 232 with an oil tight fit, preferably sealed by the gland 257; and communication is established between the passage 256 and the outside of the engine shaft by means of the stationary collar 258 having the internal groove 259 communicating with the outwardly extending opening 260 from the passage 256. Thus pressure exerted against the front face of the plunger 254 is controlled from outside the structure and by connection to the collar 258. Such connection is established by the nipple 261.

Now it will be seen that during normal running of the propeller the traction or pull thereof is towards the right in Figure 3 so that oil pressure built up against the front face of the plunger resists such traction, and by setting the oil pressure at a given or predetermined amount the traction which must be generated by the running of the propeller to cause shift towards the right in Figure 3 may be controlled to a desired value. It will also be seen that back and forth movements of the propeller hub and blade stubs are necessarily accompanied by shifts of blade angle or pitch of the blades, due to the link connections already explained.

It is intended that the parts shall be so proportioned that normal tractions exerted by the propeller may be resisted by the oil or fluid pressure with reasonable pressures such as fifty to one hundred pounds per square inch, but the exact proportions will be a matter of individual design. It is furthermore noted that the amount of shift of the hub member 233 provided is sufficient to permit full throw of the blades from "Full feathering" to "Zero pitch angle," being a throw of substantially ninety degrees. It is also noted that the parts should generally be so arranged that when the hub member 233 is in its full forward position the blades are in the zero pitch angle position, and that when the hub member is shifted full backwards the blades are in their full feathering position, a rock of substantially ninety degrees. In Figure 5 the parts are shown in full feathering position, as shown by the arrow 264, and the crank 250 lies somewhat forward of the radial line; in Figure 4 the parts are shown in the full traction angle position, the arrow 263 showing a tilt of substantially fifteen degrees or slightly more (rotation being clockwise when viewed from in front of the propeller), and the crank arm 250 is at substantially right angles (somewhat less) to its position in Figure 5. It will also be seen that in changing from the position of Figure 5 to that of Figure 4 the blade has suffered a pitch angle change of somewhat less than ninety degrees. Another movement counterclockwise (when viewed as in Figures 5 and 4) is provided for, so that the crank arm 250 would move still further over (counterclockwise) than the position shown in Figure 5, and into a reversing pitch angle position. During the full rocking movement the crank arm has suffered a rock of ninety degrees, but at no time has such crank arm been in a dead-center position with respect to the link 251 and pivot pin 253, so that shifts are at all times readily effected. It will also be seen that such shifts of blade pitch have been effected merely by back and forth sliding of the sleeve 237 on the hollow hub. It is furthermore noted that the arrangement is such that such shiftings are effected in such manner that the tendency of the traction or pull of the propeller itself is to cause a reduction of blade pitch, since forward movement of the sleeve 237 due to pull or traction of the propeller tends to rock the blades back towards the zero-pitch position, reducing pitch thereby. It is further seen that such reducing tendency is resisted by the oil pressure against the front face of the plunger 254.

From all the foregoing it is now evident that by setting the oil pressure against the front face of the plunger at a predetermined value by means of a device which will maintain such pressure value while at the same time allowing for oil movements due to back and forth shiftings of the plunger 254, we shall be able to automatically maintain the propeller with a predetermined pull or traction, dependent on the established oil pressure, and any condition which tends to increase the pull or traction will automatically cause the propeller to shift to a position where that traction is again developed, or vice versa. It is, however, to be noted that in case it is desired to maintain the blade pitches at a given value irrespective of pull or traction being developed, this result may be secured by forcing oil into the cylindrical space before the plunger 254, and locking said oil therein, to thereby maintain the blades at the predetermined pitch and without allowing them to shift back to a condition of lesser pitch.

It is also noted that this arrangement is such that the tendency of the pull or traction is always to reduce pitch, and that the total force which must be resisted by the pressure of the oil against the plunger face is equal to the total traction or pull being developed by the propeller. Also, that the traction or pull of the propeller is transmitted to the hub for transmission to the airplane, through the medium of the oil and plunger arrangement. This result is secured as follows:

The plunger rod 255 carries a collar 265 having the outwardly extending arms such as 267, which reach through the slots such as 270 of the hub member 233, and the outer ends of these arms are received in notches such as 273 of the collar 237. The ring 275 is threaded onto the end portion of said collar to retain said outer arm ends in place in such notches, and to lock the parts together. It is here noted that for purposes of assembly the ring 275 is also provided with notches such as 276, which will pass the outer ends of the arms during assembling of the parts; but said ring should then be brought to a final position of rotation such that the outer ends of the arms are locked in position as shown in Figure 3. It is thus seen that these arms perform two functions; they transmit forces of rotation from the hub member 233 to the blade stub receivers, and thus drive the blades; and also they transmit pull or traction forces from the blades to the hub member, and thus secure the transmission of the traction or pull to the airplane; and all these results are accomplished while also permitting the blades to set themselves back and forth to automatically adjust their pitches as above shown.

As a matter of design and to permit assembly of parts, I prefer to split the blade stub receivers, one portion 279 of each of them comprising a portion of the collar 237; and the other portion 280 of each of these blade stub receivers being secured in place by suitable means such as screws or the like. Preferably, also, such splitting is effected on a plane normal to the axis of rotation, as shown in the figures. Furthermore, a collar, not shown, may be threaded onto the outer ends of these split portions to further assist in holding them together.

In Figure 3, in particular, I have shown the Sylphon 282 placed within the cylindrical chamber of the hub member 233 and in front of the plunger, and a tubular extension 283 of this Sylphon is carried through the hollow rod 255 to its rear end where it may be brazed or otherwise sealed thereto. Use of such Sylphon arrangement will provide a perfectly oil tight construction, and one which can be readily assembled. In the absence of such Sylphon arrangement the plunger 254 may be provided with the piston ring 284 of suitable form for sealing against liquid leakage.

Now in the operation of this scheme it is intended that oil or other fluid pressure should be exerted in the space in front of the plunger of pressure depending upon the traction or pull which it is desired to exert by the propeller, so that upon bringing the propeller into operation it will commence generating traction, which will increase with speed or until the condition of balance is found. Or, the propeller may be first brought to speed without creation of such pressure against the front face of the plunger, so that the generation of a slight amount of traction or pull by the propeller rotation will set the same forward substantially to the zero-pitch angle position where substantially no traction will be developed even at speed. Then, by building up the oil or other fluid pressure the propeller will be successively forced back to a condition of balance dependent on such pressure so established, or dependent on the position at which the propeller is locked.

Reference to the curve of Figure 1 shows that the maximum traction which will be developed (under selected conditions of speed) will be attained long before the position of 90 degrees is reached; and in case of operation at or near the peak 285 of such curve it is evident that reduction of traction (or pressure) might be accomplished either by reduction or increase of pitch. Thus, if we should be operating near such peak position, with the oil pressure sufficient to maintain the pitch at the corresponding degree position, a reduction of such oil pressure might result in increase of pitch rather than decrease thereof, as desired. To prevent such a condition, and for other reasons, I have provided behind the plunger 254, one or more springs whose accumulated strength is sufficient, at the proper time, to ensure that the collar 237 and blade stub receivers, will always be returned to the lesser pitch condition upon reduction of oil pressure. These are the springs 286. They occupy positions between the back face of the plunger and the front end of the shaft section 232.

Figure 2:
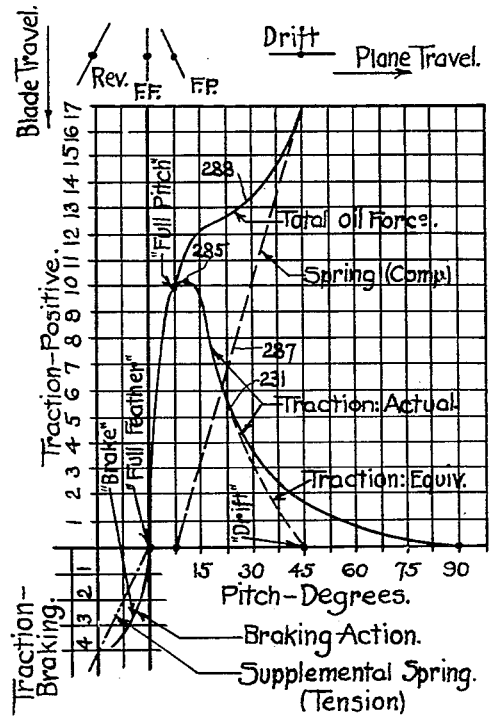

Now it will be seen that the force of these springs must be overcome in addition to that of traction or pull exerted by the propeller blades, in order to maintain the collar 233 at any given position, so if the effect of these springs is exerted prior to the time the peak of the curve 237 is reached (Figure 1) such force must be added to that of traction, in setting the blades to a given pitch position. But the effect of these springs is not generally required until at or near the peak condition. Therefore I prefer to so set these springs, and to use springs of such characteristics, that they will not come into operation until the plunger has moved back a distance sufficient to cause the blades to assume a pitch value which is slightly less than the pitch for maximum traction, such maximum traction pitch being the pitch at the point 285 in Figure 1. This may be done, for example, by so forming these springs that they are fully extended at or about the time the plunger stands at a position slightly prior to reaching the peak condition, so that further movement to the left (Figure 3) will cause compression of the springs thus adding their effect to that of traction or pull of the blades. Furthermore, from that time on it is noted that the effect of such spring should be to require a continuously increasing pressure from the plunger, so that the additive effect of springs and traction or pull of the blades will always be to cause a rise of their additive curve. Thus, in Figure 2 I have repeated the curve 231; and I have also shown by the curve 287 the effect of the spring or springs. Their cumulative effect is shown by the curve 288 which rises continuously from a position near the peak 285 to a still ever higher position, so that as the plunger continues to move to the left beyond the peak position the curve will continue to rise. By this means there is assurance that whenever the plunger is forced beyond the peak position it will, when the oil pressure is again reduced, move back towards the lesser pitch condition, instead of continuing on over to the "Full feathering" or 90 degree position from which it could not be restored by a normal operation.

Furthermore, this arrangement assures return of the blade pitch shifting devices to a lesser pitch condition without any effect of the springs during normal operations, since these springs do not come into operation until at or near the peak position 285.

Reference to Figures 8, 9, 10 and 11 will show certain schematic arrangements for connecting the blade shifting device thus disclosed. Thus, in Figure 8 all the blade shifting devices are connected up in "parallel" by the line 289, receiving pressure oil from a suitable source 290 through the reducing valve 291a having the handle 292; and return oil from such reducing valve is delivered over the line 293a to the return container 294, from which it is again drawn by the pump 295 and placed under pressure in the container 290. With this arrangement the pressure of oil on the line 289 may be set at a selected amount, which will be that delivered to all the propeller blade shifting device, so that they will all be compelled to set their blades for the same traction or pull. If desired, cut out valves 291 may be provided in the lines leading to the individual blade shifting devices, so that any one or more of them may be cut out as desired.

In this arrangement, also, I have shown a common fuel supply line 292a supplying all the motors, through a metering device 293, and a connection 294a is shown from such metering device to the pressure reducing valve 291a so that the operation of such reducing valve may be effected automatically according to rate of fuel supply to the group of motors. Thus the blade pitch adjustments will be effected automatically and according to total power which is to be maintained in the group of motors. I have also shown the speed control connections 295a from the several motor shafts 296 to the several motor throttles 297 so that the various motors will be, if desired, speed controlled also. I have also shown the speed synchronizing connections.

In the arrangement of Figure 9 I have shown individual pressure reducing valves 298, 299, 300 and 301 for the several blade speed control shifting devices. In Figure 10 I have shown an application of the features of this form of blade pitch control to an airplane having both puller propellers and tractors or pusher propellers, being the two groups 302 and 303, respectively, these groups being individually served by the speed control pressure reducing valves 304 and 305, respectively.

The details of a pressure reducing valve suitable for use in any of the foregoing schemes are shown in Figures 6 and 7, but the device therein shown is shown by way of illustration, and not as a limitation upon the features of the present invention, except as I may limit myself in the claims to follow. In the form shown in Figures 6 and 7 pressure oil or fluid is received into a casing 306 through the connection 307, return oil being delivered from such casing by the connection 308. The connection 309 between said connections 307 and 308 extends to the blade shifting device to be controlled. There is a balanced valve plunger 310 in the casing, having the encircling groove 311 of some axial dimension; and an adjustable spring 312 tends to set this plunger 310 over towards the right or pressure receiving position (Figure 6). There is a pressure balancing port 313 extending through the plunger to its right end so that whatever pressure exists in the groove 311 (and therefore in the line connected to the port 309) will be exerted against the right hand end of the plunger, tending to set it back to the pressure closing position (being also towards the pressure relieving position). The force of the spring 312 may be adjusted by turning the double-threaded screw plug 314 by the handle 315, a ball bearing 316 being introduced into the connections to ensure easy operation.

It will be seen that with such a reducing valve as that just disclosed it is possible to maintain the pre-selected pressure against the face of the plunger 254 of the blade shifting device, as movements of said plunger may take place back and forth, but always with the maintenance of the pre-selected degree of oil pressure against the plunger face.

In Figure 11 I have shown an arrangement wherein the oil pressures exerted against the several plungers 254 of the several blade shifting devices may be adjusted, and also wherein said devices will be locked in any given adjusted position. To this effect I have shown a servo-device at the position 317, the several cylinders 62, 64, 66 and 68 (small) of such device being individually connected to the blade shifting devices by the lines shown in Figure 11, and the large or power cylinder 87 of such servo-device being supplied with oil of pre-selected or reduced pressure by means of the reducing valve 318. This scheme will ensure movement of the several blade shifting devices all to the same degree of pitch, and the presence of the single or gang pressure reducing valve 318 will ensure constancy of total pull (or push) exerted by the gang of propellers in case of use of such a propeller scheme as that of Figures 3, 4 and 5, inclusive, or some equivalent scheme.

The arrangement or device 317 of Figure 11 constitutes means to synchronize the blade pitches of a plurality of propellers, while permitting adjustment of the setting of said pitches. In other words, this device constitutes a blade pitch adjusting device for a plurality of propellers, and is so constituted that the pitches of the blades of all such propellers will be synchronized at all times, that is, the blades of all propellers will be maintained at the same degree of pitch angle as the propellers operate, or as changes of pitch angle are made under some form of control. The full details of such a device are shown in said co-pending application, Serial No. 573,382, now Patent No. 2,569,444, of which the present case is a division; and said pitch synchronizing devise is also shown in another divisional application, Serial No. 248,699, filed September 28, 1951, and also based on said parent application, Serial No. 573,382.

In the scheme shown in Figure 11 it is noted that there is not a completely locked condition to absolutely prevent any movement of each of the blade shifting plungers 254 under the force of traction or pull exerted by the propeller; but due to the fact that the power cylinder of the servo-device is much larger than each of the small cylinders thereof it is evident that the force which would be required to force back the power cylinder is multiplied, so that there is in effect a locking action with this scheme. An absolutely locked condition might be attained by provision of a modified form of the control valve 318 which would prevent back flow of oil except under release of the operator.

It is thus evident that the variable pitch propeller construction herein disclosed is such that it may be used either with control such that it will automatically maintain the blade pitches at adjusted amount to develop a predetermined traction or pull, as in the case of use of this device with a pressure-reducing valve such as that of Figures 6 and 7; or this variable pitch propeller may be used in schemes wherein it may be set to a desired pitch and then locked at such setting, irrespective of the traction or pull being developed.

It is furthermore evident that when using a pressure-reducing valve of the characteristics of that of Figures 6 and 7 this variable pitch propeller will automatically vary the pitch of its blades to maintain the traction or pull at that amount which will balance the pressure predetermined by the pilot or by some form of automatic control, such action being secured by the back and forth shifting of the collar 237 with corresponding shift of blade pitch; and it is also evident that in case of a "locking" scheme wherein the back flow of oil is prevented, automatic shift of the blades may be secured to maintain a constant speed of the propeller, by use of any suitable form of governor arrangement, as for example, a centrifugal governor.

Such a form of centrifugal governor arrangement is shown in my said copending application, Serial No. 573,382, now Patent No. 2,569,444, of which the present application is a division. It is further to be noted that although the particular device illustrated in Figures 3, 4 and 5 is designed to provide for blade shifting between the conditions of "Full feathering" and "Zero-pitch angle," being substantially ninety degrees of shift, still such devices might be readily designed to make provision to a reverse position, that is, backwardly from the "Zero-pitch angle" position, to thereby provide for braking actions.

Since the tendency of the blades (of the propeller construction shown in Figures 3, 4 and 5) is to shift themselves forwardly due to their own action on the air, if such a propeller be brought to speed (not necessarily full speed, but sufficient to develop traction or pull), with the oil or fluid pressure against the front face of the plunger 254 either zero or relatively low, it is evident that such propeller will shift its hub forwardly to a position where the blade pitch is substantially zero or at "Zero-pitch angle." This would be the condition, for example, when idling. Then, when it is desired to build up traction or pull it is only necessary to shift the reducing valve to position for higher pressure against the plunger face, thereby forcing the plunger backwardly and rocking the blades to pitch for greater traction or pull. During this time the propeller speed may be full speed or some lower value, or may be of some value predetermined by a suitable control, such for example as that of my co-pending application, Serial No. 459,336, now Patent No. 2,612,956. Whatever pressure value has thus been set by the reducing valve will determine the blade setting, and the plunger will thereafter automatically adjust itself back and forth from time to time to maintain a balance between traction or pull and pressure against the plunger. Thereafter adjustments of pressure under control of the reducing valve or otherwise will be accompanied by corresponding re-adjustments of the blade pitch so that new conditions of balance will always be found.

It is further noted that with this arrangement the force of traction or pull is communicated from the blades to the shaft section 232 through the medium of the oil or fluid in advance of the plunger 254. In other words, the oil or fluid constitutes a body for transmitting the effective tractive force to the airplane itself. The pressure generated in that body is the means whereby the setting of the blade pitch is controlled and re-adjusted from time to time. Furthermore, new adjustments of blade setting or pitch may be very rapidly executed since re-settings of the reducing valve will at once and very quickly result in re-settings of the plunger with corresponding rapid re-adjustments of the blade angle. Thus it will be possible to execute very rapid manoeuvers of the airplane which require pitch changes, or when pitch changes would be desirable in connection therewith.

It is evident that if desired stops might be provided to limit the backward movement of the plunger 254 so that it could not move to a position sufficiently far to bring the curve 231 over its peak, in which case the springs 286 might be eliminated. Other means might be devised to either limit movement of the plunger or to ensure return of the parts to the zero-pitch-angle position from the peak of the curve. It will however presently appear that under certain of the operating conditions for which provision has been made in this case to provide automatic controls, the pitch angle at which the peak will occur will change, so that it is desirable to make use of the spring arrangement (such as the springs 286) instead of making use of fixed stops to limit movements of the blade stub carriers.

As respects the schematic layout of Figure 11 it is noted that a single servo-unit serves to ensure similar or equal pitch settings for all the propellers being served thereby through the medium of a single reducing valve since no propeller blade pitch setting can change therein without corresponding change of the pitch settings of all the other propeller blades. To this extent that scheme departs from the arrangement shown in Figure 8 wherein the single reducing valve serves to deliver oil or fluid to all of the blade shifting devices in parallel, and wherein, therefore, each of said blade shifting devices is free to make its own adjustments independently of the others, but at the pressure dictated by that single reducing valve. In the scheme of Figure 11 the single reducing valve will determine the total traction or pull to be developed by all the propellers ganged to it; in Figure 8 each of the propellers will individually develop a traction or pull determined by the oil pressure set at the reducing valve of that gang.

Referring to Figures 8, 9, 10 and 11, the following further comments are noted with respect to the operations therein provided for:

In the case of the gang controlled scheme of Figure 8 it is evident that setting of the pressure reducing valve to a given setting will result in maintaining that pressure at all of the blade shifting devices. This will result in the maintenance of the corresponding amount of traction or pull at each of the propellers, by corresponding setting of their blades. In case of loss of a given propeller or its motor, as by enemy fire or otherwise, the total traction of the airplane will be correspondingly reduced, as each of the remaining motors and its propeller will continue to exert the traction or pull dictated by the setting of the reducing valve. This operation would occur in the absence of the metering device for metering total fuel supply to all of the motors, which is also shown in Figure 8. By proper connection of this metering device with the pressure reducing valve as shown in that figure it is evident that said total metering device may be so set as to require constant delivery of a specified total amount of power (represented by rate of rotation of the metering device), in which case the reducing valve will be correspondingly readjusted by the connection from the metering device, to require the remaining propellers to absorb among them the full power for which said metering device was set. For example, if said metering device were set for 8,000 horse-power, and all four motors or propellers were functioning, each would be delivering its quota of such total of 8,000; and in case any given motor or propeller should go out, leaving only the three remaining to take the full power, these would be called upon (if able) to each deliver one-third of the 8,000, or 2,666 horse-power, the airplane still receiving its total of 8,000.

In my aforesaid co-pending application, Serial No. 459,336, now Patent No. 2,612,956, I have disclosed means whereby such a metering device as shown in Figure 8 hereof, may be caused to function for maintenance of the predetermined amount of power, and therefore I do not deem it necessary to make full disclosure of said means herein.

Reference to Figure 11 of the present case shows the use of a servo-device 317, in connection with all the propellers and blade shifting devices to be controlled thereby. In this case, also, the pressure reducing valve serving the servo-device will maintain a specified pressure against the large or power cylinder 87 of such servo-device, so that this total force must be absorbed by all the small plungers 62, 64, 66 and 68 which are connected (mechanically) to it. This means that normally all of the four blade propeller shifting devices served by this large cylinder and its plunger, will take the full load imposed by the pressure (as determined by the reducing valve) and distribute said load to all four of the blade shifting devices, so that each of the propellers will have its blades set to positions for absorbing one-fourth of the total traction. In case any motor or propeller goes out, however, this total traction will be delivered by the remaining three, with consequent necessary increase of the power delivered by each.

It is thus evident that I have herein provided means to maintain total power absorbed by the several propellers constant, and for accomplishing this function and result either by metering the total power or by direct control of the blade shifting devices by a gang control.

In Figure 8 I have also shown the speed and synchronizing control unit 391 for the several power motors of that scheme, same being suitably connected to the several throttles 297 by the synchronizing control lines 392, in suitable manner, as for example by the scheme disclosed in my aforesaid application, Serial No. 459,336, now Patent No. 2,612,956. Likewise, I have shown in Figure 9 the synchronizing and control unit 393 acting on the throttles 397, 398, 399 and 400 of the several power motors through the synchronizing control line 394; and in Figure 10 I have shown the synchronizing and control unit 395 acting on the throttles of the several power motors through the lines 396. Thus it is evident that in each of said schematic schemes of Figures 8, 9, 10 and 11 I have shown means to synchronize and control the several power-motor-propeller units for speed, as well as making provision for the other various functional controls already explained herein.

It will be evident that in the various schemes herein disclosed I have made provision for synchronization of various factors which affect the operation of the propellers of the airplane and other ships, etc. Thus, there is provision for synchronization and control of speed, power, pitch, and pull (or push) of the several power-motor-propeller units; and I have in the several schematic arrangements disclosed herein combined these various kinds of synchronization in various combinations. These may be summarized as follows:

In the arrangement of Figure 8 there is synchronization of speed and pull (or push) of the several power-motor-propeller units, together with provision for maintaining constancy of gross power or control thereof;

In the arrangement of Figure 9 there is synchronization of speed and provision for individual controls of the pulls (or pushes) of the several power-motor-propeller units;

In the arrangement of Figure 10 there is synchronization of speed and group synchronization of the pulls (or pushes) of the several power-motor-propeller units; and In the arrangement of Figure 11 there is synchronization of speed and pitches of propeller blades of the several power-motor-propeller units.

The foregoing several combinations of functions may be shown by the following tabulation, which is only of a general nature, but will provide a visual understanding of the several functional combinations, namely:

*Tabulation of functional combinations*

| Figure | Speed | Power | Pitch | Pull |
|---|---|---|---|---|
| 8 | X | (gang) | | X (individual) |
| 9 | X | | | X |
| 10 | X | | | X |
| 11 | X | | X | |

In all cases manual control may be assumed over any selected unit or units, as has been shown hereinbefore, so when reference is made to gang or synchronous control of a specified function it is to be understood that manual controls in individual units may be assumed as needed.

Now in the case of Figure 11 in which there is synchronization of speed and pitch, if the several propellers are built to close specifications it will be found that for such operating conditions as synchronization of speed and pitch all these propellers will deliver equal pulls (or pushes), so that synchronization of powers is substantially secured, although actually the pitches of the propellers are being synchronized. But it is noted that the "powers" thus synchronized are powers delivered to the moving plane, and not generated powers of the power-motors. The gang control of power provided for in Figure 11 acts on the pitch control mechanism so that there is assurance that when a specified amount of power is to be maintained in the gang of power-motor-propeller units, said total power will be maintained irrespective of cutting out a given unit or units in an emergency. However in all cases there will be maintained the desired synchronism of speed and synchronism of pitch as between the several units, and the pitches will be automatically readjusted from time to time, while remaining synchronized, so as to ensure the delivery of the specified total or gang amount of power in the arrangement of Figure 11.

In the cases of Figures 8 and 10 there is provided synchronism of pull (or push) and synchronism of speed, as between the several power-motor-propeller units, it being understood that a suitable form of propeller construction is used, such, for example, as one of those hereinbefore described, in which the reaction of the propeller must automatically come to that amount which is determined by the control unit. This results practically in synchronism of power delivered to the moving plane, but not necessarily synchronism of power generated by the power-motors. But in the scheme of Figure 8 I have also made provision for gang control of power generated, with the attendant advantages for certain uses and applications of the power-motor-propeller combinations. In the case of Figure 9 there is provided individual control of propellers for pull (or push); and in the scheme of Figure 10 is in effect a hybrid of the two schemes of Figures 8 and 9.

In considering the various schematic arrangements hereinabove discussed it is to be clearly kept in mind that synchronization of pitches as such is a very different thing from variation of pitch for speed control; and especially that I have herein made distinct provision for synchronization of speeds by other means than pitch; as for example I have mentioned speed synchronization by throttle control in combination with pitch synchronization as such. Thus I am able to secure and make practical use of various benefits flowing from synchronization of pitch as such; and many of these benefits can be secured irrespective of any synchronization of speed, however such speed synchronization may be effected.

It is very desirable to make provision for simplification of controls of the power-motors and propellers of multi-motored airplanes and the like, since the complexity of instruments, controls, and other devices under the jurisdiction of the pilot or operator is rapidly becoming excessively burdensome. In the present application I have made provision for control and synchronization of various functions, including speed, power, pitch and pull (or push); and I shall now disclose means to bring together two or more of these various controls into a common joint control which is capable of taking care of the necessary adjustments of each of the controls and synchronizations within its jurisdiction, and by use of a single handle or knob.

Reference may first be had to Figure 12 wherein I have shown two handles of bell-cranks 401 and 402, the respective handles being numbered 403 and 404, respectively. These bell-cranks are pivoted at 405 and 406, so that handle movements are communicated to the other bell-crank arms 407 and 408. These handles swing over the scale plate 409, same being provided with radial line markings 410 drawn through the pivotal point 405, and 411 drawn through the pivotal point 406, respectively. In the scheme illustrated the lines 410 have reference to "Traction-pounds" (or push or pull), and the lines 411 have reference to speed in "R. P. M."

The bell-crank arm 407 connects to the proper element of the control (and synchronizing means) for traction or pull or push, being, for example, the reducing valve 291ª of Figure 8 of the present application, or the reducing valve 304 or 305 of the Figure 10 of the present application, so that back and forth swings of the handle 403 will effect proper adjustments of these reducing valves, and therefore will adjust and control the tractions or pulls or pushes of the several propellers under its jurisdiction; and the arm 408 of the bell-crank 402 connects to the proper element of the control (and synchronizing means) for speed, being, for example any suitable motor speed control and/or synchronizer, such as that of my co-pending application, Serial No. 459,336, now Patent No. 2,612,956, already referred to. In such case said bell-crank arm 408 may be connected to a suitable speed control element such as the rheostat 133 of Figure 1 of that case, or the speed control of the control unit 244 of Figure 19 of that case. It is not deemed necessary to illustrate the details of these controls herein as they are mentioned by way of illustration, only, and as suitable for use in the present connection.

Evidently by swinging the handles 403 and 404 back and forth or up and down the controls for speed and traction (and for synchronization of these functions) will be effected, and also it is possible to set these handles to selected positions of adjustment in comparison to the respective scales 412 and 413, which read directly in suitable units of traction and/or speed.

These handles 403 and 404 are slotted lengthwise to provide the slots 414 and 415, respectively, and a threaded stud 416 is passed through both slots, said stud having an enlarged head on its inner or back end, and a suitable thumb screw or nut 417 being threaded on the outer or front end of such stud. By tightening this thumb screw the two handles are clamped together in the position which they then occupy, so that they will be retained at their settings. Furthermore, it is evident that by slightly loosening this thumb screw and using it as a knob, moving it back and forth and up and down with respect to the scale, it is possible to re-adjust both the handles to new settings of speed, and traction, and then lock the handles again in their new settings.

It will also be noted that the scale lines 410 and 411 are readily seen through the respective handle slots so that they are readily observed during settings of the respective handles.

In the scheme of Figure 13 I have shown a similar arrangement, but in this case same has been devised to meet the conditions of "Speed" and "Pitch-degrees." In this case the arms 407 and 408 of the respective bell-cranks are connected to the appropriate controls, for example to the reducing valve 318 of Figure 11 of the present application, and to the speed controls of application, Serial No. 459,336, now Patent No. 2,612,956, already referred to.

In Figure 14 I have shown schematically still another application of this joint control feature. In the present instance the joint control desired is between speed, and "Pitch-degrees," when using the type of blade adjustment for pitch shown in Figure 12 of said application, Serial No. 459,336, now Patent No. 2,612,956. That type is one wherein a hydraulic servo-motor is provided for actually shifting the blade pitches, and same having a valve which is easily moved under slight force, and the entire arrangement being such that whenever the valve is moved to a given setting the plunger will move to a similar position and be locked there, thus also locking the blades in the set pitch adjustment.

In the case of Figure 14 the bell-crank arm 407 is connected to the valve element 418 of the servo-motor 419, said servo-motor being connected to the pressure oil supply lines 420 and to the oil release line 421; and said servo-motor having the plunger 422 which will be moved back and forth by the oil pressure to positions corresponding to the positions of the valve member 418. Said plunger 422 connects to the piston rod 423 which extends outside of the device and carries or provides the rack bar 424. This rack bar may be directly engaged with the pinion 105 of the element 317 (see said co-pending parent application, Serial No. 573,382, now Patent No. 2,569,444), to thereby move the small plungers 62, 64, 66 and 68 up and down by use of the servo-motor of Figure 14 instead of by use of the larger cylinders 87 and 88 of said device 317 (shown as 87 in Figure 11 of this case). Thus the settings of the handle 403 for pitch will react directly on the joint or multiple synchronizing element for shifting the blades to selected pitch, and for ensuring synchronism of such pitch adjustments.

Now it is to be noted that suitable iso-lines 425 may be drawn on the scale of Figure 12 representing "Powers" corresponding to the various settings of the handles 403 and 404, each of these lines 425 showing settings for a specified power. Likewise, in the schemes of Figures 13 and 14 iso-lines 426 may be drawn on the scales of those figures showing "Traction" which will correspond to selected settings of the two handles. By use of such iso-lines it is possible to show on a single scale the relationships of speed, pitch, and power; or speed, pitch and traction; or speed, traction and power; and to secure the necessary settings of all essential controls by use of a single, convenient element.

The arrangements of Figures 12, 13 and 14 show how it is possible to correlate two or more controls for purposes of simplification of the work and attention needed from the pilot or operator. I shall now disclose certain improvements whereby it is possible to provide completely automatic control of all the necessary functions for bringing the airplane into flight, and maintaining it in sustained flight at pre-selected conditions of operation with little or no attention by the pilot or operator. For this purpose reference may be had to Figures 15, 16, 17 and 18, as well as certain of the disclosures heretofore made herein.

To accomplish the take-off and bring the airplane to a selected speed of sustained flight, it is necessary to provide for control of the engine speed during take-off; the pitch of the propellers during take-off; the engine speed after take-off and up to the attainment of the desired speed of sustained flight; the pitch of the propellers during the latter interval; the engine speed during sustained flight; and the pitch of the propellers during sustained flight. It is also desirable to provide for such special conditions of flight as a sudden ascension or descension (for example, a power dive), without the need of disturbing the "set" controls, and various other special conditions should be provided for. All these and other conditions I have provided herein.

It is also noted at this point that the pitch of the propellers should bear a definite relationship to the propeller rotational speed (engine speed, or a multiple thereof), and also to the momentary velocity of flight, or air-speed, in order to ensure not only desired pull or traction, but also highest efficiency of operation, considered as an engine. All these factors have been taken into account herein and will be herein considered in full detail.

Referring first to Figure 15, I have therein shown the main control unit, designated as a whole by the numeral 426. This is provided with the handles 427, for engine speed, and 428, for air speed, respectively. These correspond generally to the handles 402 and 401 of Figures 12, 13 and 14. Suitable scales 429 and 430 for engine speed (revolutions), and air speed (miles per hour) are provided adjacent to the paths of movement of these handles and for comparison with the handle positions. These handles are also preferably pivoted at the points 431 and 432, respectively as heretofore. Movement of the handle 427 normally serves to control the operation of the motor-generator set 433 which produces a frequency for controlling engine speeds, and for ensuring synchronization of said engine speeds, preferably, but not necessarily in accordance with the teachings of my co-pending application, Serial No. 459,336, now Patent No. 2,612,956, already referred to; and this motor-generator set 433 may then be compared, for example, to the set 128—129 shown in Figure 1, or the set 244 shown in Figure 19, of that issued Patent No. 2,612,956. To this end, also, I have shown the resistance 434 in the field circuit of the shunt motor of that set 433, so that by variations of said resistance in circuit the speed of said motor-generator set, and therefore the frequency of the polyphase current delivered by the generator of said set, may be controlled, as explained in that earlier application. The generator of said set 433 supplies polyphase current for speed control over the lines 435; and in Figure 15 I have shown these lines leading to lines 436 which lead to the speed control units of the engines such, for example as those shown in said application. Serial No. 459,336, now Patent No. 2,612,956, and also to other lines 437 which supply certain of the control units now to be described.

The movable contact 438 for the resistance or rheostat 434 is normally drawn towards the low resistance end of said rheostat by the spring 439 whose tension may be adjusted as shown; but the speed control handle 427 has the finger 440 which serves to move said contact towards the high resistance end of said rheostat to thereby increase field resistance, and thus to increase speed of said set 433 for increase of frequency on the lines 435, 436 and 437. There is also a fork element 441 carried by said handle which may press against a flange 442 of the contact carrier for another contact 443, presently to be described; but said fork normally does not engage said flange 442, but permits of a certain amount of free movement between said flange (towards the left in Figure 15), for a purpose presently to become evident.

At this point it is also noted that I have provided a motor control for said rheostat 434, same including the small motor 444, preferably of the series type for high torque and simplicity of control, and being provided with two field windings 445 and 446, either of which may be placed in series with the armature of said motor, by connection to one or the other of the terminals 447 and 448; said windings being of opposite nature, so that the direction of rotation of the motor is reversed by reversing the connections, either to the terminal 447, or to the terminal 448, as selected. The other motor terminal is shown at 449. This small remote control motor drives the worm wheel 450 through a worm reduction; and said worm wheel has a friction drive to the small pinion 451 which meshes with the rack bar 452 connected to the contact carrier 442 and also to the contact 438. Thus it will be seen that by excitation of the motor 444 the contacts 438 and 443 may be moved back and forth for power-motor speed controls, irrespective of movements of the handle 427, thus providing for speed control either by said handle or by motor operation. The friction between the worm wheel 450 and the pinion 451 is sufficient to overcome the force of the spring 439 to cause movements of the contacts 438 and 443 towards the left; but by manual control of the contact carrier 452 by the handle 427 the said friction can be overcome without having to rotate the gear 450 which "locks" with the worm on the motor shaft. It is here noted, also, that the contact 443 and directly connected parts, as well as the finger 440, are insulated from the main portions of the handle 427, and are also insulated from the contact 438; and also that as long as the finger 440 engages the part 442 circuit is established to the contact 443, but that in case of motor operation of the motor 444 to increase the movement of the contacts towards the left in Figure 15 beyond the setting established by the handle 427, the part 442 will move away from the finger 440, thus opening a circuit at that point. This will be further referred to hereinafter.

The handle 428 for air-speed control has a finger 452ª which serves to press against the contact carrier 453, which is normally drawn backwardly by the adjustable spring 454; and said carrier has the contact 455 riding over the resistance or rheostat 456. Movement of the handle 428 towards higher speed positions results in increasing the resistance, and vice versa. There is a motor-generator set 457, having the motor 458 and the polyphase alternator 459, said motor being preferably of the shunt type for speed control, and its field 460 being served by the rheostat 456. Manifestly, increase of resistance of the rheostat will serve to raise the motor speed, and vice versa. It is here noted, also, that I have provided an armature 461 in connection with the contact carrier 453, and a solenoid 462 for said armature so that by excitation of said armature sufficiently the contact carrier may be moved beyond the position set by the handle 428, to further increase the resistance supplied by the element 456 for special purposes, as will be referred to hereinafter.

The polyphase current of controlled frequency from the alternator 459 is delivered over the lines 463 for uses to be presently explained.

It is thus evident that we have so far provided for two polyphase frequencies, namely, one proportionate to power-motor or engine speed (and therefore, also proportionate to propeller speed); and the other proportionate to desired or pre-selected air flight speed of the airplane. I shall now show how these frequencies are used for control of the various functions to be correlated:

Provision is made for variation and control of propeller pitches. In the scheme shown in Figure 15 this takes the form of a servo-motor device 464 of hydraulic type, similar to the scheme shown in Figure 14 in this case; that is to say, when the valve control stem 465 is shifted to a selected position, the plunger 466 is moved by hydraulic pressure to a corresponding position, carrying with it the stem 467 which has the rack bar 468 which may be meshed with a suitable gear wheel thereby moving the several propeller blade shifting elements to corresponding pitch positions, and doing this with synchronism of all propeller blade pitches. Thus with the arrangement now considered, and by merely moving the stem 465 back and forth we may shift the various propeller blades and maintain synchronism of their several positions.

Now there is a solenoid 469 working on the armature 470 which is connected to this stem 465, a spring 471 of adjustable tension opposing the movement of said solenoid-armature. Said solenoid has the terminals 472 and 473. There is a source of direct current, such as the battery 474; and one terminal of the solenoid connects to one side of the supply circuit by the line 475, and the other terminal of the solenoid connects by the line 476 to one end of the resistance or rheostat 477 whereon works the contact 443. The finger 440 of the handle 427 for power-motor speed control connects by a flexible connection 478 to the line 479 connecting to the other terminal of the source of direct current. Thus it is evident that as long as the finger 440 is in engagement with the contact carrier plate 442 current will be supplied through the solenoid 469, and the strength of such current will depend on the position of the motor-speed control handle, 427, since that handle determines the position of the finger 440. In other words, when the speed control handle is set to a given position, for example 150 miles per hour, the solenoid 469 will be energized with a corresponding strength, thereby drawing the stem 465 and blade pitch control valve over to a corresponding position for a corresponding blade pitch setting of all the propellers. That blade setting will be maintained as long as the finger 440 makes contact with the contact carrier 442. When, however, said contact carrier is moved towards the left in Figure 15, for speeds higher than the "set" speed, the circuit will be broken at the position of the finger 440, leaving the blade pitch control for other elements to determine. In this connection it is pointed out that by special means the speed of the power-motors may be raised above that for which the handle 427 is set, at which time this supplemental control of the blade pitches will come into effect.

There is an air-speed blade-pitch-control unit 480 carried by the airplane at such a position that it is subject to free flow of the air stream moving over one of the foils, or in other suitable position. This unit includes the freely journalled hub member 481, carried by the synchronous motor element 482, so that said hub member rotates at speed determined by such synchronous motor; and said hub member carries one or more blades 483 which are journalled for free rotation on their own axes (that is, along their lengths), as shown in Figure 16. These blades have gears 484 at their inner ends which engage a rack bar or rack bars 485, connected to the collar 486. Consequently all the blades always have the same "pitch" and the position of the sleeve 486 along the length of the hub is determined by such pitch.

In Figure 16 I have shown by the axial line 487 and its length the direction and speed of flight at any given instant, and by the line 488 the direction and speed of rotation of the blades 483—that is, the rotative direction and speed of said blades. This rotative speed is generally taken as that rotative speed of the blade at three quarters radius. The resultant 489 of these lines 487 and 488 is the direction and speed of air flow through the blades 483. If it be assumed that said blades 483 are of sufficient size, and are freely journalled, and that the sleeve and connected parts require but small force for their operation, in comparison to the air force developed against such blades 483 for flight speeds of more than a few miles per hour, it will be evident that the position of the sleeve 486 will be a direct measure of the blade setting or pitch for the speed of flight, and for the rotative speed at which this unit 480 is being rotated by the synchronous motor 482. Such pitch, if properly related to the pitches of the blades of the power propellers (in design), will also be a measure of the pitches at which said power-motors should be set for speeds of flight and rotative speeds the same as those momentarily in effect on said test blades 483. In other words, by designing the blades 483 of proper form in comparison to the blades of the power-motor propellers, said blades 483 will always be a means of determining the setting of the power-propeller blades for momentary air and rotative speeds.

It is here noted that such determinations as just mentioned will result in settings of the power-propellers at pitches corresponding to said air and rotative speeds, but without provision for any "angle of attack," so that provision must also be made for ensuring settings of the power-propeller blades at pitches greater than the settings of the blades 483 by the desired amount of such angle of attack, and so as to ensure development of the desired working forces by said power-propellers. This I have done.

The sleeve 486 is connected to the control valve element 465 of the servo-motor device by the link 490, same preferably having the pin and slot connection 491 of permissible movement sufficient to accommodate the usual advancement of the stem 465 by the usual setting of the pitch by the solenoid 469 during take-off. This is not necessary, however, as manifestly when the solenoid 469 is energized it will draw the stem 465 over to a position corresponding to the strength of current in said solenoid, but in absence of such pin and slot connection, or the equivalent, it would also be necessary during this stage of operations for the solenoid to move and retain in moved position, the blades 483 against the air forces developed against them. Such disadvantage is avoided by the pin and slot connection just referred to.

The synchronous motor element 482 is connected to the polyphase line 437 from the engine speed control 433, so that said hub 481 is always rotated at speed proportionate to power-motor speed, and therefore to propeller speed. This is the desired relationship.

The devices so far described will ensure constancy and synchronism of power-motor and propeller speeds during the take-off interval, and also constancy of blade pitch settings during that interval, if desired. I shall now disclose means to accomplish many other desirable results and controls.

Frequently it will be desired to make provision for increase of power-motor speeds after the take-off interval, as for example in connection with very high speed flights, say at 350 or 400 or even 500 or 600 M. P. H., sustained flights. I have therefore made provision for automatically advancing the power-motor speeds after the take-off interval, to such rotative speeds as may be necessary for the higher speeds thus demanded by the setting of the handle 428 for sustained flight speed, and also for always ensuring blade pitch settings corresponding to these higher speeds, and at the same time for ensuring synchronization of power-motor speeds and synchronization of blade settings. I shall now disclose all these devices and their functions.

There is an "Air speed response" unit 492, comprising a small polyphase generator, carrying a fan of relatively small size, and so mounted as to be subject to the air stream flowing past a foil at substantially airplane speed. Thus the speed of driving of this small generator by such fan subject to the air flow stream will depend on the speed of flight of the airplane, so the frequency of the current generated by such generator will be a measure of air-speed of the airplane. Said frequency will bear a definite relation to the speed of the power-motors driving the plane. I also provide a small differential unit 493 comprising a polyphase wound stator element and a polyphase wound rotor element reacting together, one being free for rotation and the other stationary with respect to the body of the airplane. The rotor element of this differential unit 493 is connected to the polyphase line 437 by the connections and slip rings 494, and the stator polyphase windings of this differential unit are connected to the generator 492 by the lines 495. These connections are also so made that the respective rotating fields of the stator and rotor of this unit 493 rotate in the same directions, so that the rotor will be compelled to rotate at a speed and in a direction depending on the relative frequencies or algebraic difference of the frequencies of these two polyphase currents. Said rotor of the unit 493 carries a hub 496 on which is frictionally placed a band 497 carrying the radial contact finger 498, and a stop 499 and a contact 500 are placed at the two sides of said finger 498. Springs 501 tend to hold the finger in its central position as shown in Figure 15.

It will be evident that when the frequency of current on the line 437 exceeds that on the line 495 from the small generator 492 the rotor of said differential unit will rotate in a direction to carry its contact finger 498 against the contact 500, whereas when the frequency from the small generator 492 exceeds that from the line 437 the rotor will rotate in the opposite direction to carry against the stop 499.

There is a relay 502 including the solenoid 503 and its armature 504, and the contact 500 already referred to comprises a portion of the circuits of this solenoid. Consequently when the frequency supplied by the line 437 exceeds that supplied by the line 495, the solenoid 503 is energized and the armature 504 is held up in the position shown by dotted lines in Figure 15. Normally said armature is allowed to fall. Said armature carries the contact plate 505, so that when in lowered position said plate connects together the two contacts 506 and 507 as shown in Figure 15.

There is another differential unit 508 similar to the unit 493 in construction and mode of operation. This differential unit 508 has one of its polyphase wound elements connected by the lines 509 to the lines 495 of the generator 492, and its other polyphase wound element connected to the polyphase line 463 from the air-speed control unit 457, already referred to. Thus this differential unit 508 will cause its rotor to rotate according to differential of frequencies of the "Air speed response" unit 492 and the speed of flight as set by the control unit 457 under the setting of the handle 428. There is a hub 510 carried by the rotor of the unit 508, and a band 511 is frictionally mounted on said hub so that said band will rock in the one direction or the other according to the direction of rotation of the rotor of the differential unit. Said band carries the finger 512 which works between the two contacts 513 and 514, and may stand between and free of both of said contacts. These contacts connect to the terminals 447 and 448 of the two field coils of the small motor 444, so that said motor will rotate in one direction or the other according to which of said contacts 513 and 514 is engaged by the finger 512, or said motor will remain stationary when neither of the contacts is engaged by said finger.

Assuming that the "Air speed response" unit will rotate at a speed depending on the actual air speed of the airplane in flight it follows that the action of the differential unit 508 will serve to move the speed control contact 438 back and forth to correspondingly adjust the speed of the engine speed control unit 433 from time to time according to the momentary needs as dicated by the speed of the airplane in flight. In this connection it was shown that the setting of the handle 427 for rotational "speed" should be to a value proper for take-off, generally less than the power-motor speed for the desired sustained flight as dictated by the setting of the handle 428, and that the pitch of the propeller blades will be held constant during such interval at a value as dicated by the setting of the handle 427, since the resistance of the rheostat 477 in series with the solenoid 469 will be correspondingly set by the handle position. When the frequencies applied to both polyphase wound elements of the unit 493 are the same said unit will bring its rotor to the central or open circuit position and current will be broken in the line leading to the solenoid 503 of the relay 502, and the contact of that relay will fall, closing the circuit between the contacts 506 and 507. The contact 507 connects to the band 511 or to the finger 512 on said band so that the operations of said finger 512 back and forth between said contacts 513 and 514 will be effective to control the rotation and direction of the small motor 444. Therefore, as long as the frequency of the air-speed control unit 457 is greater than the frequency delivered by the "Air speed response" unit 492 (being dependent on the actual airplane speed in flight), the differential unit 508 will set its finger 512 over to that side for engagement with the contact 513 or 514 which causes rotation of the small motor 444 in that direction which will cause the control unit 433 to increase power-motor speed. In other words, having brought the airplane up to air-speed dependent on the setting of the handle 427 (to complete take-off), the differential unit 508 will "take over" and thereafter will control engine speed to raise same to the point necessary to bring the airplane to actual flight speed as dictated by the setting of the handle 428. When that condition occurs, so that the frequencies of the generator 439 of the air speed control unit 457, and the generator 492 of the "Air speed response" unit are equal, the rotor of the differential unit 508 will assume a central position, with the finger 512 between but out of contact from both of the contacts 513 and 514, and further adjustment of the power-motor speed control unit 433 will cease.

It is here noted that immediately upon the small motor 444 "taking over," and moving the contacts 438 and 443 towards the left from the position they were assigned by the setting of the handle 427, the circuit for the solenoid 469 is broken, so that said solenoid ceases to control the blade pitch; but thereafter the setting of the unit 480 will control blade pitch through the medium of the link 490 and the pin and slot connection 491. It is here to be noted that said link is to be of such length or proportion that the pitch of the propeller blades will always be of an amount greater than the pitch of the blades of the unit 480, so is to provide the desired angle of attack in the operation of the power propellers. In other words, if the actual pitch of the blades of the unit 480 should be, for example, 25 degrees, then the pitch of the blades of the power propellers as set by such unit through the link connection 490 should be 25 degrees plus the desired and established angle of attack.

If at any time the actual air speed of the airplane should exceed the setting of the handle 428 (in miles per hour), it is evident that there would be a reversal of the differential unit 508, thus tending to reverse the small motor 444 and set the control unit 433 to a lower engine speed. This would be the normal operation of the device, since the normal desire is to maintain flight speed constant at the setting of the handle 428. There will, however, sometimes arise conditions under which it is desired to hold up the engine speed, or even to increase said speed beyond the normal as dictated by the setting of the handle 428. For example, this might be true in case of a sudden dive performed by a military plane in which it is desired to perform a "power dive." I have therefore provided the special control handle and rheostat element 515, controlling supply of current to the solenoid 462 acting on the armature 461, so that by setting said handle quickly up to a high position the speed of the unit 457 may be quickly increased, thereby also setting up the power-motor speed, and producing the desired power-dive condition. The circuit of said solenoid 462 is normally open, by complete lowering of the handle 515 to the open circuit position.

The various direct current fields, solenoids, and other elements are supplied with direct current in any convenient manner. In Figure 15 I have shown the battery 474 for this purpose; and of course the necessary lines therefrom, together with suitable switches are provided for giving the desired controls. In Figure 15 I have shown the switch 516 for the engine speed control and synchronizing unit 433; the switch 517 for the air speed control unit 457; and the switch 518 for the various units 480, 492, 493 and 502, etc. If desired in operation the switches 516 and 517 may be closed at the beginning of a take-off operation, the controls 427 and 428 having been previously set to the desired speeds; and after the airplane gets under some headway the switch 518 may be closed to bring the units 480, 492, 493 and 502 into proper operation.

It is now evident that when the frequencies of the lines 494 and 495 become equal the relay 503 functions to bring the unit 508 into play. The frequency on the line 495 depends on the speed of rotation of the small generator 492, which is driven by the air stream flowing past the blades driving that generator. It is intended that this condition of equality of speeds shall occur at or about the airplane speed equal to the setting of the handle 427, that is, take-off speed. To this end the blades of the fan driving this small generator 492 should be of such design that said fan will at all times rotate at substantially the same speed in R. P. M. as the power-propellers or a multiple thereof. Manifestly, however, any departure from such condition will merely serve to cause a slight discrepancy between the speed at which the unit 493 comes into play and the speed which was set by the handle 427, so that actually the "take-off" interval will be completed at some speed slightly different from that indicated by the handle setting 427. No harm will follow.

It is further noted that when the unit 508 functions to move the contact finger 512 to its central position there has been established equality of speeds or frequencies on the lines 509 and 463, and any slight inaccuracy of design of the blades of the unit 492 will in this case also merely result in holding an air flight speed slightly different from that indicated by the setting of the handle 428, and no harm will result.

Evidently the disclosures thus far made are such that not only are the speeds and pitches of the propellers and the speeds of the engines or power-motors controlled by very simple group controls, but also exact synchronism will be assured as between the speeds of the several power-motors and propellers, and also exact synchronism will be assured as between the pitch settings of the blades of all the propellers. All these results will be secured substantially without thought or effort on the part of the pilot or operator, other than the original setting of the two handles 427 and 428, and the closing of the switches 516, 517 and 518. It is also evident that when descending for a landing the handles 427 and 428 may both be quickly set back to zero or to some small speed position, as desired by the pilot, whereupon the speeds of the power-motors and propellers, and the blade settings will immediately be reduced or set to those positions desired for the landing.

In Figure 17 I have shown a "flow-sheet" or sequence of operations of the various units shown in Figure 15, for simplification of understanding of their relationships. Detailed discussion of this figure seems unnecessary, as the arrows drawn between the various units show schematically the directions in which the controls are effective. In general, however, the following would be a normal sequence of operations:

1. Set A—A (handle) to desired speed for normal flight.
2. Move B—B (handle) up to power-motor speed for take-off.
3. When airplane has some headway close switch C—C.

Then: Take-off commences and airplane gains headway.

3ª. A holds at "set" speed during take-off.
4. J holds pitch at pre-set angle during take-off.
5. C increases speed synchronously with actual flight speed.
6. When speeds of C and A become equal, F functions to close relay I.
7. Then: Actual air speed being less than setting of A—A, G functions to control H, and thus to control I, to raise power-motor speed up to amount necessary for the flight speed setting of A—A.
8. Also: When L functions, J is released to place blade pitches under control of D for all speeds of normal flight.

It is noted that in the scheme disclosed in Figures 15, 16 and 17 there is provided automatic control of all necessary functions by the air speed of the airplane itself in flight, and that the power-motor speeds are automatically brought to the proper value and are automatically readjusted from time to time to maintain that desired speed of flight which has been pre-set by the pilot. Also, that during these various functions the power-motors are also maintained in synchronized condition at all times.

In Figure 18 I have shown another scheme which also incorporates the above functions of automatically maintaining flight air-speed at the pre-set value. In the case of Figure 18, however, use is made of a type of electrical pitch-control device which is well known in this art, and is shown, for example, in Letters Patent of the United States, No. 2,302,042, issued November 17, 1942, on the application of Erle Martin. In this case the propeller hub houses, or carries a synchronous unit comprising two polyphase wound elements, one of which may be called a "stator" and the other of which may be called a "rotor." The stator element is fixedly connected to the propeller hub and does not rotate with respect thereto, whereas the rotor element is rotatable with respect to the hub proper and is connected by suitable gearing to the blade shifting elements of the propeller in question. One of these elements (stator or rotor) is supplied with polyphase current from a small alternator which is driven by the power-motor driving the propeller, and the other element (rotor or stator) is supplied with polyphase current of controlled frequency from a controlling source. Manifestly, when the power-motor speed is equal to the predetermined frequency as dictated by the controlling source there will be no rotation of the rotor with respect to the stator, and therefore no further change of pitch setting of the blades of the propeller, but any departure from such condition of equality will result in rotation of the rotor with respect to the stator and therefore will cause adjustment of the blade pitches to either increase or decrease the load on the engine or power-motor. This will alter the engine speed until equality of power-motor developed frequency and controlling source frequency is again restored. It is still evident, however, that no provision has been made for automatically controlling the air-flight speed of the airplane, in the disclosures of that Martin patent, and that other deficiencies of disclosure of features of the present case exists as far as the said Martin patent is concerned.

In the scheme of Figure 18 I have shown four propeller hubs 519, 520, 521 and 522, each of which is driven by a power-motor, same being shown at 523, 524, 525 and 526. Each of these hubs contains one of the synchronous pitch changing devices above referred to, and in the case of the hub 519 the stator is shown at 527, connected to the hub and rotating therewith. The rotor 527ª is within this stator and is geared to the propeller blade pitch shift devices as already mentioned. The shaft 528 of the hub 519 carries the six slip rings 529, 530, 531, 532, 533 and 534; and the three terminals of the polyphase winding of the stator are brought to the slip rings 529, 530 and 531, and the three terminals of the winding of the rotor are brought to the slip rings 532, 533 and 534; or these groupings may be reversed. The power-motor 523 serving the propeller hub 519 drives the small polyphase alternator 535 at speed equal to or proportionate to power-motor speed. This small alternator is served with direct current for its field windings through the slip rings 536 and 537; and the terminals of the stator winding of this small alternator are connected to the brushes engaging the slip rings 532, 533 and 534 over the lines 538. The other set of slip rings 529, 530 and 531 are served by brushes receiving polyphase current as presently to be explained.

In the scheme of this Figure 18 I have shown the handle 427 for manually controlling power-motor speed, and the handle 428 for setting desired speed of flight. There is also shown the motor-generator set 433 for delivering polyphase current over the lines 435 to the control lines 436 for the synchronous and power control devices similarly to the scheme shown in Figure 15 hereof; for which purpose said lines 436 may lead to the bus-bars 167 of Figures 1, 18, 19 and 20, for example, of application, Serial No. 459,336, now Patent No. 2,612,956. These polyphase lines 435 also lead to the lines 539 passing to the several propeller hubs to be served thereby. The slip rings 529, 530 and 531 already referred to connect to the lines 539 by the branch lines 540; so that the other polyphase element of the blade setting device within the propeller hub is thus served with current of frequency equal to or proportionate to the frequency existing on the lines 539.

Each of the propeller hubs 520, 521 and 522 is provided with devices the same as those just explained with respect to the hub 519, and it is not deemed necessary to repeat the descriptions thereof in detail.

The handle 427 controls the motor-generator set 433 in manner similar to that explained with respect to Figure 16. There is also provided the small motor 444 whose direction of rotation may be determined by supply of current over either of the lines to provide a remote control for the speed of the motor-generator 433, in manner similar to that explained with reference to Figure 15. Thus the handle 427 serves to manually set the speed of the motor-generator 433, usually at a value less than that which will be expected during normal free flight at the speed pre-set by the handle 428.

Likewise the scheme of Figure 18 includes a showing of the motor-generator set 457 including the motor 458 and the polyphase alternator 459 delivering its current over the lines 463. The frequency delivered over these lines 463 is determined by the setting of airplane speed handle 428 similar to the arrangement already explained with respect to Figure 15.

The arrangement of Figure 18 also includes the "Air speed test" unit 492, similar to that shown in the scheme of Figure 15; and the polyphase stator winding of this unit 492 connects by the lines 541ᵃ to one element (generally the rotor) of the differential unit 508, of type similar to that shown in Figure 15. The other element of this differential unit 508 connects to the polyphase lines 463, similar to the arrangement already explained with respect to Figure 15. Likewise the finger 512 of this unit 508 works between the contacts 513, and 514, connecting respectively to the field windings of the reversible motor 444, over the lines 447 and 448, in manner similar to that of Figure 15.

The necessary direct current supply is shown in the form of the battery, serving the various field windings, etc.; and the switches 541, 542, 543 and 544 are provided for cutting out the various units as desired. In this connection it is noted that the switch 541 controls the motor-generator set 433 which supplies controlled frequency to the several power-motor controlling units over the lines 436 and said switch 541 also controls the motor-generator set 457 supplying controlled frequency to one element of the differential unit 508; the switch 542 controls all the alternators 535 as well as the unit 492 and the supply of current to the switch 543 which controls the supply of current to the finger 512 alone; and the switch 544 controls the several generators 535 as a group.

In operating an installation of the type shown in Figure 18 the control handle 427 may be set to a motor rotational speed selected for normal operation of the power-motors during take-off or during the early stages of flight, and the handle 428 may be set to the free flight speed desired. Generally the setting of the handle 428 will require a higher power-motor load than that represented by the setting of the handle 427. During this preliminary setting of the handles 427 and 428 the switches 541, 542, 543 and 544 will all be open. Furthermore, it may be desirable to make use of a type of propeller having means to normally set the pitches of the blades at some operating position, or such a scheme as that disclosed in the aforesaid Letters Patent, No. 2,302,042, whereby the blades may be set manually at a desired pitch prior to automatic setting thereof.

Assuming that the power-motors have been idling, upon closing the switch 541 the units 433 and 457 will be brought into operation to cause supply of current of frequency determined by the setting of the handle 427, over the lines 436 to the controls and synchronizers of the several power-motors, thus bringing them all up to synchronized power; and since the propellers have been pre-set to some pitch there will immediately be developed the desired reactions for take-off. When the airplane gains free flight the switch 542 may be closed thus bringing the unit 492 into operation, and the switch 544 may be closed, thus bringing the several pitch control devices into operation for the several propellers. Thereafter the switch 543 may be closed to bring into effect the automatic air-speed control, so that thereafter the flight speed of the airplane will be automatically controlled according to the pre-setting, or any other setting of the handle 428.

It is to be noted that in the disclosure of said Martin patent, No. 2,302,042, the speeds of the several power-motors are controlled and synchronized by the controls of the pitch settings of the several propellers, to bring the power-motor speeds to the speed dictated by the control unit there supplied; whereas in the scheme of Figure 18 of this disclosure the powers of the several power-motors are controlled and synchronized by the devices served by the polyphase lines 436 according to the teachings of my said co-pending application, Serial 459,336, now Patent No. 2,612,956; and the propeller blade pitch settings of the several propellers are then controlled for synchronism of settings. In effect the result will be to ensure, in the case of the present disclosures, synchronism of pitches and equality of reactions of the several propellers against the air in which they are operating. This will, in effect, result in synchronization of powers developed by the several propellers, as well as synchronism of their respective speeds of rotation.

It is also noted that in the disclosures of said Martin patent, No. 2,302,042, if the speed of any engine should fall, the gearing within the propeller hub should be such, in relation to the rotor of the polyphase wound unit in such hub, that reduction of pitch of such propeller would occur, so as to slightly lower the load on such engine, and thus permit such engine and propeller to gain speed and restore synchronism; and of course in case of rising of engine speed to a speed higher than the synchronous speed a contrary result would occur. Therefore, in that Martin patent the arrangements should be such as to produce the operating conditions just described. In the present case, however, namely that shown in Figure 18 of the present application, a very different condition exists as I shall now show.

The polyphase lines 436 from the motor-generator unit 433 lead to the power controls of the several power-motors, as already explained. Generally these power motor controls will act on the throttles of said power-motors, according to certain of the teachings of my said application, Serial No. 459,336, now Patent No. 2,612,956, notably Figures 18 and 20 thereof. Therefore if the engine speed of any power-motor propeller unit should fall below the setting of the unit 433, the throttle of such power-motor will be opened to a wider position, to build up power and restore the speed condition. In other words, the falling of speed of such power-motor reacts in an indication of need for more power, and this need is then automatically supplied by the opening of the throttle of such power-motor unit. The condition of falling propeller speed and falling speed of the airplane in free flight (as compared to the setting of the handle 428) is one which should be met by increase of power supply which will be taken care of automatically by the control frequency supplied over the lines 436 to the throttle control (of Figures 18 and 20, Serial No. 459,336, now Patent No. 2,612,956); and the blade setting of the propeller will be taken care of by the frequency of the control current over the line 539. In the scheme of Figure 18 the frequency on line 436 is the same as that on line 539; but other arrangements may be provided for the supplies of the frequencies to the two sets of lines 436 and 539.

Therefore, a specific application of the disclosures of Figure 18 of this case is that in which the gearings and the windings and connections of the small double polyphase wound elements in the propeller hubs are such that under the condition of application of a specified frequency to the lines 540 of each blade pitch control device, a reduction of speed or frequency on the lines 538 from the generator driven by such power-motor-propeller unit will result in increase of pitch of the blades of such propeller, to compensate for the reduction of power-motor speed, and to maintain the "bite" of the blades on the air, and thereby to maintain the reaction of such propeller on the air.

It is to be noted that this feature of my present invention and as shown in Figure 18 hereof, will also result in a great improvement in the operating characteristics of the airplane whereon said features are used. This is because the increasing of pitch or blade angle with reduction of speed will maintain a more constant reaction on the air, will reduce the tendency to produce a jerking or uneven reaction condition, will reduce the tendency of the several power-motor-propeller units to hunt, and otherwise will improve the operations. Thus, when I use the features of Figure 18 with arrangements such as to increase pitch with reduction of power-motor speed, making use of the same controlled frequency or a multiple thereof for controlling both the pitches and the throttles of the engines, I secure certain valuable and important improvements in operating characteristics or functions, not found in such schemes as that of the aforesaid Martin patent, No. 2,302,042.

It is noted that in the scheme of Figure 18 I prefer to mount each of the polyphase "differential" units 527 within its propeller hub with the axis of said differential unit parallel to the propeller axis, as shown by the broken lines 527ᵇ in Figure 18 along each of the hubs 519, 520, 521 and 522. Such being the case there will be developed within such differential unit a rotational inertia so that the rotor 527ᵃ of such differential unit will tend to lag behind any change of rotational speed of the propeller wherein it is located. This rotational inertia will be greatly multiplied by the gearing whereby said rotor of said differential unit is connected to the blade shifting device within the hub; and consequently for relatively small rotative accelerations or decelerations of the propeller there will be produced relatively large forces in the blade setting device, due to such rotational inertia of the small rotor element of this differential unit 527.

I prefer to make use of this rotational inertia to assist in retaining the propeller in synchronism with the control frequency; for which purpose when I control engine power as in Figure 18 I so arrange the gearing between the rotor 527ᵃ of this unit 527 and the blade shifting device that decrease of blade pitch is produced by forward rotation of this rotor with respect to the propeller hub, and that increase of blade pitch is produced by backward rotation of this rotor with respect to the propeller hub. Consequently any decrease of propeller rotational velocity will result in a forward rotational inertia of this rotor with respect to the propeller, and also will result in tendency to decrease blade pitch, thereby automatically producing a compensating effect in the blade pitch of such propeller, and assisting the resetting of the blade pitches to readjust the conditions for synchronism. Likewise, with the scheme of Figure 18 any increase of propeller rotational velocity will result in a backward rotational inertia of this rotor with respect to the propeller, and also will result in tendency to increase blade pitch, thereby, in this case also automatically producing a compensating effect in the blade pitch of such propeller, and assisting the resetting of the blade pitches to readjust the conditions of synchronism. The foregoing effect is of course cumulative to that produced by the electromagnetic reaction brought to bear by the relative reactions of the rotor and stator on each other, and as produced by the non-synchronism of speed of the propeller and the generator 535 thereof as compared to the control unit 433, and will greatly assist the maintenance of synchronism and the restoration of synchronism, and will materially assist in reducing departures from the condition of synchronism.

This compensating effect of rotational inertia as disclosed by me herein for the first time, as far as I am aware, may be compared to the effect of an inertia governor, and comes into effect automatically immediately that there is any change of rotational velocity of the propeller hub, and is not dependent on any intermediate effects of electromagnetic reactions, responses, etc. Thus a double benefit is secured, since this rotational inertia effect is produced by the same means which also serves to bring about the electromagnetic readjustments as previously disclosed herein. In fact, insofar as concerns this inertia governor effect, same might be produced by any suitable rotating mass, or mass carried by or within the hub itself, and properly connected to the blade shifting devices to produce the desired readjustments of blade pitches as just hereinbefore described.

In Figure 19 I have shown schematically another arrangement for securing complete control of the several functions automatically and by manual setting of the principal controls similar in certain respects to the arrangement of Figure 18. In Figure 19 I have shown the control board having the control handles 427 for power-motor speed and 428 for free-flight speed, as in Figure 18, same working over the scales 429 and 430 suitably marked. Also in the present case I have shown the four propeller hubs 519, 520, 521 and 522 as before, same being provided with the electrical blade pitch control devices, comprising the sets of polyphase wound elements (stator and rotor), including the stator elements 527 (secured to the hubs), and the rotor elements 527ᵃ (rotatably mounted in said stators, and geared to the blade pitch changing studs), as in Figure 18. Said propeller hubs are also provided with the slip rings 529, 530, 531, 532, 533 and 534, on the propeller shafts 528, as heretofore; and the power-motors 523, 524, 525 and 526 for the respective propellers drive said shafts in understood manner. There are also shown the respective small polyphase generators 535 for these units, driven from the shafts 528 proportionately to motor speed, and connected to the slip rings 532, 533, and 534 by the lines 538 as heretofore.

This scheme also includes the unit 492 comprising a small polyphase generator driven proportionately to free-air speed of the airplane by a small fan, so that the frequency of current delivered over the lines 541ᵃ from such unit 492 is a measure of actual air-speed of airplane flight at all times in normal operation. This scheme also includes the motor-generator unit 457 which may be controlled as to speed by the setting of the handle 428, so that the frequency of polyphase current supplied over the lines 463 is a measure of the "set" speed for free-flight; and this scheme also includes the polyphase differential unit 508 similar to the corresponding unit 508 of the scheme of Figure 18, so that its shaft will turn in the one direction or the other according to the relative frequencies delivered by the units 457 and 492, to thereby set the finger 512 against either of the contacts 513 or 514 or centrally of said contacts, as dictated by the relative frequencies aforesaid.

The scheme of Figure 19 also includes the unit 433 comprising a motor-generator unit whose speed can be controlled by field control, through the medium of the fork 440—441 operated by the handle 427, as heretofore. Thus the normal setting of power-motor speed is dictated by the setting of the handle 427, and by the polyphase lines 539 leading to the slip-rings 529, 530 and 531 of the respective propeller blade shifting units as heretofore.

In the present case, however, I have provided a distinct unit 545 for control of power delivered by the various power-motor units of engines 523, 524, 525 and 526, by throttle control, and synchronized fashion, preferably by use of such control as that shown, for example, in Figures 18 and 20 of my aforesaid co-pending application, Serial No. 459,336, now Patent No. 2,612,956. That is to say, the polyphase lines 546 from the small generator of this unit 545 lead to the throttle power control units 50 of Figures 18 and 20 of said co-pending application, now Patent No. 2,612,956, so that the setting of the speed of the motor-generator unit 545 is a measure of power to be delivered by each of the power-motors, and with all said power-motors synchronized as to such power delivery. In other words, with any given setting of the rotative speed of this unit 545 the power called for delivery by each power-motor will be maintained at a given value, and this will mean that the conditions of rotative speed and torque demanded by the propeller of such power-motor must be maintained such as to absorb this amount of power, if stable conditions of operation are to be maintained.

Likewise, by varying the setting (speed) of the unit 545 from time to time we shall also be able to vary the power developed by the several power-motors (while maintaining them in synchronism as to such power), so that varying requirements for power shall be automatically supplied and complied with at all times.

Now the rotative speed of this unit 545 is controlled by the demand for power as dictated by the setting of the handle 428 for free-flight speed (except under certain special conditions to be presently explained), so that by setting the handle 428 for the desired free-flight speed we shall automatically maintain the power developed by the several power-motors at the amount needed to maintain that speed, and with varying conditions of operation, such as rising and falling, of the airplane, changes of altitude, etc., the power developed from time to time will automatically readjust itself to maintain that pre-set speed of flight, until the setting of the handle 428 is altered, or until manual control intervenes, or some other special condition is applied. To accomplish the foregoing results the following arrangements have been provided.

The rheostat 547 for the field control of the shunt motor 548 of the unit 545 is controlled by the small reversible motor 549, through the worm gear and rack and pinion arrangement 550, similar to those already referred to in Figures 15 and 18. This small motor 549 has the two fields 551 and 552 which may be alternately used in series with the motor armature, but to enable reversal of said armature in well understood manner. These fields 551 and 552 are connected to the contacts 513 and 514 of the unit 508, so that as the actual free-flight speed of the airplane either exceeds or is less than the indicated speed-setting of the handle 428 the frequency of the motor-generator unit 545 will be raised or lowered as the case may be, to thereby correspondingly adjust the powers being developed by the several power-motors by throttle control thereof, and under synchronism of such power. In other words, although the handle 428 is set to a given free-flight speed, still the result thereof is to adjust and control powers developed by the several power-motors to meet the demand for power as found by the controls, in order to maintain that speed of free-flight.

During the foregoing adjustments of power as dictated by the setting of the handle 428 and the instantaneous actual free-flight speed conditions, as found by the unit 492 in comparison to the setting of the handle 427 (for power-motor rotative speed), the rotative speeds of the several power motors will be maintained in synchronism and control by the several units 535 in comparison to the frequency delivered by the unit 433 over the lines 539, and by use of the polyphase units 527-527a in the respective propeller hubs, all as heretofore explained. Thus speeds of rotation of the several propellers and power-motors will be controlled automatically while powers are adjusted from time to time to maintain free-flight speed constant at the setting of the handle 428.

Now manifestly with this scheme the varying demands for power needed to maintain desired free-flight conditions will be met by adjustments of blade pitches, since speeds are being maintained constant under setting of the handle 427. This condition, however, has limitations, since increasing demand for power due to some condition of flight, in order to maintain free-flight speed, must be met by increased pitches of the blades. Reference to the curves heretofore referred to in this case shows that increase of pitch (angle of attack) results in increased traction or pull up to a certain angle, after which further increase of such pitch angle (angle of attack) results in rapid decrease of traction or pull. Manifestly, therefore, increased power demands (at given rotative speed) can be met only up to a certain point by increase of pitch (angle of attack) results in increased increase of pitch, after which any further increase in demanded power can be met only by increase of rotative speed, without increase of pitch.

In operation, usually the handle 427 will be set for that rotative speed of the power-motors which is proper for take-off and for free-flight conditions requiring rotative speed comparable to the rotative speed used during take-off. Any higher rotative speeds of the motors, required during flight will have to be met either by manual re-setting of the handle 427 or by some form of automatic control related to the controls so far disclosed herein. In the type of blade shifting device herein referred to as being contained within the propeller hub, and which is operated by the rotor 527a working in reaction with the stator 527, there is usually provided a segmental gear 553 which is turned for blade pitch changes by the rotor 527a through a large gear reduction, so that a fraction of one complete rotation of such segmental gear will result in complete setting of the blades from one extreme of pitch to the other. As a simple means of securing supplemental rotative speed control for the power-motors to meet conditions imposed when high pitches or angles of blades have been met, I have shown the contact 554 carried by each of these segmental gears 553, and swinging back and forth with changes of blade pitch. I have also shown the contacts 555 and 556 at the two sides of said swinging contact 554, so that as said contact 554 moves back and forth it will engage either of the contacts 555 or 556 as the case may be. Thus, if increase of pitch should be indicated by clockwise rotation of the segmental gear 553, when the pitch reaches a certain high value the contact 554 will engage the contact 555, whereas when the pitch reaches a certain low value the contact 554 will engage the contact 556, having previously disengaged from the contact 555. Normally the clearance between the contacts 555 and 556 is such the normal adjustments of pitch under control of the unit 527—527a will not result in engagement of the contact 554 with either of the contacts 555 or 556, so that normally the speed adjustments are effected entirely by the reactions between the elements 527 and 527a, and are of relatively small amount, merely to maintain synchronism, or to maintain free-flight speed at the pre-set value as shown by the setting of the handle 427.

There is provided the small reversible series motor 557 for the unit 433, same including the field coils 558 and 559 of opposite winding, so that by exciting either one of these coils the direction of motor rotation is controlled. This motor 557 acts on the contact carrier 560 for the rheostat 561 of the unit 433 in manner similar to the motor 444 of the scheme of Figure 18, that is to say, when the contact carrier has been set to any given setting by the handle 427 (for rotative speed), by excitation of either one or the other of the field coils 558 or 559 the setting of the contact carrier may be increased to that for a higher rotative speed, without change of handle setting, and thereafter the contact carrier may be again reset to the position of the handle setting, all due to the frictional drive between the worm gear reduction of the motor 557 and the rack bar of the contact carrier itself.

I provide a direct current line 562 leading to the several contact elements 554; and I also provide the lines 563 and 564 leading from the contacts 555 and 556 respectively to the terminals of the field coils 558 and 559. Thus, whenever any one of the blade pitch controls reaches the high pitch position of its contact 555 the field coil 558 of the motor 557 will be energized, causing the rheostat 561 to be cut into a higher resistance, and causing increase of frequency delivered by the unit 433, and over the lines 539 to the several blade pitch control devices, and resulting in increase of power-motor speed.

This will result in finally re-setting the pitches of the propellers back to a slightly lower angle, so that the contacts 554 will be drawn away from the contacts 555 and further re-setting of the speed of the unit 433 will cease. Then the power-motor speed, and the speeds of the propellers will be retained at the new setting, higher than the indication of the handle 427, until a future time. Likewise movement of the contacts 554 in counter-clockwise direction will result in re-setting of the speed of the unit 433 to a lower value, until finally it is re-set at the value indicated by the setting of the handle 427.

It is noted that with very high velocities of free-flight, as of 400 or 500 or even 600 miles per hour, the velocity of the setting of the handle 427 for take-off will generally be considerably less than that desired for such free-flight speeds, but this condition will be fully taken care of by the provision of the supplemental rotative speed control just above explained.

It should also be noted that if desired an inter-connection might be provided between the two control handles 427 and 428, similar to those illustrated in Figures 12, 13 and 14, hereof, so that settings of the handle 428 for high velocities of free-flight would be automatically accomplished by proper settings of the handle 427 for corresponding rotational rates of the power-motors, thereby avoiding the necessity of automatic control of the re-setting of the unit 433 as just above explained.

It is also here noted that if desired the contacts 555 of the scheme of Figure 19 might be made angularly adjustable so that the actual blade angle at which said contacts should become effective could be adjusted. Thus, with increase of free-flight velocity said contacts should be set to higher angle positions, since, manifestly, with increase of velocity of free-flight the actual blade angles should be increased in order to maintain the desired angle of attack. For example, when operating at 500 miles per hour free-flight velocity the actual angle should be greater (for a given angle of attack), and for development of a desired reaction against the air, than for a condition of 400 miles per hour. Still the momentary adjustments of pitch should be effected close to this greater actual angle than at the lower velocities of free-flight, in order to maintain control of engine speed at the new rotational rate, and to maintain synchronism at the new rotational rate. In other words, the unit 527—527a would then function within a close range of adjustments at this greater angle setting.

If desired a device such as that of the unit 480 of Figure 15 might be connected to the contacts 555 of the respective propeller hubs, serving to constantly reset said contacts at positions dictated by the momentary actual air velocities of the airplane, and serving to ensure at all times a position of the contact 555 which would provide an angle greater than the setting of the blade 483 of such unit by the desired amount of the angle of attack at such momentary velocity of free-flight. In this way the increase of free-flight velocity above that of the setting of the handle 427 would automatically result in a re-setting of the rotational speeds of the power-motors and propellers to higher speeds as needed from time to time according to the free-flight velocities of airplane flight.

It has been shown that the generator 492 delivers polyphase current of frequency proportional to the free-flight velocity of the airplane, and that the generator 545 delivers polyphase current of frequency proportionate to the rate of fuel supply to each power-motor (operating through the lines 162 to 165 of Figures 18 and 20 of Serial No. 459,336, now Patent No. 2,612,956). Consequently we have immediately at hand means to determine and use the ratio of these frequencies for various purposes. But of immediate interest is the fact that comparison of these frequencies makes possible a very simple determination of economy of operation of the airplane in flight. Thus, for example;

$$N = \frac{\text{Miles per hour}}{\text{Gallons per hour}}$$

where N represents over-all economy of operation, taking account of all operating conditions under which the airplane is operating. Or, we may say that $$n = \frac{\text{Miles}}{\text{Gallons}}$$

to ascertain the miles per gallon, or the miles per hundred gallons, or other unit of comparison. This comparison therefore may be very readily made from the information supplied by these two frequencies.

Now it is desirable to be able always to operate the airplane at that set of conditions (for the preselected rate of free-flight velocity) which will give the most economical operation in fuel consumption. Such operation at maximum or optimum economy must take into consideration the rotational speed of the power-motors, the blade pitches, and other factors always present, and also such conditions as height above sea-level, density of the surrounding air, etc. Still, the comparison of the two frequencies just referred to will at all times give the actual economy of operation for the existing conditions.

Having set the handle 428 to a desired velocity of free-flight, it is evident that the scheme of Figure 19 will ensure that fuel flow is proper to provide the power needed to sustain that free-flight velocity; and the setting of the handle 427 will ensure that the power-motor speed is of the value predetermined by the pilot. Also, the arrangement of that figure ensures that the blade pitches will be maintained at such angle of attack as will absorb the prescribed or called for power to sustain that velocity of free-flight, and will also maintain the several power-motors in synchronism. That scheme also ensures that whenever the called for power necessary to sustain that pre-set free-flight velocity is such, taking into account the pre-set speed of rotation of the power-motors that an excessive pitch is necessary, said speed will be automatically re-adjusted over the lines 563 and 564.

Now it is well understood that for any given set of operating conditions, such as power demand etc., there is an optimum set of specifications in the operation of the propeller to secure maximum economy of operation. For example, for any specified propeller the economy of operation thereof will vary with rotational speed, and such variation may be determined for a given pitch of the blades, etc. For any such given set of conditions, however, a curve plotted to represent overall economy vs. rotational speed will rise to a maximum value, and will then descend, so that there is, for such propeller and for any specified pitch angle of the propeller blades an optimum speed of rotation to secure maximum economy in its conversion of fuel into power to sustain flight. A family of curves may be plotted showing overall economy vs. rotational speed, each curve showing overall economy for a specified blade pitch, all other operating conditions remaining constant. Other families of curves may also be determined and plotted between overall economy and single selected variables of operating conditions. For example such a family of curves may be plotted wherein each curve shows variation of overall economy vs. blade pitch, each such curve showing overall economy for a specified rotative speed, all other operating conditions remaining constant. An infinite number of such curves may be plotted, each showing the variation of economy with a selected variable condition, all other conditions being held constant. Such other variables may include height above sea-level, air temperature, relative humidity, conditions such as icing, etc. It is, however, desirable to always operate the several power-motors at such conditions of rotational speed, pitch of blades, etc., as will give maximum economy of operation, over-all. This is merely another way of saying that it is desirable, once we have determined on a velocity of free-flight, to maintain that velocity with the power-motors and propellers operating under those conditions which will require the least total fuel consumption for the trip. I shall now show how I have provided automatic controls which will give these results.

For this purpose reference may be had to Figure 21 which shows schematically a set of controls largely supplemental to those of Figure 19 and other figures, and usable in connection with the scheme of Figure 19 and other figures. Figure 19 has not been reproduced in Figure 21 largely to simplify these disclosures. In Figure 21 I have reproduced the generator 492 whose rate of rotation is proportional to the velocity of free-flight, and the generator 545 whose rate of rotation is proportional to the rate of fuel consumption. The lines 541ª and 546 leading from these generators are also shown in Figure 21. These lines carry the frequencies already referred to. I have shown in Figure 21 means to automatically compare these frequencies and determine at all times the ratio between them. This means as shown comprises the two cylindrical members 565 and 566, mounted for rotation on their longitudinal axes, and parallel to each other. The element 565 is provided with the surface groove 567 which is of logarithmic form, and the element 566 is provided with the surface groove 568 which is also of logarithmic form. These grooves are conveniently determined on the Napierian system, and each groove includes at its beginning or left hand end a turn which is arbitrarily formed merely to take care of the infinitely long portion which such curve would otherwise have, and which arrangement is proper in view of the uses to which these grooves are to be placed, as will presently appear.

Furthermore, these two grooves are conveniently cut for several revolutions around each cylinder, so that a sufficiently large numerical denomination of absolute values may be accommodated on a cylinder of convenient length. For example, if the free-flight velocities to be taken care of run as high as 600 miles per hour, the groove of the cylinder 565 should be so cut as to read to that amount, or proportionate thereto, and if the rate of fuel consumption should amount to as much as 1000 gallons per hour the groove of the cylinder 566 should be so cut as to read to that amount, or proportionate thereto.

The cylinder 565 is mounted for rotation, but not for endwise movement; whereas the cylinder 566 is mounted for both rotation and endwise movement. That fact is attested by the dotted portions at the ends of the cylinder 566 representing, at the left hand end the normal or initial or unmoved position of such cylinder, and at the right hand end the fully moved or extreme position of such cylinder. Between these two cylinders is movably mounted or carried the slide 569. This slide preferably has its side walls formed on arcuate segments to snugly embrace the surfaces of the two cylinders, but the slide is free to move readily according to the dictates of the grooves. This slide has two inwardly extending pins which engage the two grooves of the two cylinders, so that the slide will function according to the respective cylinder positions and conditions of cylinder rotation. Furthermore, it will be evident that the endwise moved position of the slide will depend on the number of turns which the cylinder 565 has performed from its initial or unmoved position, the slide moving toward the right in Figure 21 as the cylinder 565 rotates in the direction representing increase of velocity of free-flight. Since the slide also engages the groove of the cylinder 566 it is evident that said cylinder 566 will be moved toward the right as velocity of flight increases. But the slide has a pin engaging the groove of the cylinder 566, so that any rotation of said cylinder 566 representing increase of rate of fuel consumption will tend to set the cylinder 566 back towards the left in Figure 21. In this connection it will be understood that the two cylinders 565 and 566 are respectively rotated, in comparison to the manner in which their respective grooves are formed, in such directions that the velocity cylinder 565 tends to set the slide towards the right, whereas the fuel rate of flow cylinder 566 rotation tends to set the slide back towards the left.

Another way of considering the matter is that the slide tends at all times to subtract the readings of the cylinder 566 from the readings of the cylinder 565. Due to the simultaneous engagement of the slide with both cylinder grooves, and the fact that the cylinder 565 is held against end-wise movement whereas the cylinder 566 is capable of end-wise movement it follows that the cylinder 566 will assume an end-wise moved position which is equal to the differences of axial components of the rotated portions of the two grooves; in other words, the cylinder 566 will always assume an endwise moved position which is the difference between the logarithms of the two amounts of rotation, being equal to the logarithm of the velocity of free-flight minus the logarithm of the rate of fuel consumption. This difference of logarithms is the logarithm of the quotient obtained by dividing the rate of free-flight by rate of fuel consumption, or miles per gallon or per hundred gallons or like result. The endwise moved position of the cylinder 566 may be readily indicated by the circular groove 569ª near one end of such cylinder, and a suitable indicator might be readily engaged with such groove to read on a scale in miles per gallon or like units. In the present case I make use of the endwise movement of this cylinder 566 to actuate certain throttle, rotational speed, and pitch controls which will automatically re-set at all times the various operational elements to the optimum conditions to which I have already referred.

At this point I will mention that it is of course needed to ensure that the cylinders 565 and 566 will at all times assume rotated conditions proportionate to the rates of flight and of fuel consumption, respectively and also to ensure that the rotated position of each cylinder shall remain unchanged until there is a change of the value of the corresponding functions. Such changes of corresponding function are changes of the rotated position of the cylinder 565 with changes of flight speed, and changes of the rotated position of the cylinder 566 with changes of rate of fuel feed or changes of power. I shall now show one means by which I accomplish this result:

I provide a small induction motor element 570 for the cylinder 565 and another small induction motor element 571 for the cylinder 566. Each of these induction motor elements includes the polyphase wound stator 572 and the rotor element 573 or 574, as the case may be, influenced by its stator element. The rotor 573 is connected to the shaft 575 of the cylinder 565, and the rotor 574 is connected to a shaft 576 which is splined to the cylinder 566 so that the rotated condition of the cylinder 566 is at all times dictated by the rotor 574 even while allowing for endwise movement of said cylinder 566. The springs 577 and 578 tend to return the shafts 575 and 576 to their initial positions, and these springs are calibrated so that they permit rotations of the respective cylinders proportionate to the respective rates to be measured. In this connection it is noted that the torques developed by the respective rotors of these units 570 and 571 will be proportionate to the frequencies of polyphase currents delivered to their stators, so that the turning efforts exerted on the respective rotor shafts will result in rotations of said shafts against their springs until these turning efforts have been equalized by said springs, so that the rotated positions of the cylinders will at all times be proportionate to the frequencies heretofore referred to. Manifestly any other suitable means might be substituted for converting frequencies of the lines 541ª and 546 into proportionate rotations if desired without departing from the spirit of the present invention. For example, there might be used centrifugal devices operated at the speed of the motors driven by the frequencies on the lines 541ª and 546 to set the cylinders to rotated positions corresponding to said frequencies, or other schemes might be substituted for that indicated in Figure 21.

As respects the induction units 570 and 571, it will be understood that the torque developed by the squirrel cage rotors 573 and 574 of these units will depend also on the voltage developed by the units 492 and 546, so it will be desirable that means be provided for maintaining constant voltage delivered by these generators at varying speeds, as may be done for example by regulation of their field strengths, somewhat according to the disclosures of my co-pending application, Serial No. 459,336, now Patent No. 2,612,956, and as shown for example in Figure 1 of that patent, at 135. Also, wound rotors might be used in the induction units 570 and 571, with suitable means to adjust the resistances in series therewith to thereby ensure desired calibration of said units with respect to the springs 577 and 578. It is of course understood that the rotors serve to turn the respective cylinders to rotated positions corresponding to the respective frequencies, and then the rotors remain stationary so that the conditions of torque become those of an induction motor at 100% slip. In Figure 21 I have indicated the reversible motor 557 corresponding to the reversible motor 557 in Figure 19. Such a motor 557 is also shown in Figures 22 and 23, and also in Figure 24. This motor in Figure 21 serves to control the rheostat 561 which controls the frequency of polyphase current supplied over the lines 539 to the propeller pitch control devices, so by control of this motor 557 in Figures 19 and 21 we shall control motor speed of the power-motors and propellers by pitch control, while maintaining the rotating speeds of the power-motor propeller units in synchronism. These controls are effected by the endwise positioning of the cylinder 566 of the "Econometer" shown in Figure 21 as I shall now show.

Reference to Figure 20 shows typical performance curves for a specified propeller, as respects variation of net overall efficiency or economy with rotational speed, for several typical conditions of blade pitch, elevation above sea-level, etc. Each of these curves shows the above relationship between overall efficiency or economy and rotative propeller speed for a given set of conditions including blade pitch, elevation above sea-level, humidity of the atmosphere, icing, and many other factors. Evidently an infinite number of such curves might be plotted, each one on the basis of a change of specified amount in any one of the conditions affecting economy. Other similar curves could be plotted showing the relationship between overall efficiency or economy and blade pitch or angle of attack for a given set of conditions including rotative speed, elevation above sea-level, humidity of the atmosphere, icing, and many other factors. In such case, too, an infinite number of such curves might be plotted, each on the basis of a change of a specified amount in any one of the conditions affecting economy. Thus the full line curve 579 may represent such performance curve for a given set of conditions and curves 580, 581 and 582 may represent performances under three other sets of conditions. Now it will be noted that in the case of each curve there is an optimum condition, indicated by the peak of the curve, these peaks being shown at 583, 584, 585 and 586 for the four curves 579, 580, 581 and 582, respectively. The attainment of the maximum overall efficiency or economy may be effected by change of either blade pitch or rotative speed, or both, as will hereinafter appear. When the control for maximum economy is effected by change of rotative speed it is desired that no matter what operating conditions may be in force, the rotational speed of the power-motors shall be brought to that value which will correspond to the peak of the curve for such operating conditions, so that the velocity of free-flight may be maintained at minimum expenditure of fuel, and for other desirable reasons which will be evident. When the control for maximum economy is effected by change of blade pitch it is also desired that no matter what operating conditions may be in force, the blade pitch of the propeller shall be brought to that value which will correspond to the peak of the curve for such operating conditions, so that the velocity of free flight may be maintained at minimum expenditure of fuel, and for other desirable reasons which will be evident. When the control is by variation of rotative speed it is evident that provision must be made for automatically bringing the blade pitches of the propellers for development of total traction needed to maintain the free flight speed of the airplane at the value pre-set by the pilot's control unit such as the handle 428 in various figures. When the control is by variation of blade pitch it is evident that provision must be made for automatically bringing the rotative speeds of the motors and propellers to proper values for development of the total traction needed to maintain the free flight speed of the airplane at the value pre-set by the pilot's control unit such as the handle 428 above mentioned. All such means are herein disclosed.

Now examination of these several curves of Figure 20 shows that in passing from one of them to another we may find it necessary to increase power-motor speed, or in other cases to reduce such speed, to operate on the peak of the curve of the new operating conditions. Thus, if operating or other conditions change so that we pass from the curve 579 (peak at 1575 R. P. M.) to the curve 582 (peak at 1875 R. P. M.) we should increase the R. P. M. from 1575 to 1875; whereas if operating conditions change so that we pass from the curve 579 to the curve 581 (peak at 1325 R. P. M.) we should decrease R. P. M. from 1575 to 1325. It is also noted that in passing from the optimum condition of one curve (due to one set of conditions) to the optimum condition of another curve (due to another set of conditions), we may find that our new over-all economy is either greater or less than that previously existing. This is the same as saying, for example, that the best performance possible at one elevation above sea-level will be different from that possible at some other elevation above sea-level. It is thus evident that we shall, in order to maintain the optimum economy at the new set of conditions by control of rotative speed, sometimes have to increase such rotative speed, and sometimes decrease such speed by proper control of the motor-generator unit 433; and it is further evident that the movements of the cylinder 566 of the "Econometer" will sometimes be to the right in Figure 21, and sometimes to the left in said figure, depending on whether or not the new set of conditions give greater or smaller optimum economy. It is further evident that it is desirable to bring about the controls of the rheostat 561, and therefore the operations and direction of rotation of the motor 557 in Figure 21, entirely automatically, and merely by movements of the cylinder 566 endwise as the economy of operation changes from time to time, due to changing conditions of operation. At the same time it is an object to ensure that in every case the re-adjustments of the rheostat 561 will be such as to ensure optimum conditions of economy under the new conditions of operation. In other words, it is the object to ensure maximum economy of operation, and minimum fuel consumption at all times, automatically produced by the controls now to be disclosed.

Referring to Figure 21, I provide a finger 587 which engages the encircling groove 569ª of the cylinder 566 so that said finger moves back and forth as dictated by the changing economy of operation. Movement of said finger towards the right represents increase of economy, and movement towards the left, decrease of economy. Said finger carries a motor circuit closing contact element or finger 588, and a motor contactor 589 is actuated back and forth by this finger 588 but with a slight amount of play, due to the pin and slot engagement shown at 590. Said contactor 589 has contacts facing in both directions. There is a contact follower 591 which is mounted to ride back and forth with the finger 588, being moved in either direction by the contact engagements, and said contact follower 591 carries the two contacts 592 and 593 which are insulated from each other, and are separated slightly more than the total separation between the two contacts of the motor contactor 589. In the position shown both of the contacts of the motor contactor 589 are disengaged from the contacts 592 and 593 of the contact follower 591.

The contact follower 591 has the two contacts 592 and 593 so mounted that as the motor contactor moves in either direction and contact is established with either of the contacts 592 or 593, further movement of the motor contactor will cause said contact follower to follow the movement of the motor contactor to some new position of measured economy as established by the changed conditions of operation due to such movement of the motor contactor, so that in case of slight retrograde movement of the motor contactor at such new position the contacts of said motor contactor will both disengage from the respective contacts 592 and 593, allowing the contact follower to remain in its new position for the time being, but ready for another movement in either direction as needed at some future time.

Just behind the contact 592 is another contact 594 also carried by the contact follower 591, and normally free of the contact 592; and when the motor contactor 589 is moved towards the left (decreasing economy) it first engages the contact 592, and then if movement towards the left is continued slightly, there will be established engagement with the further contact 594 for reasons presently to become apparent. The arrangement is such that in movement towards the left (lowering economy) the movement of the motor contactor 589 will not cause the contact follower 591 to actually commence movement towards the left merely by engagement with the contact 592 but in such leftward movement there must be further slight movement, to bring the contact 592 against the contact 594 in order to cause leftward movement of the contact follower 591.

The contact follower 591 also carries another contact 595 which will be engaged by the contact 596 of the motor contactor 589, slightly prior to engagement of the contact 592 by the adjacent contact of the motor contactor 589. In other words, during a leftward movement of the finger 587 (lowering economy) the sequence of contacts is as follows: motor contactor with contact 595, then motor contactor with contact 592, then contact 592 (and motor contactor) with contact 594, both of contacts 595 and 592 remaining engaged.

The rheostat shifting motor 557 is shown as having the two field coils 558 and 559 of opposite windings so that either of these coils may be brought into the series circuit with the motor armature, but with reversal of direction of armature rotation. It is intended that when a slight movement of the finger 587 of the economy ratio determining device takes place in either direction, there shall be set up a sequence of operations to re-set the motor 557 and therefore the rheostat 561 to bring about a new speed of the motor generator supplying the lines 539 so that the new speed of power-motor operation desired shall ensue. Such slight movement of the finger 587 in either direction also moves the motor contactor 589; and in case of movement towards the right the contact 593 will be engaged after a very slight movement of the motor contactor, whereas in case of movement towards the left the contact 595 will be first engaged and very shortly thereafter the contact 592 will be engaged. The motor contactor 589 connects by the line 597 with a source of direct current supply, such as the battery 598 (or battery shown in Figure 19), so that one pole is always in connection with said motor contactor 589. The contact 593 connects to the armature side of the series motor 557 by the line 599, and the solenoid of a relay 600 is placed in this line, so that said relay is always energized when the contact 593 is engaged. The contact 592 connects by the line 601 with the line 599 at a point beyond the solenoid 600, and the solenoid of a second relay 602 is placed in this line 601.

It is now evident that whenever either of the contacts 593 or 592 is engaged by the motor contactor one pole of the supply line will be connected directly to the armature side of the motor 557. There is provided a reverser 603 including the solenoid 604 acting on the armature 605 to pull same down against the spring 606, and said armature carries the flexible projection 607 at its lower end. The contactor carrier 608 is pivoted at 609, and has the arm 610 carrying the contact 611. There are placed two contacts 612 and 613 adjacent to one extreme of movement of the contact 611, and two contacts 614 and 615 adjacent to the other extreme of movement of said contact 611. In either extreme of movement of the reverser the contact 611 engages one of these pairs, 612—613 or 614—615, as the case may be. The arm 610 has the cam surface or block 616 which will be engaged on one or the other of its faces by the flexible projection 607, so that said arm will be tilted first in one direction and then in the other with succeeding excitations of the solenoid, 604. In other words, the single solenoid serves to operate the reverser first in one direction and then in the other direction, to place the contact 611 first in engagement with the contacts 612 and 613, and then in engagement with the contacts 614 and 615.

The free terminals of the two field coils 558 and 559 connect to the contacts 614 and 613, respectively. The reverser contact 612 connects to the other terminal of the battery or source of current by the line 617, a flexible connection 618 being provided in this line if desired. It is now evident that movement of the motor contactor 589 in either direction due to change in measured economy as determined by the movement of the cylinder 566 endwise will result in closing of a circuit through the motor 557, and that rotation of such motor will be in a direction dependent on the position of the contact 611 and arm 610 as last set by a previous operation. Such direction of motor operation may, therefore be to either increase or decrease rotational rate of the power-motors of the airplane, and up to this point the control device has merely served to bring the motor into operation for a corrective result. If the direction of motor rotation be such as will establish conditions resulting in increased economy, then there will promptly follow a movement of the cylinder 566 towards the right in Figure 21, whereas if the direction of motor rotation be such as will establish conditions resulting in a decreased economy, then the cylinder 566 will promptly commence to move towards the left in Figure 21. It has already been shown that sometimes changed conditions will require increased rotative speed of the power-motors to ensure optimum economy, whereas in other cases a decrease of rotational speed of the power-motors will be required, but with the arrangements so far disclosed the closing of the motor circuit may or may not be for motor operation in the proper direction. I shall now show how such proper direction of motor rotation (motor 557) will be automatically accomplished.

It is to be remembered that when once an optimum condition of operation has been produced, power-motor speeds being proper for such optimum condition, the motor contactor 589 stands free of all the contacts 592, 593 and 595, and until there comes a change in the economy as metered by the position of the cylinder 566 this condition will continue. As soon, however, as there is any change of operating conditions which will change the economy, such for example as a shifting of the elevators of the airplane to either rise or descend, the cylinder 566 will shift either to the right or to the left, thereby establishing connection to one or the other of said contacts, and setting into motion the corrective devices herein disclosed. Such corrective action should and will then continue in the proper direction until the motor-propeller condition (rotational speed) of the power-motors has been brought to the point for optimum economy under the new conditions, whereupon further correction will cease. This result is obtained as follows:

First assume the condition that a slight increase of economy occurs so that the cylinder 566 is moved towards the right. This might be due, for example, to a re-setting of the airplane elevators for a slow descent. In such case the motor contactor 589 will shift towards the right and almost immediately contact will be established with the contact 593. This will close the motor circuit for motor rotation in direction dictated by the previous setting of the reverser. If that direction is correct for the new operating conditions, that is, if the new operating conditions are such that maximum economy of operation will be secured by increase of power-motor rotative speed, then the action of the cylinder movement will be cumulative, and it will continue to move towards the right, as we are improving economy of overall operation by increasing the power-motor speed. This might be the case for example if the flight conditions changed so that instead of the curve 579 of Figure 20 representing the relation of overall economy to rotative speed, the curve 582 of said figure has now become the one representing relation of overall economy to rotative speed. Presently we shall arrive at a power-motor speed of 1875 R. P. M. such that further increase thereof will cease to improve economy, being the peak point 586. Finally, as we move over the peak of the curve, the over-all economy will actually decrease again. At that instant, when we have just passed the peak of the curve, there will occur a retrograde movement of the finger 587, and of the motor contactor 589, so that at once the motor contactor will break away from the contact 593, opening the motor circuit, and leaving the power-motors to continue operation at the newly adjusted rotational speed, and with maximum economy under the operational conditions then in force.

Next suppose that when the motor contactor 589 moves to the right and engages the contact 593, thereby closing the motor circuit, the direction of motor rotation will be found to be such as to bring about an actual decrease of economy. This condition might arise for example in case of transition from the curve 579 to the curve 581 (Figure 20). Examination of Figure 20 shows that rotational speed of the power-motors should now be reduced to secure peak curve economy under these new conditions of operation. It is remembered that the reverser was previously set to position to cause rotation of the motor 557 in direction for increase of power-motor rotational speed. Such being the case (reverser being in its previously set position), we have commenced motor rotation in the wrong direction, and the cylinder 566 will commence to move back towards the left, caused by lowering economy of operation. It is thus evident that provision should be made for shift of the reverser position so that the motor 557 will be caused to rotate in direction to reduce power-motor rotational speed. This is done as follows: It was previously stated that there is a pin and slot connection at the point 590 between the finger 588 and the motor contactor 589, so after contact has been established between the motor contactor 589 and the contact 593, such engagement of contacts will be retained, notwithstanding a slight backward or leftward movement of the finger 587, until the contact 596 engages the contact 595. Said contact 595 connects by a line 619 to a contact 620 of the relay 621. Said relay has its solenoid 622 connected at one end to the line 623 which extends to a contact 624 of the relay 600 whose solenoid is in the motor circuit from the contact 593 as already explained. The armature contact 625 of the relay 600 connects by the line 626 to the battery terminal to which the motor contactor connects, so that when the contact 593 is engaged by the motor contactor to place current through the motor, the relay 600 raises its armature, and the contact 624 is engaged by the armature contact 625, and the solenoid 622 of the relay 621 is thus connected to one end of the source of current. The other end of the solenoid 622 connects by the line 627 to the contacts 612 and 615 of the reverser, so that in either position of said reverser said line 627 connects back to the other terminal of the source of current. It is now evident that regardless of the position of the reverser at the commencement of the series of operations, as long as the motor contactor 589 retains engagement with the contact 593, even during the slight backward movement to engage the contact 596 against the contact 595, the solenoid 600 is energized, and thus the solenoid 622 is also energized to retain its armature elevated. Said armature carries the contact 628 which is mounted on a block of insulating material; and said contact 628 connects by the line 629 to the end of the reverser solenoid 604, the other end of said solenoid connecting by the line 630 to the line 617, leading back to the source of current.

The line 623 which connects to one end of the solenoid 622 of the relay 621 also connects to the contact 631 in position to be engaged by the armature of said relay, which armature connects by the line 632 to the other terminal of the source of current. Following out the conditions so far established it will be seen that the engagement of the motor contactor 589 with the contact 593 served to raise the relay 600, while at the same time bringing the motor into operation in the wrong direction. The raising of the relay 600 served to energize the relay 621, raising its armature, thus causing engagement of said armature with the contact 631. This will establish a circuit from the battery 598, over the lines 626 and 632 to the armature of the solenoid 622, thence by contact 631 to top end of solenoid 622, through said solenoid, over the line 627 to reverser contacts 612 and 615, to contact 611 (when the reverser is in one of its extreme positions or the other), pig tail 618, and over line 617 back to the battery. Thus it will be seen that once the armature of the relay 621 has been raised (the reverser being in either extreme position of its movement) a local circuit is established through the contact 631 which will hold the armature of the relay 621 in raised position even when the armature of relay 600 is de-energized by movement of the motor contactor 589 to the left so as to disengage from the contact 593. Raising of said armature of relay 621 served to close circuit through the reverser solenoid, thereby delivering an impulse and reversing the contacts and also reversing the field of the motor 557 which is the desired result. At the same time it will be noticed that as the contact 611 of the reverser was thrown from one extreme of movement to the other it momentarily opened the circuit of the line 627, so that the solenoid 622 of the relay 621 was momentarily de-energized and dropped its armature to the position shown in Figure 21. However, as soon as the reverser contact 611 reached its other extreme of movement it re-established contact with the other of the contacts 612 or 615, as the case may be, ready for another operation at a future time. The locking contact 631 serves to ensure that the above operation will be carried through even in case of actual opening of the circuit between the motor contactor 589 and the contact 593 prior to closing of the contact between the motor contactor 589 and the contact 595.

Upon causing reversal of the reverser as just explained the motor 557 will reverse rotation and thus cause the power-motor rotational speed to be modified in the proper manner to bring about increased economy, thus causing the cylinder 566 to again move towards the right, and bringing into action the contact 593. During this operation the motor contactor will shift to engagement with the contact 593, then leave the contact 592, and supply of current to the motor 557 will come from said contact 593 until the rotational speed of the power-motors has been increased to the value needed to attain the peak of the curve of overall economy now controlling. When the new condition of maximum economy has been reached and the peak of the curve is slightly over-run, retrograde movement of the finger 587 to a very slight degree will open the circuit by backing the contactor 589 away from the contact 593 and bringing the corrective operation to termination. Thus we have effected correct re-adjustment of the power-motor speed in both of the cases where the initial movement of the cylinder 566 is towards the right, meaning that in the initial disturbance there was a tendency towards increase of economy. I shall now consider the conditions where the initial condition of disturbance is such that the cylinder initially moves towards the left, that is, towards lower economy conditions.

Assume that the original disturbance was such as to decrease economy, thereby moving the cylinder 566 and motor contactor towards the left. Slight movement will bring the contact 596 into engagement with the contact 595 thereby delivering an impulse over the line 619 to the contact 620; and since the relay 621 was locked up from a previous operation, this impulse will continue through the contact 628 and line 629 to the reverser solenoid, thereby setting the reverser over to its opposite position. Slight further movement of the motor contactor towards the left will bring the motor contactor 589 against the contact 592. This will supply current to the motor over the line 601 and solenoid of the relay 602, and line 599; and if the direction of motor operation was correct (after having been just reversed by the reverser) for increase of economy, then motor operation in the proper direction will commence for increase of economy. Now, since the relay 600 is down, its armature 625 will engage the contact 633, which connects by the line 634 with the contact 635 above the armature 636 of the relay 602, so that when the relay 602 raises its armature it will be locked up, and current will continue to be supplied to the motor irrespective of continued engagement of the motor contactor 589 with the contact 592. Therefore the increase of power-motor over-all economy will cause the cylinder 566 and finger 587 to move to the right, breaking contact between the motor contactor 589 and the contact 592; but still current for corrective action will be supplied to the motor due to the locking up of the contact 636 against the contact 635. This corrective action to increase economy will continue until finally the contactor 589 moves over far enough to engage the contact 593, whereupon current will be supplied through the relay 600 in manner already explained. The energizing of the relay 600 will cause its armature to rise thereby opening the circuit over the line 634; and since the line 601 is no longer supplying current through the relay 602 said relay will fall and open the circuit at the contact 635. Thereafter current for the continued corrective operation of the motor will be supplied over the line 599 from the contact 593, and when the condition of optimum or maximum economy is reached the motor circuit will open at the position of the contact 593, due to reversal of cylinder movement, and the operation has been completed.

Next we consider the condition encountered when the disturbance to operating conditions causes movement of the cylinder towards the left, and in which the reverser is set for motor operation in such direction as to continue such left-hand movement of the cylinder by motor operation to still further reduce the economy. For example, assume that when the motor contactor contact 596 has engaged the contact 595 the reverser has thrown the contact 611 to position to cause operation of the motor 557 in the economy reducing direction. In such case the finger 587 will continue to move towards the left, after engagement of the contacts 596 and 595, and almost immediately thereafter the motor contactor 589 will engage the contact 592, causing motor operation in the wrong direction, and the finger 587 will continue its movement slightly towards the left, bringing about engagement of the contact 592 with the contact 594. Immediately there will be delivered an impulse of current to the solenoid 604 of the reverser, and at once the reverser will throw over, reversing the fields of the motor, and reversing direction of motor operation. This will immediately cause a corrective action to take place in the proper direction, and the economy of operation will rise, with attendant movement of the finger 587 and motor contactor towards the right. During these operations the relay 600 was not yet energized and its armature was down, but the relay 602 was energized by engagement of the motor contactor with the contact 592, so that said relay 602 will be raised and locked up until the motor contactor engages the contact 593. This will energize the relay 600 which will then rise opening the holding circuit at the point 633, and current will continue to be delivered to the motor in proper manner to continue the corrective effect until the peak of the performance curve is reached whereupon very shortly thereafter the slight backward movement of the finger 587 and motor contactor 589 will open the circuit finally.

Consider the controls of Figure 21 in conjunction with those of Figure 19, and on the assumption that the lines 563 and 564 of Figure 19 have been discarded and the upper armature terminal of the motor 559 in Figure 19 is connected to the line 599 of Figure 21, and that the two field coils of the motor 559 are connected to the reverser contacts 613 and 614 of Figure 21, so that the motor 559 of Figure 19 becomes in effect the motor 559 of Figure 21 and is controlled by the Econometer according to the principles already set forth in detail. Then, it will be seen that a very complete and fully automatic control system will be provided. If we assume that the original setting of the handle 427 for power-motor speed control was below the normal speed range required for the pre-set free-flight velocity as dictated by the setting of the handle 428 it will be seen that the only control required to be manually made during flight will be that of the air-speed as determined by the handle 428. When that handle is set to a given velocity condition the power requirements needed to maintain that velocity will be automatically adjusted from time to time by the motor 549; the power-motor rotational speeds will be automatically adjusted from time to time to maintain maximum economy of operation, that is, lowest fuel consumption consistent with the free-flight velocity being maintained; and the propeller blade pitch settings will be automatically adjusted from time to time to ensure the consumption of the power being delivered by the power-motors and as determined by the requirements of the free-flight velocity; and furthermore, all power-motors will be required to deliver the same amount of power (synchronized for power); and all power-motors will be synchronized for rotational speed. Whenever the pilot may re-set the handle 428 to a new free-flight velocity the power setting will automatically be re-set, the power-motor rotational speeds will adjust themselves for maximum economy of operation under these new conditions; and all other factors will also be re-set to meet the new conditions, all without additional manipulation or thought on the part of the pilot, and while maintaining synchronism of powers and rotational speeds of all the power-motors. Thus the pilot need concern himself with only the one control handle or element during flight. At the same time he will have knowledge that the desired velocity is being maintained, and the trip being accomplished with minimum amount of fuel consumption, consistent with that velocity and the existing conditions such as elevation above sea-level, etc.

It is noted that in the schematic layout of Figure 21 the frequency delivered over the lines from the generator 545 to the induction unit 571 is the control frequency by which th several power-motors are being controlled for power output, and by which said power-motors are being synchronized. Therefore this frequency from this generator 545 will be proportional to the power outputs and rates of fuel flow to the several power-motors. If desired, however, a special fuel metering device or meter might be placed in the fuel line delivering fuel to the power-motors, and driving a polyphase generator, which generator would be the one delivering the frequency to the lines leading to the induction unit 571. In such case the generator 545 might be a special generator driven by a special fuel metering device by which the fuel actually delivered to the power-motors was measured, and thereby a very accurate and positive measurement of fuel consumption would be ensured for operation of the ratio economy determining device.

If desired a double-throw, three pole switch might be provided for the small motor 557, so that thereby said motor could be connected either as shown in Figure 19, or as shown in Figure 21, at the option of the pilot. I have not deemed it necessary to illustrate all the connections for such alternative arrangement, and for such switch, as they are more or less self-evident.

In Figure 25 I have shown a slightly modified form of a portion of one schematic layout embodying features of Figure 21, for example. In the arrangement of Figure 25 I have provided a fuel meter 637 to meter total fuel being delivered to all the airplane power-motors 638, 639, 640 and 641, fuel reaching this meter over the line 642 from a suitable supply, such as a fuel pump, and being delivered to the several power-motors over the line 643. This fuel meter is of any suitable form, and as illustrated it includes the shaft 644 coupled by the coupling 645 to the shaft 646 of the polyphase alternator 647 whose fields are excited by direct current in well understood manner; and this alternator supplies its polyphase current over the line 648 to the induction unit 571 whose shaft 576 acts on the cylinder 566 in manner already explained in detail, for the determination of the optimum economy conditions.

It will now be noted that with the scheme of Figure 25 (in conjunction with the other features associated therewith), the determination of rate of fuel consumption is effected directly by reason of the rate of shaft rotation of the meter shaft 644 (whose rate of rotation is directly proportional to rate of fuel consumption); whereas with the scheme of Figure 21 (as shown completely therein, and not as modified by the arrangement of Figure 25), the determination of rate of fuel consumption is effected on the assumption that frequency of control or pilot alternator 545 is directly proportional to rate of fuel consumption, which should also be the case.

It is noted that the corrective effect of the scheme of Figure 21 to ensure optimum economy conditions of operation, is due to closure of a circuit for operation of the motor 557 whereby the corrective operation is directly performed. That closing of the circuit, with the disclosures so far described, depends on a change of position or economy reading of the finger 587 due to change of the cylinders 565 and 566, or one or both of them. Until such a change of the position of this finger 587 takes place the corrective effect will not be instituted. Generally a change of operating conditions will of itself directly result in change of economy of operation, as determined by these cylinders 565 and 566, as will be evident by comparison of the various curves 579, 580, 581 and 582 of Figure 20. A change from or between any of these curves, at a given propeller R. P. M. will result in a direct change of economy (as evidenced by the different elevations of these curves at a given R. P. M.), so it will usually happen that a change of operating conditions which results in operation on a new curve of "Net overall efficiency" will of itself result in setting into motion the corrective operations of "Econometer" of Figure 21.

Sometimes there will occur changes of operating conditions which, while causing operation thereafter to be on another curve of "Net overall efficiency," still will not cause at once institution of corrective changes, or effects. Thus, if for example the new curve of Net overall efficiency passes through the point of the curve on which operation has previously been occurring (usually the peak of such curve) there will occur no change of economy at the R. P. M. at which the power-motors have been operating, and therefore no corrective effect will be produced by the Econometer because the position of the finger 587 will not thereby be shifted to institute such corrective action. For example, if we have been operating at the point 583 of Figure 20 (being the optimum condition for the curve 579), and if then operating conditions change so that we commence to operate on the curve 649 which passes through the point 583 but rises to a higher value of economy, the passing to the conditions of curve 649 will not in and of itself result in setting the econometer into operation to effect correction of speed necessary to avail ourselves of the possibly higher point of economy to which this new curve 649 rises as shown in Figure 20. I have, however, made provision to institute corrective actions in all cases including those such as I have just described. This provision I shall now explain:

If periodically the motor 557 be brought into action for a slight interval of time, sufficient to effect a slight change of operating conditions (e. g. power-motor rotational speed), then the position of the finger 587 will be periodically slightly altered, sufficiently to institute any necessary corrective operations, and to ensure in any case that we are always seeking a better or more efficient overall operating condition. To this end, in Figure 21 I have shown the small shunt motor 650, cut directly across the source of direct current but under control of the switch 651, which small motor operates at substantially constant speed, and is in effect a more or less accurate timer. This motor drives a rotary contactor 652 at slow speed, to effect a circuit closing operation, say every five minutes for an interval of a few seconds, by reason of engagement of the rotary contact 653 with the stationary contact 654. These contacts 653 and 654 are bridged across the relay contacts of Figure 21, so that whenever this rotary contact functions it supplies current directly to the motor 557 for such short interval, say five or a few seconds, and then again cuts current off from such motor. But that amount of motor operation will effect such slight change of operating conditions as will institute operation of the econometer, and correction will then continue and be carried through in the normal manner by the circuits of Figure 21.

In connection with the foregoing it is also to be noted that in the normal operation of the econometer of Figure 21 the direction of operation of the motor 557 is always such that the economy was rising to and slightly past the point of optimum condition when the circuit was broken at the contact 593; and further, that the final circuit opening of the scheme of Figure 21 always takes place at the contact 593, leaving the reversing switch 603 unchanged. Therefore when the timer next functions in its periodical operations it will cause the motor 557 to operate in the same corrective direction as before, until thereafter some condition shall arise requiring reversal of such motor.

The blade-pitch-control engine synchronizing device shown in Figures 18 and 19 lends itself well to the scheme of controls shown in Figure 21, but I do not intend to limit said scheme of Figure 21 to that pitch-control device or any other, except as I may do so in the claims to follow. On the contrary, I may also use the schematic arrangement of Figure 21 with many other blade-pitch controls and arrangements, such for example, as those shown in Figures 3, 4 and 5, figures shown in said co-pending application, Serial No. 573,382, now Patent No. 2,569,444, or others, including that of the Brady patent, No. 2,217,856, issued October 15, 1940. In so adapting this scheme of Figure 21 for use in connection with any of these other pitch-control devices, or others, and for use in connection with the automatic control and synchronization shown in Figures 18 and 19 (including the setting of pre-selected free-flight velocity which will then be automatically maintained at maximum economy or minimum fuel consumption), it is noted that the functions of the units 492 and 508 are to test the actual air velocity of flight and compare it with the pre-setting of the handle 428 (or the unit 457, Figures 18 and 19), and to thus ultimately ensure suitable fuel and power supply to meet the demands of such pre-set air velocity; and that the function of the unit 557 (Figures 19 and 21) is to ensure control or regulation of the propeller blade-pitches to ensure absorption of the determined power (as thus determined by the unit 457) by adjustment of blade-pitches, while maintaining the propeller and engine speeds synchronized.

In Figure 22 I have shown a schematic layout including the features of the devices of Figures 3, 4 and 5, and the schematic arrangement of Figure 9; in Figure 23 I have shown a schematic layout including the features of Figures 3, 4 and 5, and the schematic arrangement of Figures 8 and 10; and in Figure 24 I have shown a schematic layout including the features of the blade pitch synchronizing arrangement shown in said co-pending application, Serial No. 573,382, and the schematic arrangement including the features of Figure 11. It is not believed necessary to describe these Figures 22, 23 and 24 in full detail, but the following comments are in order:

In the arrangement of Figure 22 the handle 428 for free-flight velocity controls the frequency of the generator 457, to which the frequency of the generator 492 is compared, and the unit 508 then acts as an electrical differential to control the functioning of the motor 548 to control the resistance of the field circuit for the motor 545 which in turn determines the frequency delivered to the lines 546 which control the throttles for synchronizing of power of the several power-motors; and in this layout of Figure 22 the setting of the handle 427 controls the resistance of the field circuit of the motor 433 for the generator delivering polyphase current of predetermined frequency over the lines 539; and these lines 539 supply their current to the units 655 of the several power-motors. These units 655 are of the type disclosed in patent, No. 2,217,856 to Brady including squirrel cage wound rotor elements driven at or proportionately to power-motor speed, so that the "stator" of these units 655 will exercise reactions proportionate to the amount of non-synchronism existing as between the power-motor speeds and the supplied frequency over the line 539. Thereby contacts are closed to either of the lines leading to the fields of the units 656, which thus are rotated in one direction or the other. These reversing motors 656 serve to control the hydraulic valves 657ᵃ of the type shown in Figures 6 and 7 of this application; and thus the pressures of oil or other liquid supplied to the blade shifters 657 are controlled independently of each other, but in manner to maintain synchronism of speed by blade pitch control and by use of such devices as those of said Brady patent, No. 2,217,856.

In this scheme of Figure 22, also, I have provided the motor 557 of the econometer arrangement of Figure 21, same serving to control setting of the resistance 561 for speed of the motor 433 already referred to, to control such speed at rates higher than its manual setting by the handle 427. In this manner power-motor speed is controlled according to optimum economy conditions, and in combination with the other features disclosed herein.

In Figure 26 I have shown how a somewhat different form of individual control device may be used in the scheme of Figure 22, but for the individual controls of the valves 657ᵃ for the hydraulic blade-shifting devices 657 of the type shown in Figures 3, 4 and 5 hereof. In this Figure 26 I have shown a synchronous unit 658 of the type disclosed in my co-pending application, Serial No. 459,336, now Patent No. 2,612,956. This unit includes a polyphase wound "stator" element and a direct current excited field element, latter being positively driven by the power-motor at or proportionately to power-motor speed; so that any lack of synchronism as between the frequency supplied over the lines 539 and the rotational speed of the power-motor is reflected in a rotation of the "stator" element in one or the other direction. This rotation of the "stator" element serves to act on the hydraulic valve 657ᵃ to control the spring setting thereof and thereby to control the pressure of oil delivered to the blade-pitch control devices 657 (being Figures 3, 4 and 5 of the present application). If necessary, a frictional slip connection may be provided between the unit 658 and the valve stem to permit continuous rotation of the "stator" of said unit 658, according to the disclosures of my co-pending application, Serial No. 459,336, now Patent No. 2,612,956, already referred to. It is noted that the type of unit shown in Figure 26 for correctional operation of the pressure reducing valve is one wherein the correctional function will take place at a decreasing rate as the condition of synchronism is approached, until finally absolutely perfect synchronism is attained.

In the arrangement shown in Figure 23 the unit 545 serves to control and synchronize the power-motors for speed by throttle control, over the lines 546, and according to the disclosures of Figures 1, 17 and 19, of Serial No. 459,336, now Patent No. 2,612,956, previously referred to; and in the present case the handle 428 serves to control the unit 457 which determines the free-flight velocity, working through the differential unit 508; but in the present case this differential controls the reversible motor 548 for control of propeller blade-pitches as a group or gang. This is done by the pressure reducing valve 659, of the type of Figures 6 and 7 of the present application; and the blade-shifting devices 660 are of the type shown in Figures 3, 4 and 5 of this application, or other suitable type. It is noted that with this scheme the synchronization of the power-motors for speed is effected by throttle control thereof.

In each of the schemes of Figures 21, 22 and 23 the controls of the econometer to secure optimum economy are effected by control of rotational speed of the power-motors, rotative speed, synchronism of said motors being secured either by throttle control or by blade-pitch control. It is to be noted, however, that the characteristic curve of propeller efficiency vs. pitch also rises to a maximum point for a certain value of pitch (under certain operating conditions), and thereafter falls; so that it is possible to secure the condition of optimum economy by causing the econometer to act on the blade-pitch shifting device for pitch-control, instead of acting on the power-motor speed controls. I contemplate such arrangements as being within the scope of my invention.

In Figure 24 I have shown schematically an arrangement in which the econometer operates to effect blade pitch variation to the condition of optimum economy, the air-flight velocity control acting on the power-motor rotational speed and synchronism controls. In this arrangement of Figure 24 the reversible motor 557 controlled by the econometer serves to rock the shaft 95 of the unit of Figure 24 back and forth to operate the plungers in the small cylinders 62, 63, 64, 65, 66, 67, 68 and 69 for delivery of oil through the lines 54, 55, 56, 57, 58, 59, 60 and 61 to the blade pitch controls of that figure, to thereby effect blade-pitch control with the pitches of the several propellers synchronized at all times, and according to certain of the disclosures of my co-pending application, Serial No. 573,382, now Patent No. 2,569,444, of which the present application is a division. In this case the said motor 557 must be of size sufficient to effect variation of pitch of all the propellers simultaneously, and I have therefore, in Figure 24 shown the relays 661 and 662 interposed between the motor 557 and the control circuits of Figure 21, as would be good practice. In other words, in the scheme of Figure 24 the contacts 613 and 614 of Figure 21 are connected to the solenoids of the relays 661 and 662, and the common return of said solenoids is connected to the line 599 of Figure 21, so that the circuits are modified to the extent that one or the other of said relays will be energized instead of energizing one or the other of the field coils 558 and 559 of Figure 21.

In Figure 27 I have shown typical characteristic curves of efficiency vs. pitch for a propeller for two typical conditions of operation, and it is evident that each of these curves presents a peak at which optimum economy of operation is possible.

The following comments are in order concerning various of the schematic arrangements herein disclosed:

In the arrangement of Figure 19 (as modified by insertion of the "econometer" at the lines 563 and 564, in place of the connection of said lines to the contacts 555 and 556), we have velocity of flight controlling the throttles for synchronized power, and we have the econometer controlling the power-motor rotational speeds for optimum economy of operation, and with rotative speeds synchronized by control of blade pitch (for example, by such units as shown in the Martin patent, No. 2,302,042) or other synchronizing arrangement. This is a full electric control and synchronization, both of power, speed, and blade-pitch.

In the arrangement of Figure 22 we have velocity of flight controlling the throttles for synchronized power, and we have the econometer controlling the power-motor rotational speeds for optimum economy of operation, and with rotative speeds controlled by individual hydraulic control of blade pitch for synchronization of said speeds (for example by such arrangements as those of Figures 3, 4 and 5 hereof), said hydraulic controls being of the type wherein pitch is balanced against traction needed to ensure the speed control and the power consumption. This is a combination of electric power synchronization and individual hydraulic pitch control.

In the arrangement of Figure 23 we have velocity of flight controlling the blade pitches by gang hydraulic control for synchronized tractions or pulls of the several propellers and with total pull determined according to the requirements of maintaining the pre-set velocity of flight, and we have rotative speeds controlled by the econometer and synchronized at the same time by throttle control. This may in some senses be considered as an inversion of the previously mentioned arrangements (those of Figures 19 and 22).

In the arrangement of Figure 24 we have velocity of flight controlling the throttles of the power-motors for synchronized speed and we have the econometer controlling the blade pitches for optimum economy of operation, effecting blade pitch control hydraulically and with pitch synchronization of the several propellers (for example by use of such a unit as that of Figures 11 and as shown at the top of Figure 24).

It is further to be noted that in each of these schemes the pilot has but a single control to look after during normal flight, namely, that controlling free-flight velocity. All other controls are automatically taken care of with proper synchronization of functions of the several power-motors. It is a feature of this portion of my present invention that although only one function is thus manually set or controlled by the pilot (namely, free-flight velocity), and although there are three functions which are inter-related in the power-motor operation (namely, speed, torque, and power), still the interposition of the effect of the econometer, and proper relationing thereof to these functions ensures a proper correlation so that no runaway conditions can occur, either as to rotative speed or as to blade pitches.

The following important relationship and functioning is emphasized:

The tractive effort or propulsive force needed to propel the airplane through the air is transmitted from the propellers (the propulsive force developing elements), or other propulsive force developing elements, to the body of the airplane by pressure developed against the fluid body (in those forms using a fluid medium, such as shown in Figures 3, 4 and 5, for example), and as the amount of propulsive force needed varies due to any cause, the arrangements herein disclosed provide the means needed to change the hydraulic (or other) force to a value which will meet the requirements at each moment. In the present application such means also includes means to ensure that the propulsive force shall at all times be correct to propel the airplane at a predetermined speed, and also includes means to cause the hydraulic force to assume a value which will transmit that amount of propulsive force to enable the airplane to maintain such speed.

When travelling on a level course the propulsive force needed to maintain the predetermined speed is that force needed to overcome the air resistance of the airplane at the predetermined speed, such air resistance depending on air density (dependent on elevation above sea-level and other causes), atmospheric conditions, and other factors such as any icing or varying conditions of the foil surfaces moving through the air. However, when the airplane is travelling on a course other than level, or when the axis of the airplane is tilted either up or down from its horizontal condition due to any cause, the propulsive force needed to maintain the pre-determined speed will be modified by an amount equal to the weight of the airplane and all of its cargo, multiplied by the sine of the angle of such tilt. When tilted up such modifying amount of force will be additive—when tilted down such modifying force will be subtractive. But in either case the net force which must be developed by the traction or propulsion producing elements and which must be transmitted to the body of the airplane, will be transmitted through the medium of the hydraulic (or other) force transmitter, and the present application shows the means to ensure that said hydraulic or other transmitting force shall be at all times correct to ensure maintaining the pre-determined speed of the airplane. Therefore, when using features of the present invention it is not necessary to make any special provision to ensure that at all times, when desired, the airplane speed shall be at the desired value, whether the airplane be climbing or descending, or running level, and on the assumption that the available power shall be sufficient to meet the full requirements of maintaining such speed under the operating conditions then prevailing, including such angle of tilt, the elevation above sea-level, atmospheric conditions, conditions of the foil surfaces, and all other factors affecting the power requirements.

I claim:

1. In an airplane having a power propelling unit including an internal combustion motor and a variable pitch propeller in driving connection with said motor, pitch varying means for said propeller, a fuel supply connection to deliver fuel to the motor of said unit, means to control the rate of fuel delivery to said fuel supply connection, airplane speed detection means including means to generate and deliver a frequency which is of value corresponding to the speed of the airplane, adjustable airplane speed determining means including means to generate and deliver a frequency which is adjustable to preselected values corresponding to pre-selected airplane speeds, manual means to control said airplane speed determining means to deliver its frequency at any selected value corresponding to a pre-selected airplane speed, a differential control device including a movable element and including means to cause said movable element to move in direction corresponding to the algebraic difference between the values of the frequencies generated by the airplane speed detection means and the airplane speed determining means, means to meter fuel delivered to the fuel supply connection, said fuel metering means including a movable element movable at a rate proportional to the rate of delivery of fuel to the fuel supply connection, means to determine the ratio between airplane speed and the rate of delivery of fuel to the fuel supply connection, said ratio determining means including a first function element and a second function element, connections between the airplane speed detection means and the first function element effective to cause said first function element to function proportionately to the frequency delivered by the airplane speed detecting means, connections between the movable element of the fuel metering means and the second function element effective to cause said second function element to function proportionately to the rate of movement of said movable element of the fuel metering means, said ratio determining means including a movable ratio indicating element movable to a position corresponding to the ratio of airplane speed compared to rate of delivery of fuel to the fuel supply connection, the pitch varying means of the propeller comprising one motor power adjusting device and the means to control rate of fuel delivery to the fuel supply connection comprising another motor power adjusting device, the movable element of the differential control device comprising one controlling device and the ratio indicating element comprising another controlling device, operative connections between one of said controlling devices and one of said motor power adjusting devices effective to move said motor power adjusting device in direction to reduce the difference between the frequencies delivered by the airplane speed detection means and the airplane speed determining means, and operative connections between the other controlling device and the other of said motor power adjusting devices effective to move said other motor power adjusting device in direction to cause the movable ratio indicating element to move to higher ratio positions.

2. Means as defined in claim 1, wherein there are operative connections between the differential control device and the means to control the rate of fuel delivery, and operative connections between the ratio indicating element and the pitch varying means.

3. Means as defined in claim 1, wherein there are operative connections between the differential control device and the pitch varying means, and operative connections between the ratio indicating element and the means to control the rate of fuel delivery.

4. In an airplane having a plurality of power propelling units each unit including an internal combustion motor and a variable pitch propeller in driving connection with said motor, pitch varying means for each such unit, a fuel supply connection to deliver fuel to the motor of each unit, a common fuel supply means for all of the motors, fuel supply connections from said common fuel supply means to the fuel supply connections to all the motors, means to control the rate of fuel supply to the motors, airplane speed detection means including means to generate and deliver a frequency which frequency is of value corresponding to the speed of the airplane, adjustable speed determining means including means to generate and deliver a frequency which is adjustable to pre-selected values corresponding to preselected airplane speeds, manual means to control said airplane speed determining means to deliver its frequency at any selected value corresponding to a pre-selected airplane speed, a differential control device including a movable element and including means to cause said movable element to move in a direction corresponding to the algebraic difference between the values of the frequencies generated by the airplane speed detection means and the airplane speed determining means, means to meter fuel supplied by said common fuel supply means for all the motors, said fuel metering means including a movable element movable at a rate proportional to the rate of delivery of fuel to all of the motors, means to determine the ratio between airplane speed and the rate of delivery of fuel supplied to all of the motors, said ratio determining means including a first function element and a second function element, connections between the airplane speed detection means and the first function element effective to cause said first function element to function proportionately to the frequency delivered by the airplane speed detection means, connections between the movable element of the fuel metering means and the second function element effective to cause said second function element to function proportionately to the rate of movement of said movable element of the fuel metering means, said ratio determining means including a movable ratio indicating element movable to a position corresponding to the ratio of airplane speed compared to rate of delivery of fuel to the common fuel supply means for all the motors, the pitch varying means of the propellers comprising one motor power adjusting device and the means to control rate of fuel supply to the motors comprising another motor power adjusting device, the movable element of the differential control device comprising one controlling device and the ratio indicating element comprising another controlling device, operative connections between one of said controlling devices and one of said motor power adjusting devices effective to move said motor power adjusting device in a direction to reduce the difference between the frequencies delivered by the airplane speed detection means and the airplane speed determining means, and operative connections between the other controlling device and the other of said motor power adjusting devices effective to move said other motor power adjusting device in a direction to cause the movable ratio indicating element to move to higher ratio positions.

5. Means as defined in claim 4, wherein there are operative connections between the differential control device and the means to control the rate of fuel supply to the motors, and operative connections between the ratio indicating element and the pitch varying means.

6. Means as defined in claim 4, wherein there are operative connections between the differential control device and the pitch varying means, and operative connections between the ratio indicating element and the means to control the rate of fuel supply to the motors.

7. In an airplane having a plurality of power propelling units each unit including an internal combustion motor and a variable pitch propeller in driving connection with said motor, pitch varying means for each such unit, a fuel supply connection to deliver fuel to the motor of each unit, means to control the rate of fuel delivery to each such fuel supply connection, airplane speed detection means including means to generate and deliver a frequency which is of value corresponding to the speed of the airplane, adjustable speed determining means including means to generate and deliver a frequency to pre-selected values corresponding to preselected airplane speeds, manual means to control said airplane speed determining means to deliver frequency any selected value corresponding to a pre-selected airplane speed, a differential control device including a movable element and including means to cause said movable element to move in a direction corresponding to the algebraic difference between the values of the frequencies generated by the airplane speed detection means and the airplane speed determining means, means to operate all of the rate of fuel delivery means simultaneously, means to deliver fuel to the fuel supply connections of all of the motors, means to meter the fuel supplied to the motors, such fuel metering means including a movable element movable at a rate proportional to the rate of delivery of fuel to all of the motors, means to determine the ratio between airplane speed and the rate of fuel supply to the motors, said ratio determining means including a first function element and a second function element, connections between the airplane speed detection means and the first function element effective to cause said first function element to function proportionately to the frequency delivered by the airplane speed detection means, connections between the movable element of the fuel metering means and the second function element effective to cause said second function element to function proportionately to the rate of movement of said movable element, said ratio determining means including a movable ratio indicating element movable to position corresponding to the ratio of airplane speed compared to rate of movement of said movable element of the metering means, pitch control means, connections between said pitch control means and the pitch varying means of each propeller, the pitch control means comprising one motor power adjusting device and the means to operate all of the rate of fuel delivery means simultaneously comprising another motor power adjusting device, the movable element of the differential control device comprising one controlling device and the ratio indicating element comprising another controlling device, operative connections between one of said controlling devices and one of said motor power adjusting devices effective to move said motor power adjusting device in direction to reduce the difference between the frequencies delivered by the airplane speed detection means and the airplane speed determining means, and operative connections between the other controlling device and the other of said motor power adjusting devices effective to move said other motor power adjusting device in direction to cause the movable ratio indicating element to move to higher ratio positions.

8. Means as defined in claim 7, wherein there are operative connections between the pitch control means and the differential control movable element and operative connections between the rate of fuel delivery operating means and the ratio indicating element.

9. Means as defined in claim 7, wherein there are operative connections between the pitch control means and the ratio indicating element and operative connections between the rate of fuel delivery operating means and the differential control movable element.

10. In an airplane having a plurality of power propelling units each unit including an internal combustion motor and a variable pitch propeller in driving connection with said motor, pitch varying means for each such unit, a fuel supply connection to deliver fuel to the motor of each unit, means to control the rate of fuel delivery to each such fuel supply connection, a manually movable settable airplane speed determining device, means to detect the airplane speed, a movable control element, connections from both the airplane speed determining device and the airplane speed detecting device, to the movable control element aforesaid, effective to move said control element to positions corresponding to the algebraic difference between the speed setting of the speed determining device and the detected speed of the airplane, means to operate all of the rate of fuel delivery means simultaneously, means to deliver fuel to the fuel supply connections of all of the motors, means to meter the fuel supplied to the motors, such fuel metering means including a movable element movable at a rate proportional to the rate of delivery of fuel to all of the motors, an economy ratio device including a movable ratio indicating element, connections from both the movable element of the fuel metering means and the airplane speed detecting means to said movable element and including means effective to move said movable element to position corresponding to the ratio of airplane speed to rate of movement of the movable element of the fuel metering means, pitch control means, connections between the pitch control means and the pitch varying means of each propeller, the pitch control means comprising one motor power adjusting device and the means to operate all of the rate of fuel delivery means simultaneously comprising another motor power adjusting device, the movable control element comprising one controlling device and the movable ratio indicating element comprising another controlling device, operative connections between one of said controlling devices and one of said motor power adjusting devices effective to move said motor power adjusting device in direction to reduce the algebraic difference between the speed setting of the speed determining device and the detected speed of the airplane, and operative connections between the other controlling device and the other of said motor power adjusting devices effective to move said other motor power adjusting device in direction to cause the movable element of the economy ratio device to move to higher ratio positions.

11. Means as defined in claim 10, wherein there are operative connections between the pitch control means and the movable control element and operative connections between the rate of fuel delivery operating means and the movable ratio indicating element.

12. Means as defined in claim 10, wherein there are operative connections between the pitch control means and the movable ratio indicating element and operative connections between the rate of fuel delivery operating means and the movable control element.

13. Means as defined in claim 1, together with a third controlling device, and operative connections between said third controlling device and the motor power adjusting device to which the ratio indicating element is connected to cause said motor power adjusting device to function as aforesaid.

14. Means as defined in claim 13, wherein said third controlling device includes a time controlled element in connection with the operative connections of said third controlling device effective to make said operative connections operative.

15. Means as defined in claim 14, wherein said time controlled device includes means to cause said time controlled element to function at regularly timed intervals.

16. Means as defined in claim 13, wherein the motor power adjusting device which is caused to function as aforesaid, is the pitch varying means of the propeller.

17. Means as defined in claim 13, wherein the motor power adjusting device which is caused to function as aforesaid, is the means to control rate of fuel delivery to the fuel supply connection.

18. Means as defined in claim 4, together with a third controlling device, and operative connections between said third controlling device and the motor power adjusting device to which the ratio indicating element is connected to cause said motor power adjusting device to function as aforesaid.

19. Means as defined in claim 18, wherein said third controlling device includes a time controlled element in connection with the operative connections of said third controlling device effective to make said operative connections operative.

20. Means as defined in claim 19, wherein said time controlled device includes means to cause said time controlled element to function at regularly timed intervals.

21. Means as defined in claim 18, wherein the motor power adjusting device which is caused to function as aforesaid, is the pitch varying means of the propellers.

22. Means as defined in claim 18, wherein the motor power adjusting device which is caused to function as aforesaid, is the means to control rate of fuel delivery to the fuel supply connection.

23. In an airplane having a plurality of power propelling units each unit including an internal combustion motor and a variable pitch propeller in driving connection with said motor, pitch varying means for each such unit, a fuel supply connection to deliver fuel to the motor of each unit, means to control the rate of fuel delivery to each such fuel supply connection, airplane speed detection means including means to generate and deliver a frequency which is of value corresponding to the speed of the airplane, adjustable speed determining means including means to generate and deliver a frequency which is adjustable to pre-selected values corresponding to pre-selected airplane speeds, manual means to control said airplane speed determining means to deliver its frequency at any selected value corresponding to a pre-selected airplane speed, a differential control device including a movable element and including means to cause said movable element to move in a direction corresponding to the algebraic difference between the values of the frequencies generated by the airplane speed detection means and the airplane speed determining means, means in connection with each fuel supply connection to each motor to meter the fuel supplied through such connection, each such fuel metering means including a movable element movable at a rate proportional to the rate of delivery of fuel through such fuel supply connection, a synchronizing control device for each power motor and including synchronous reacting elements, a connection from one reacting element of each such control device to the movable element of the fuel metering means of such motor, a connection between the other reacting element of such synchronizing control device and the rate of fuel delivery control means of such motor effective to move such fuel delivery control according to the differential between the speed of movement of the movable element of the fuel metering means and a cyclic control speed, means to generate a cyclic control frequency, means to deliver such cyclic control frequency to one of the synchronous reacting elements, means to vary said frequency, means to determine the ratio between airplane speed and the rate of fuel supply to the motors, said ratio determining means including a first function element and a second function element, connections between the airplane speed detection means and the first function element effective to cause said first function element to function proportionately to the frequency delivered by the airplane speed detection means, means to cause the second function element to function proportionately to the cyclic frequency aforesaid, said ratio determining means including a movable ratio indicating element movable to a position corresponding to the ratio of airplane speed compared to said cyclic frequency, pitch control means, connections between said pitch control means and the pitch varying means of each propeller, the pitch control means comprising one motor power adjusting device and the means to vary the cyclic frequency comprising another motor power adjusting device, the movable element of the differential control device comprising one controlling device and the ratio indicating element comprising another controlling device, operative connections between one of said controlling devices and one of said motor power adjusting devices effective to move said motor power adjusting device in a direction to reduce the difference between the frequencies delivered by the airplane speed detection means and the airplane speed determining means, and operative connections between the other controlling device and the other of said motor power adjusting devices effective to move said other motor power adjusting device in a direction to cause the movable ratio indicating element to move to higher ratio positions, together with a third controlling device, and operative connections between said third controlling device and the motor power adjusting device to which the ratio indicating element is connected to cause said motor power adjusting device to function as aforesaid.

24. Means as defined in claim 23, wherein said third controlling device includes a time controlled element in connection with the operative connections of said third controlling device effective to make said operative connections operative.

25. Means as defined in claim 24, wherein said time controlled device includes means to cause said time controlled element to function at regularly timed intervals.

26. Means as defined in claim 23, wherein the motor power adjusting device which is caused to function as aforesaid, is the pitch varying means of the propellers.

27. Means as defined in claim 23, wherein the motor power adjusting device which is caused to function as aforesaid, is the means to vary the cyclic frequency which is delivered to one of the reacting elements.

28. Means as defined in claim 7, together with a third controlling device, and operative connections between said third controlling device and the motor power adjusting device to cause said motor power adjusting device to function as aforesaid.

29. Means as defined in claim 28, wherein said third controlling device includes a time controlled element in connection with the operative connections of said third controlling device effective to make said operative connections operative.

30. Means as defined in claim 29, wherein said time controlled device includes means to cause said time controlled element to function at regularly timed intervals.

31. Means as defined in claim 28, wherein the motor power adjusting device which is caused to function as aforesaid is the pitch control means.

32. Means as defined in claim 28, wherein the motor power adjusting device which is caused to function as aforesaid, is the means to operate all of the rate of fuel delivery means simultaneously.

33. Means as defined in claim 10, together with a third controlling device, and operative connections between said third controlling device and the motor power adjusting device to cause said motor power adjusting device to function as aforesaid, wherein said third controlling device includes a time controlled element in connection with the operative connections of said third controlling device effective to make said operative connections operative.

34. Means as defined in claim 33, wherein said time controlled device includes means to cause said time controlled element to function at regularly timed intervals.

35. Means as defined in claim 10, together with a third controlling device, and operative connections between said third controlling device and the motor power adjusting device to cause said motor power adjusting device to function as aforesaid, wherein the motor power adjusting device which is caused to function as aforesaid is the pitch controlling means.

36. Means as defined in claim 10, together with a third controlling device, and operative connections between said third controlling device and the motor power adjusting device to cause said motor power adjusting device to function as aforesaid, wherein the motor power adjusting device which is caused to function as aforesaid is the means to operate all of the rate of fuel delivery means simultaneously.

References Cited in the file of this patent

UNITED STATES PATENTS

| Number | Name | Date |
|---|---|---|
| 2,173,913 | Morehouse | Sept. 26, 1939 |
| 2,330,070 | Martin et al. | Sept. 21, 1943 |
| 2,374,276 | French | Apr. 24, 1945 |
| 2,391,896 | Hanson | Jan. 1, 1946 |
| 2,403,243 | Seppeler | July 2, 1946 |
| 2,481,032 | Mount et al. | Sept. 6, 1949 |
| 2,521,299 | Mallory | Sept. 5, 1950 |
| 2,569,444 | Banning | Oct. 2, 1951 |